(12) United States Patent
Andriani

(10) Patent No.: US 12,401,675 B2
(45) Date of Patent: Aug. 26, 2025

(54) NON-DISRUPTIVE DIAGNOSTIC AND ATTACK TESTING METHODS AND SYSTEMS

(71) Applicant: MAZEBOLT TECHNOLOGIES LTD., Ramat Gan (IL)

(72) Inventor: Matthew Andriani, Givataiym (IL)

(73) Assignee: MAZEBOLT TECHNOLOGIES LTD, Ramat Gan (IL)

( * ) Notice: Subject to any disclaimer, the term of this patent is extended or adjusted under 35 U.S.C. 154(b) by 71 days.

(21) Appl. No.: 18/095,005

(22) Filed: Jan. 10, 2023

(65) Prior Publication Data
US 2023/0156032 A1    May 18, 2023

Related U.S. Application Data

(63) Continuation of application No. PCT/IB2022/059556, filed on Oct. 6, 2022.

(60) Provisional application No. 63/253,160, filed on Oct. 7, 2021.

(51) Int. Cl.
H04L 9/40 (2022.01)
H04L 43/50 (2022.01)

(52) U.S. Cl.
CPC .......... H04L 63/1433 (2013.01); H04L 9/40 (2022.05); H04L 43/50 (2013.01); H04L 63/1416 (2013.01); H04L 63/20 (2013.01)

(58) Field of Classification Search
None
See application file for complete search history.

(56) References Cited

U.S. PATENT DOCUMENTS

| 7,450,006 B1 * | 11/2008 | Doyle ................. G08B 29/188 340/5.1 |
| 9,497,207 B2 | 11/2016 | Dhawan et al. |
| 10,509,909 B2 * | 12/2019 | Andriani ............ H04L 63/1458 |
| 10,581,802 B2 * | 3/2020 | Banerjee ............. H04L 67/1012 |
| 10,769,045 B1 * | 9/2020 | Sharifi Mehr ......... G06F 21/552 |
| 11,258,818 B2 * | 2/2022 | Vaidya ................. H04L 41/145 |
| 11,533,329 B2 * | 12/2022 | Montgomery ...... H04L 63/1441 |
| 2002/0078382 A1 * | 6/2002 | Sheikh .................... H04L 63/20 709/224 |

(Continued)

FOREIGN PATENT DOCUMENTS

KR    20200065739 A    6/2020

OTHER PUBLICATIONS

Scott et al., "Zero Trust Architecture," Computer Security, NIST Special Publication 800-207, National Institute of Standards and Technology, U.S. Deptartment of Commerce, pp. 1-59, Aug. 2020.

(Continued)

Primary Examiner — Lashonda Jacobs-Burton
(74) Attorney, Agent, or Firm — Vorys, Sater, Seymour and Pease LLP; Anthony P. Venturino; Maryellen Feehery Hank

(57) ABSTRACT

Testing methods and systems provide a Diagnostic Testing Service as well as an attack simulation service, for a perimeter security system, in a non-disruptive manner, so that the production targets can be tested while normally functioning, and do not have to be brought down for testing. The testing methods can be implemented, such that they are vendor and device type neutral, considering the overall strategy utilized to prevent perimeter security system attacks.

76 Claims, 15 Drawing Sheets

(56) References Cited

U.S. PATENT DOCUMENTS

| | | | |
|---|---|---|---|
| 2006/0218640 | A1 | 9/2006 | Lotem et al. |
| 2007/0130619 | A1 | 6/2007 | Reams, III |
| 2008/0034424 | A1 | 2/2008 | Overcash et al. |
| 2008/0098479 | A1 | 4/2008 | O'Rourke et al. |
| 2009/0172813 | A1 | 7/2009 | Aaron |
| 2011/0288692 | A1 | 11/2011 | Scott |
| 2012/0151593 | A1 | 6/2012 | Kang et al. |
| 2012/0216282 | A1 | 8/2012 | Pappu et al. |
| 2013/0091573 | A1 | 4/2013 | Herz et al. |
| 2016/0028764 | A1 | 1/2016 | Vassseur et al. |
| 2016/0029221 | A1* | 1/2016 | Suarez Garcia .... H04W 12/128 455/410 |
| 2016/0050225 | A1 | 2/2016 | Carpenter et al. |
| 2017/0244743 | A1* | 8/2017 | Key ................... H04L 63/1433 |
| 2017/0244745 | A1* | 8/2017 | Key ................... H04L 63/1408 |
| 2018/0046811 | A1* | 2/2018 | Andriani ............... H04L 43/062 |
| 2018/0124090 | A1* | 5/2018 | Koren ................ H04L 63/1416 |
| 2020/0045073 | A1 | 2/2020 | Ekambaram |
| 2020/0177612 | A1 | 6/2020 | Kras et al. |
| 2020/0389484 | A1 | 12/2020 | Key et al. |
| 2021/0194903 | A1 | 6/2021 | Medvedovsky et al. |
| 2022/0044495 | A1 | 2/2022 | Farjadrad et al. |

OTHER PUBLICATIONS

Trend Micro Incorporated, "Deep Discovery Family—Advanced Threat Protection Against Targeted Attacks," Solution Brief, pp. 1-4, year 2023.

McAfee, Inc., "McAfee Advanced Threat Defense—Advanced Detection for Stealthy, Zero-Day Malware," Data Sheet, pp. 1-2, year 2014.

ICSAlabs, "SonicWall Capture Advanced Threat Protection Service," Data Sheet, Sonic Wall Inc., pp. 1-4, year 2021.

Corero, "Corero Smartwall TDS—DDOS Defense Appliances," Data Sheet, pp. 1-7, Nov. 2022.

Radware Ltd., "DefensePro X—Adaptive Protection from the Most Advanced DDOS Threats," Data Sheet, pp. 1-3, year 2023.

F5 Networks, Inc., "A Guide to DDOS Protection," pp. 1-11, year 2017.

Netscout Systems, Inc., "Arbor Cloud DDOS Protection for Enterprises," Data Sheet, pp. 1-2, year 2019.

Akamai, "Mitigating DDoS Attacks in Zero Seconds wit Proactive Mitigation Controls," pp. 1-11, Apr. 2018.

Fortinet, Inc., "Powerful and Innovative Intrusion Prevention Systems—FortiGate IPS," pp. 1-2, year 2020C.

Check Point Software Technology, "Quantum—Network Security," Product Brochure, pp. 1-21, year 2023.

Fortinet, Inc., "FortiGate Network Security Platform," Product Matrix, pp. 1-6, year 2018.

Qualys, Inc., "Web Application Scanning," pp. 1-4, year 2018.

Cisco, "Snort 3.0 is Available!" pp. 1-8, year 2023.

Rapid7, "Security That Advances With You," pp. 1-9, Jun. 2021.

Cisco Systems, Inc., "Cisco Intrusion Prevention System Appliance and Module Installation Guide for IPS 5.1," pp. 1-234, Mar. 2012.

Tenable, Inc., "Nessus Professional," Data Sheet, pp. 1-3, year 2021.

US-CERT Security Operations Center, "CVE-2007-0087 Detail," pp. 1-2, Jan. 5, 2007.

US-CERT Security Operations Center, "CVE-2013-5211 Detail," pp. 1-3, Jan. 2, 2014.

Rajagopal, "Networking & Content Delivery—Using VPC Traffic Mirroring to Monitor and Secure Your AWS Infrastructure," pp. 1-8, Mar. 10, 2021.

Microsoft, "Azure Virtual Network TAP," pp. 1-2, Sep. 24, 2018.

Google Cloud, "Packet Mirroring," pp. 1-12, last update May 1, 2023.

Google Cloud, "Monitor Packet Mirroring," pp. 1-4, last update May 1, 2023.

Google Cloud, "Packet Mirroring Partner Providers," pp. 1-4, last update May 1, 2023.

Feinstein et al., "Statistical Approaches to DDoS Attack Detection and Response," DARPA Information Survivability Conference and Exposition, IEEE Computer Society, pp. 1-12, Apr. 24, 2003.

Schmidt et al., "A Distributed Denial of Service Testbed," QUT Digital Repository, International Federation for Information Processing, pp. 1-13, year 2010.

Hardaker et al., "Justification and Requirements for a National DDoS Defense Technology Evaluation Facility," Network Associates Laboratories Report #02-052, pp. 1-68, Jul. 26, 2002.

Imperva, "Imperva DDos Protection," Solution Brief, pp. 1-7, year 2019.

International Application # PCT/IB2022/059556 Search Report dated Feb. 2, 2023.

European Supplementary Search Report filed in corresponding application No. EP 22878054; dated Jun. 26, 2025; 11 pages.

* cited by examiner

NON-DISRUPTIVE DIAGNOSTIC AND ATTACK TESTING METHODS AND SYSTEMS

CROSS REFERENCES TO RELATED APPLICATIONS

This application is a continuation of commonly owned PCT/IB2022/059556, title: NON-DISRUPTIVE DIAGNOSTIC AND ATTACK TESTING METHODS AND SYSTEMS, filed on Oct. 6, 2022, which is related to and claims priority from commonly owned U.S. Provisional Patent Application Ser. No. 63/253,160, title: NON-DISRUPTIVE DIAGNOSTIC AND ATTACK TESTING METHODS AND SYSTEMS, filed on Oct. 7, 2021, the disclosure of each of the aforementioned patent applications is incorporated by reference in its entirety herein.

TECHNICAL FIELD

The present invention generally relates to network communications and data transfer, and in particular, it concerns cyber security validation and enhancement of network perimeter services and appliances protection level, for the downstream targets and services being protected.

BACKGROUND

Web Application attacks, Distributed denial of service (DDoS) attacks, application service attacks, phishing attacks, web scraping attacks, malware attacks, and other cyber-attacks originating from the internet, are a major threat to financial institutions (e.g., banks, Forex trading, stock exchanges), large e-commerce sites (auctions, gaming, gambling), hospitals, cloud infrastructure, governmental sites. ISP infrastructure, national infrastructure, and other organizations. Such attacks can exfiltrate data, embed malware, deface, take down, or otherwise hack into stock exchanges, banks, governments, voting sites, insurance companies, NGO's, as well as other critical online infrastructure. Many organizations are increasing their investments into mitigating the spectrum of cyber attacks originating on the internet.

Conventional testing systems and methodologies, especially those for realistic web application testing or DDoS, are disruptive to the IT infrastructure or services of the organization targeted for the test simulation. As a result, vendors try to roll back various aspects of testing, and because of this fact they mainly rely on responses for vulnerability identification from the end application or service itself, false positives from current testing methods become a major issue, leaving additional, in many times avoidable professional services work to validate each vulnerability identified. This makes the remediation process significantly more time consuming and resource intense. Another aspect, in many cyber security checks there is a requirement to have system downtime (or expectation thereof) to perform certain cyber checks (Pentesting, DDoS testing, aggressive vulnerability scanning, Brute force attacks, Web application attacks etc.). This maintenance time always leads to a lack of security coverage, since approving such downtime is very difficult in enterprises, so testing scope has to be severely limited. Accordingly, vendors have weakened and or reduced the types or intensity of their checks to get more coverage, which normally results in inconclusive assessments, assessments not being done at all, or in some cases, assessments being done incorrectly.

Most organizations are heavily reliant on their cyber security posture being maintained through intermediary security mitigation services upstream to the target application or service. These security services may include cloud security services or other security appliances, designed to mitigate cyber threats originating from the internet, prior to reaching the intended production target, on the internal network or targeted service. Security simulations are being done against the services or applications in a production environment where possible, or in a staging environment in cases where service availability on a production environment may be an issue, or where service availability may be put at risk. Another issue facing organizations, having multiple entry points, and multiple upstream security providers they rely on. Organizations have little to no way at all to validate when perimeter security services are required to act together, and function for their protected environment when an attack is split between multiple upstream security providers, e.g., a multi-homed or multi-path environment. Sometimes it is difficult to assess the end target service automatically, for a particular cyber-attack correctly without starting to risk downtime, this is a contributing factor in being unable to ensure all mitigation systems deployed are working automatically and reliably, which inevitably, may lead to a major cyber attack being successful against the organization relying on those mitigation systems.

SUMMARY

Embodiments of the disclosed subject matter provide a Diagnostic Testing Service as well as an attack simulation service, for a perimeter security system, in a non-disruptive manner, so that the production targets can be tested while normally functioning, and do not have to be brought down for testing. The disclosed testing methods can be implemented, such that they are vendor and device type neutral, considering the overall strategy utilized to prevent perimeter security system attacks.

The disclosed embodiments examine attack leakage at various locations along a network, such as at confirmed data points (those data points not statistically generated through inference of responses). By reliably determining leakage, the depth of penetration of an attack on a network is determined, as well as vulnerabilities of mitigation or other components along the network. Embodiments of the disclosed subject matter are designed to continuously launch attack simulations aimed at validating intermediary security services and appliances and less so the end service or application for vulnerability, and not necessarily waiting for the end service or daemon to become vulnerable. For the disruptive testing methods used today, the end application may not be vulnerable to a specific attack at a given moment, however, using the disclosed non-disruptive testing methods, the organization will be able to know if a particular threat could affect the existing target service in the future, should that service enable additional settings or software that may make it or other intermediary equipment vulnerable, allowing security personnel to patch identified vulnerabilities preemptively in each relevant perimeter security service or appliance.

Using the disclosed testing methods, as well as some of the remediation capabilities described, the organization benefits from the no required downtime or maintenance windows, false positive free reporting, as well as full coverage of all targets and services being protected by the organization, the ability to understand exactly which security ring has been breached and how deep into the environment the attack penetrated, which security service or appliance to patch the vulnerability, understand if the vulnerability was made possible because of multiple entry points simultaneously sending in attacks or data split between multihomed or multipath systems, gain immediate insight into vulnerabilities which can penetrate an organizations security, immediately validate any patches or fixes due to the fact no downtime is required, and provide the possibility to automate vulnerability remediation through API without any affect or service availability impact to production systems. Using the disclosed methods and systems enhance the ability to avoid damaging cyber-attacks originating on the internet or other external network(s), where the system owner suffers losses from the breach, including financial, data leakage, data-encryption and/or system or service downtime, as well as loss of reputation and goodwill.

The diagnostic testing service and the perimeter security attack testing service typically assess the protected networks at regular intervals (hourly or daily or weekly or custom). This non-disruptive perimeter testing is performed without affecting service availability of the production IT infrastructure and service, while at the same time assessing the production system's risk to a successful perimeter security attack.

In contrast to conventional testing, embodiments of the diagnostic and perimeter security testing services will not affect the organization's IT infrastructures service availability while performing the aforementioned testing towards an organization's internal network. Testing for system health can be toward a coordination device in the internal network and simultaneously toward actual production servers, or only to production services. Ongoing testing can be altered or terminated if the testing service detects deterioration of the health of the production system. This termination is a "fail safe" or "cut-off" mechanism built into the testing systems to avoid disruption and downtime of the production network. This means that a maintenance window is not required on the part of the organization for any type of testing in this method, including DDoS testing. Verifying the mitigation structure of an organization in an ongoing fashion without any downtime to production is a desirable feature for modern production applications, communication networks and testing in general. Additionally, the results of non-disruptive perimeter testing can be used in subsequent conventional disruptive testing if so desired, so that the disruptive testing simulations will be more focused and efficient with a more predictable outcome for human and procedural response handling. Additionally, it is desired that no false positives are included in results since this significantly reduces an organizations efficiency in vulnerability elimination, and significantly if the actual remediation can be completed without or with minimal human intervention, once a vulnerability is discovered. Also understanding which part of the network(s) or security services, malicious attacks were able to traverse would provide an organization with greatly enhanced pro-active cyber-attack prevention capabilities, especially with cyber security systems being more distributed and in heterogeneous, multi-path & multi-homed environments and across multiple continents in some cases. Making each layer or otherwise referred to as each ring of security more automated in both identifying and remediating modern cyber threats is the challenge of the day, a ring of security can be thought of as a layer of cyber protections, upstream or downstream to another layer of protection, protecting a production network or its services.

The method of the ongoing non-disruptive simulation services, allows testing of a production environment's susceptibility and likelihood to succumbing to various attack vectors originating from the internet or other unknown networks, especially focusing on where perimeter security services failed. The verification and testing do not require and avoid causing downtime or disruption to the organization being tested. Realistic assessments can be generated as a result of testing, since the tests are run against the production environment and not a staging environment. The non-disruptive perimeter testing methods allow covering (testing) a much larger quantity of attacks and targets performed against a production environment, as compared to conventional disruptive testing, since no maintenance windows are required for the non-disruptive DDoS testing service, WAF testing service, IPS testing service or other security testing, i.e., the testing can be ongoing and allows the attack surface coverage to be very extensive.

Additionally, the way this testing is performed, security personnel will enjoy visibility previously unavailable in granularity, and this method is based on actual threat success being confirmed to have passed each mitigation perimeter security mechanism deployed, and not some inferred response, which may be detected as a vulnerability but also may be a false positive. This method laid out validates the security mechanisms and services with reliance on actual penetration having occurred on the perimeter security, between the potentially vulnerable target service being protected and the internet.

The testing services will assist personnel responsible for an organization's IT infrastructure security to know almost real-time if the organization is vulnerable to newly evolved perimeter security threats, closing a significant gap in intelligence on cyber weaknesses within the organization. Conventional perimeter security testing may take a few weeks or months until its vulnerability status is confirmed by other manual testing methods, which may require an additional maintenance period, significantly delaying cyber protections, leaving the organization vulnerable to perimeter security attacks. The testing systems have fail-safe mechanisms built-in to ensure the production environment is not disrupted during testing. This allows for many times more targets to be validated and also many more perimeter security attack types to be run against the production environment, as compared to conventional techniques. The testing systems also provides an accurate decision-making process for staff involved in planning disruptive perimeter security tests, which will likely be a rare event once deploying this method of testing.

Embodiments of the disclosed subject matter are directed to a method for testing. The method comprises: (a) configuring a coordination device along a production network including at least one production service, the production network interfacing with an external network at a perimeter of the production network, and the production network protected by a perimeter security system (PSS) for mitigating multiple threats, the perimeter security system along the production network and the coordination device upstream from the at least one production service; (b) receiving, by the coordination device, pre-attack notification information, the pre-attack notification information including: one or more types of attacks to be launched; and, (c) collecting, by the coordination device, operation data regarding the operation of the coordination device, the collecting based on the pre-attack notification information, and the collecting during an attack based on the pre-attack notification information.

Optionally, the method is such that the coordination device includes at least one emulated service for signaling between the coordination device and other system components, for example, the monitor controller or coordination agents; additionally, the emulated service can be used independently or in parallel with signaling, for a simulated attack associated with the preattack notification information may be run.

Optionally, the method is such that the perimeter security system, includes simulation traffic traversing at least two of the group of: External Security Services (ESS) Module; DDoS mitigation module; Firewall; Web Application Firewall (WAF); Anti-virus, Anti-Spam, Anti-malware, Sandbox protections and, Intrusion Protection System (IPS).

Embodiments of the disclosed subject matter are also directed to a method for testing a coordination device and its corresponding mirror ports(s) along a production network. The method comprises: receiving, by the coordination device, pre-diagnostic notification information, the pre-diagnostic notification information including: the diagnostic traffic being used for the test, including the number of the packets in the test diagnostic traffic, and the time when the test diagnostic traffic will be transmitted to the production network target; whereby a mirror port along the production network, is in communication with the coordination device, providing a copy of the test diagnostic traffic corresponding to the time that the test diagnostic traffic was transmitted to the production network target; and, analyzing the number of packets or certain data within the packets in the copied test diagnostic traffic with the number of packets, or other pre-determined metrics provided in the in the pre-diagnostic notification information, to determine the operational status of the mirror port.

Optionally, the method is such that the test diagnostic traffic comprises legitimate traffic (independent traffic) which does not originate with a diagnostic monitor but rather legitimate traffic towards the a production target, that will be captured as instructed by the pre-diagnostic notification, this may be preferable to have random checks or non-specific checks or for any other reason where such functional tests may be preferred for practical implementations.

Embodiments of the disclosed subject matter are directed to a method for determining the route of an attack into a production network including at least one production service, from at least two network segments, which interface with the production network, and at or at least proximate to, the perimeter of the production network. The method comprises: (a) configuring a coordination device along the at least two network segments, where at least one is at the perimeter of the production network, and the coordination device mirror port(s) upstream from at least one production service; (b) receiving, by the coordination device, pre-attack notification information, the pre-attack notification information including: one or more types of attacks which may be launched along any one of the at least two network segments; and, (c) collecting, by the coordination device, operation data regarding the operation of the coordination device for each of the at least two network segments, the collecting based on the pre-attack notification information from each of the at least two network segments, and the collecting during an attack based on the pre-attack notification information on each of the at least network segments. The originating traffic for these attack simulations is from an external network towards the production service or network, potentially traversing multiple network segments. Identifying the traversal of network segments allows personnel to know which provider or mitigation equipment has the identified vulnerabilities during remediation efforts.

Embodiments of the disclosed subject matter are directed to a method for testing perimeter security of a network. The method comprises: (a) configuring a coordination device along a production network including at least one production server, the production network interfacing with an external network at a perimeter of the production network, and the production network protected by a perimeter security system comprising a plurality of components along the perimeter of the production network and the coordination device upstream from the at least one production server; (b) receiving, by the coordination device, pre-attack notification information, the pre-attack notification information including: one or more types of attacks to be launched; (c) collecting, by the coordination device, at multiple points along the perimeter security system, operation data, regarding the operation of each of the components, the collecting based on the pre-attack notification information, and the collecting during an attack based on the pre-attack notification information; and, (d) analyzing the operation data collected by the coordination device at two or more of the multiple points for packet leakage, to determine one or more of: the penetration into the production network of the attack, the effectiveness of each of the components of the perimeter security system.

Optionally, the method for testing the perimeter security of a network is such that the analyzing the operation data collected at the coordination device, additionally comprises: identifying vulnerabilities in the components of the perimeter security system; and, sending commands to an Application Program Interface (API) controller for remediating the components of the perimeter security system having the identified vulnerabilities, providing partial or fully automated remediation.

Optionally, the method for testing the perimeter security of a network is such that the perimeter security system comprises at least two of the group of: External Security Services (ESS) Module; DDoS mitigation module; Firewall; Web Application Firewall (WAF); Anti-virus, Anti Spam, Anti-malware, Sandbox protections and, Intrusion Protection System (IPS).

Optionally, the method for testing the perimeter security of a network is such that the perimeter security system is within the production network and at least partially in an external network, outside of the production network.

Optionally, the method for testing the perimeter security of a network is such that the identifying vulnerabilities and sensing commands to the API includes a monitor controller.

Embodiments of the disclosed subject matter are directed to a method for determining the route of an attack into a target along a production network and along networks external to the production network, with the external networks interfacing with the production networks. The method comprises: configuring at least one coordination device along at least two of the external networks; the at least two external networks at the perimeter of the production network(s), the production network(s) interfacing with each of the at least two external networks; configuring at least one coordination device at the perimeter of the production network, and the at least one coordination device upstream from the target; receiving, by the coordination devices, pre-attack notification information, the pre-attack notification information including: one or more types of attacks which may be launched along any one of the at least two external networks; and, collecting, by the coordination devices, operation data regarding the operation of each coordination device, the collecting based on the pre-attack notification information from each of the at least two external networks and the production network, and the collecting during an attack based on the pre-attack notification information on each of the at least two external networks and the production network.

Optionally, the method for determining the route of an attack into a target along a production network and along networks external to the production network is such that the target includes at least one of a production service and/or a production server.

Embodiments a of the disclosed subject matter include a method for testing depth of penetration for perimeter security of a network, configuring at least one coordination device for communication with at least two points of-at least one network, the at least one network including at least one production service, and, a perimeter security system (PSS) for mitigating multiple threats upstream from the at least one production service; receiving, by the at least one coordination device, pre-attack notification information, the pre-attack notification information including: one or more types of attacks to be launched against the at least one production service; collecting, by the at least one coordination device, operation data which has at least partially traversed the perimeter security system (PSS) during an attack of the one or more attack types in the received pre-attack notification information, and the collecting from the at least two points, based on the attack of the one or more attack types from the pre-attack notification information; and analyzing the operation data collected by the at least one coordination device from the at least two points of the at least one network, for one or more of: packet leakage and/or the certain data within the packets, to determine one or more of: the downstream depth of penetration through the PSS towards the production service by the attack, or the effectiveness of one or more of the components of the perimeter security system (PSS).

Optionally, wherein each of at least the at least two points of the at least one network includes a mirror port.

Optionally, wherein the analyzing the operation data collected at the coordination device, additionally comprises: identifying vulnerabilities in the components of the perimeter security system (PSS); and sending commands from an Application Program Interface (API) controller towards the PSS for remediating at least one of the components of the perimeter security system having the identified vulnerabilities.

Optionally, wherein the components of the perimeter security system (PSS) comprise at least two of the group of: External Security Services (ESS) Module; DDoS mitigation module; Firewall; Web Application Firewall (WAF); Anti-virus, Anti Spam, Anti-malware, Sandbox protections and, Intrusion Protection System (IPS).

Optionally, wherein the at least one network comprises a plurality of networks, and including an external network and a production network, and the at least one production service is on the production network.

Optionally, wherein the perimeter security system is within the production network and at least partially in the external network.

Optionally, wherein the identified vulnerabilities includes instructing the API controller to send one or more commands, and is performed by a monitor controller or the coordination device.

Optionally, wherein the preattack notification information includes, the time of the attack, and one or more of: the attack type, the number of packets in the attack, and/or certain data in the packets of the attack.

Optionally, wherein the attack is initiated by one or more simulators in communication with a simulator controller.

Optionally, wherein the simulator controller is in communication with a monitor controller.

Optionally, wherein the one or more simulators are in communication with a monitor controller.

Optionally, wherein if the simulator controller loses communication with the monitor controller or the simulator controller, the simulator controller or the monitor controller initiates a notification to the one or more simulators to alter or terminate the attack.

Optionally, wherein the at least one coordination device includes a plurality of coordination devices, and different coordination devices communicate with at least one point of the at least one network.

BRIEF DESCRIPTION OF THE DRAWINGS

The embodiments herein described, by way of examples, is with reference to the accompanying drawings, wherein like reference numerals and/or letters indicate corresponding or like elements. The drawings are as follows.

ABBREVIATIONS AND DEFINITIONS

Figure 1:
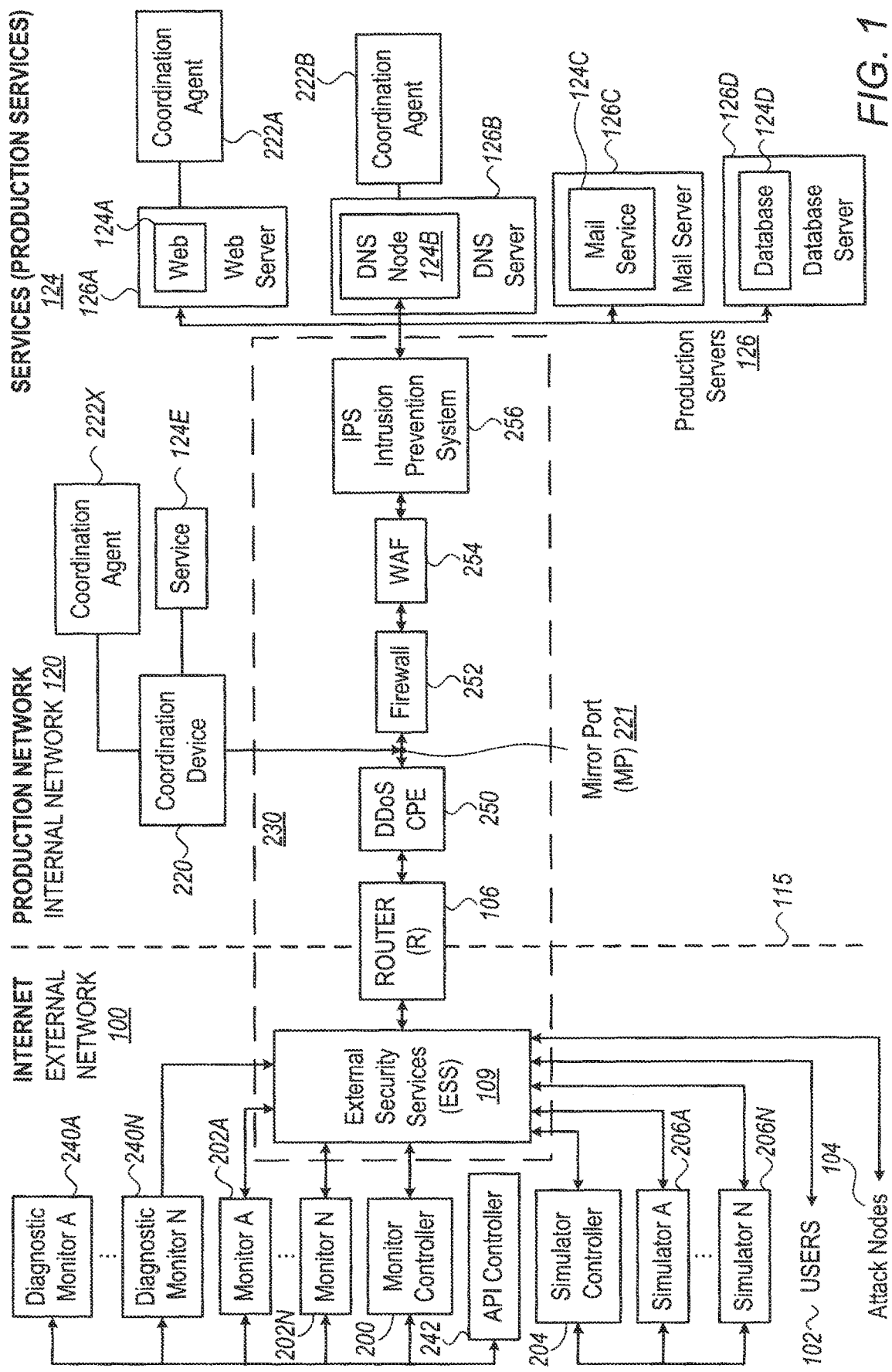
FIG. 1 is a diagram of a high-level network topology for diagnostic testing, perimeter security attack testing and protection enhancement API.

For convenience of reference, this section contains a brief list of abbreviations, acronyms, and short definitions used in this document. This section should not be considered limiting. Fuller descriptions can be found below, and in the applicable Standards.

BID—Security focus Bugtraq ID Database, tracks issues of cyber security flaws and exploits also sometimes corresponding fixes.

BGP—Border Gateway Protocol.

CPE—customer premises equipment.

CPS—Connections per second.

CVE—Common Vulnerabilities exposure provides a reference method for publicly known information-security vulnerabilities and exposures.

Device—One skilled in the art will realize that the terms "device", "node", "server,", "compute node", "instance", "vm", "virtual machine", "docker", "lambda instance" and similar terms are generally used interchangeably as appropriate for the specific context of the hardware or module being referenced.

DoS—Denial of service or DDoS—Distributed denial of service. A type of attack attempting to make a machine or network resource (service, server or node etc.) unavailable to intended users.

Sandbox—A technology typically used by antimalware, antispam, or phishing protection systems, to open potentially malicious files and execute those files in a controlled environment to inspect if the file indeed has malware or some type of malicious attachment embedded. Based on abnormal behavior or other threat analysis techniques a file may be deemed a threat.

Companies utilizing Sandbox technology include, but not limited to:
https://www.trendmicro.com/en_us/business/products/network/advanced-threat-protection/inspector.html
mcafee.com/enterprise/en-us/products/advanced-threat-defense.html
https://www.sonicwall.com/products/capture-advanced-threat-protection/

Zero Trust Architecture (ZTA)—Is an idea and recommendation, whereby users are continuously scrutinized what they are doing with network resources and applications, e.g., "never trust, always verify". This is done through multi-factor authentication, micro segmentation, continuous authentication, behavioral monitoring and other systems design to ensure the user is indeed authorized to access the system, preventing attackers lateral movement. See reference:
https://csrc.nist.gov/publications/detail/sp/800-207/final.

Upstream/Downstream—The terms "upstream" and "downstream" are terms of direction, location, and orientation, for explaining the location of components and travel direction for traffic, including packet traffic, to and from various components of one or more networks. "Upstream" is normally referred to as towards the Internet or External Network 100, as shown, for example, in FIGS. 1, 9 and 11-15. "Downstream" is normally referred to as into the internal network or production network 120 towards a target 124, as shown for example, in FIG. 1 (as well as FIGS. 9 and 11-14). For example, using FIG. 1, as a reference for all of the drawing figures, a firewall is upstream to a target it protects. A target is downstream from the ESS, IPS and firewall. A WAF is upstream to a web application, and a web application is downstream to the WAF protecting it. Additionally, for example, as shown representatively in FIG. 1, the external network(s) 100 and the internal network(s) 120 interface at a perimeter, shown by the vertical broken line 115 (as well as the drawing figures which include this vertical broken line or vertical broken lines).

DDoS—Distributed Denial of service. A type of DoS attack where the attack source is more than one, and often a multitude (such as thousands) of unique IP addresses.

DMZ—De-militarized zone.

FQDN—Fully qualified domain name.

Internal network—an organization's production network, also referred to as a "production environment", or simply "environment". Normally a private network under control of the organization, as opposed to the public Internet.

IP—Internet protocol.

Signaling—Used for control messages, data control, or communication between components of the described system. For example, the coordination device signals the monitor controller. The monitor controller may signal the monitors, diagnostic monitors or other components of the system. Signaling may or may not be part of an emulated service depending on the practicalities for the required implementation, such that the signaling between components of the disclosed systems is typically ongoing for system functionality, data flow control, control message control, and the like, IPS device—Intrusion Prevention System—monitors network traffic and attempts to block and log malicious activity on a network.

IT—Information technology.

Port mirroring—sending a copy of network packets seen on one switch port to another switch port. Also known as a network tap, mirror port or Switched Port Analyzer (SPAN) port and VPC (Virtual Private circuit) in the cloud. A mirror port may also be any device, appliance or service which generates one or more copies of traffic, for example, packet traffic moving upstream or downstream, that has traversed a location of the internal or external network.

PPS—Packets per second.

Pre-attack notification information. Information regarding what types of attacks will be launched against the production environment during an upcoming attack (testing). Also referred to in the context of this document as "pre-attack information". Pre-attack information should not be confused with conventional "attack" information that is generated by conventional computer defense systems during an attack. Pre-attack information should also not be confused with "attack" information that is generated and/or provided after an attack has occurred or after testing has completed.

Production environment—Generally the internal network (cloud systems included) of an organization including the production servers. Also referred to in this document as the overall "system" being tested, or system for which health and status is being determined. Production environments are IT setups which serve a real business need and are not testing environments or staging environments.

Production servers—one or more servers (devices or nodes) typically on an organization's internal network or cloud infrastructure. Each production server may be configured to run one or more services, and optionally run one or more coordination agents.

Scrubbing—A service external to an organization's (internal) network that is relied upon to only pass clean traffic to the organization's (internal) network, such as destination production servers. A scrubbing center may be relied upon in place of or in conjunction with CPE for DDoS mitigation or WAF or any other cyber mitigation systems upstream to mitigate some of the malicious (attack) traffic.

SIEM—Security Information and Event Management is a term for software products and services combining security information management (SIM) and security event management (SEM). SLEM technology provides real-time analysis of security alerts generated by network hardware and applications.

SIM—security information management.

Target—an element that is the subject of an attack. The object being attacked, towards which an attack is directed. For example, a target can be an organization in general, an organizations internal network (such as internal network), a server device (such as one or more of the production servers, such as web server), or a service (such as one or more of the services, such as mail service).

Testing—In the context of this document, includes but is not limited to, "DDoS testing", "Perimeter testing", "Vulnerability scanning", "WAF testing", "perimeter security testing" is also referred to as "testing", an "attack", "attack simulation", "simulation", "test", "security check", "validation".

TCP—Transmission Control Protocol provides reliable communication with handshaking (often referred to as three-way handshake) over IP networks. TCP is a reliable transmission method and is sometimes referred to as TCP/IP. TCP is the transport protocol used with may services today such as HTTP or FTP.

UDP—User Datagram Protocol is a major part of the IP suit of protocols. UDP is referred to as unreliable or connectionless since UDP does not have handshaking and other error/reliability checking features built-in. UDP is utilized in many services today, for example DNS.

WAF (Web Application Firewall)—A device dedicated to mitigating web based attack vectors. WAFs, unlike firewalls, are designed mainly to inspect the application layer (layer 7) of incoming traffic. WAFs apply a set of rules to HTTP traffic dynamically or statically to stop an attack (for example XSS, SQL injections). Some examples of attacks, WAF are designed to mitigate: Cross Site scripting (XSS), SQL injections, Sensitive data exposure, known service vulnerabilities, brute force, web site scraping, botnet attacks, website defacement, DDoS attacks, out of state attacks, empty connection attacks, and others.

Examples of DDoS attacks, include, but are not limited to: SYN flood, ACK Flood, RST Flood, LOIC (Low Orbit Iron Cannon), HOIC (High Orbit Iron Cannon), Out of state flood, Slowloris, R.U.D.Y, Slow HTTP test, ICMP flood, Teardrop attacks, Slow rate flood, HTTP POST flood, HTTP GET Flood, Dynamic HTTP flood, DNS request flood, SSL renegotiation, attack Bypass Layer 7 protections, DNS response Flood, NTP attack, SIP renegotiation attack, and, Advanced persistent DDoS (APT DDoS attacks). Examples of other attacks include, for example,—Application service attacks, phishing attacks, web scraping attacks, CVE based attack detection and strategies, IPS security, brute force attacks, fuzzing attacks, firewalls, malware attacks, malicious payloads, scraping, sandbox strategies, and other cyber attacks.

Equipment that can be used as part of a DDoS mitigation strategy in the Perimeter Security System (PSS) 230 as defined herein, such as being integrated as sub-modules in the DDoS mitigation 250 include, but are not limited to: Correros DDoS Defense Device—http://www.corero.com/products/Corero_DDS.html Radware's Defense Pro—http://www.radware.com/Products/DefensePro/F5 DDoS mitigation devices—http://www.f5.com/it-management/solutions/ddos-protection/overview/.

Scrubbing centers, which may be part of external security services (ESS) modules, may include, but are not limited to equipment such as: Arbour—http://www.arbometworks.com/products/arbor-cloud/for-enterprises Prolexic—http://www.prolexic.com/services-dos-and-ddos-mitigation.html Incapsula—http://www.incapsula.com/ddos-protection-services.html. Scrubbing centers may be part of the External Security Services modules. Additionally, provided that the deployment is upstream from the production network perimeter, any device such as Firewalls, WAFs, IPS, Anti-spain Anti-malware, Anti-virus, Sandbox protections, anti-phishing and the like are also taken to be part of the ESS.

Firewalls can include, but are not limited to: Checkpoint—http://www.checkpoint.com/products/next-generation-firewall/index.html Fortinet—http://www.fortinet.com/solutions/firewall.html.

Vulnerability Scanning—Vendors scan services or applications for vulnerabilities using either custom crafted methods or known CVE's. Vendors providing such services may use web attack simulations or NVTs (Network Vulnerability test) making use of NVD (National Vulnerability Database—https://nvd.nist.gov/) or similar sources. Vendors providing such technologies include:

Qualys—https://www.qualys.com/apps/web-app-scanning/

Tenable—https://www.tenable.com/products/nessus

Rapid7—https://www.rapid7.com/

IPS/IDS systems include, but are not limited to: Snort—https://www.snort.org/Cisco IPS—http://www.cisco.com/c/en/us/products/collateral/security/ips-4200-s-series-sensors/product_data_sheet0900aecd805baef2.html Fortinet IPS—http://www.fortinet.com/solutions/ips.html IBM IPS—http://www-03.ibm.com/softwareIproducts/en/network-ips Source fire—http://www.sourcefire.com/products/next-generation-network-security.

Routers include, but are not limited to: Cisco—http://www.cisco.com/c/en/us/products/routers/index.html Juniper, http://www.juniper.netlus/en/products-services/routing/.

WAF (Web application firewall) include, but are not limited to: Imperva—http://www.imperva.com/Products/WebApplicationFirewall Radware—http://www.radware.com/Products/AppWall/.

CloudFlare—https://www.cloudflare.com/

The above are just some of the more common devices seen in a network with regards to mitigating and defending against cyber security threats.

Vulnerability scanners use various checks (NVTs and similar) to elicit responses from services or applications they are scanning locally or from a service on the internet. For example, sending an SQL injection towards a Web application, if the Web application responds with data which could indicate insufficient bounds checking, the vulnerability scanner may identify the web service as vulnerable, which may or may not be correct. A series of other checks may be performed, such as trying to input benign data and then checking if that data exists on the web application, further eliminating the possibility of a false positive. However, one hundred percent certainty of false positive is never assured since these technologies rely on responses from the service, there is no assurance that the service being tested is actually the one responding to the scanner or that the responses are legitimate.

DDoS in many cases is unique in the fact that DDoS often requires more than one of these devices or infrastructures to be incorporated into the DDoS mitigation strategy to stop a DDoS attack from impacting service availability, since even if on premise equipment is working well, the bandwidth requirements may simply not be adequate. For example, if the DDoS CPE (Customer Premise Equipment) perfectly blocks a SYN attack, however the attack exceeds the bandwidth of the production environment's target, the environment will still suffer downtime, since the bandwidth would be saturated up to the DDoS CPE. Without an upstream provider mitigating the SYN attack to preserve the bandwidth for legitimate users connecting, the CPE alone will not work to enable business continuity for the production environment, since no bandwidth will be available for legitimate users.

Disruptive testing—implies that launching of attack simulations against an organization's IT infrastructure will cause disruption to service availability if that particular attack vector is not mitigated by the perimeter security mitigation systems deployed. For example: If a website is being tested for susceptibility to attacks, and a disruptive attack is performed towards the website, if the website is not as protected against such an attack vector, visitors will no longer be able to connect to the website. Service availability has been disrupted. To further this example, if the website was hosted on a network that also hosts a mail server, the mail server may also become unavailable, even if the original target was just the web server.

Non-Disruptive perimeter (perimeter security) testing—implies that the testing taking place against the IT infrastructure does not affect adversely any of the service availability of the organization being tested. All services should remain in a healthy state for external users to utilize, even if the actual production service is being validated by launching a series of attacks directly to such a service. For example: If a website is being tested for susceptibility to perimeter security attacks and non-disruptive perimeter testing is used to verify if the website is indeed protected against multiple attack vectors, visitors should still be able to connect to the website. Service availability has not been disrupted. All services within that same subnet (network) such as SMTP, DNS, VPN or FTP would also not be disrupted (continue to operate).

Network services—Also referred to as "services" such as the services or "production services", include any service (also referred to as daemons) that are designed and deployed to serve users. Some examples of common services include, but are but not limited to: HTTP service—Serves websites and other web based applications (APACHE and IIS are a couple of common web services) SMTP—Is a mail protocol used to send email (POSFIX and Exchange may implement SMTP) SIP—Use for VOIP communications.

IT infrastructure (network infrastructure)—refers to a device that has traffic passed through the device or to it on the IT network of an organization, including in the cloud. Examples include, but are not limited to: Firewalls Routers DDoS mitigation devices WAFs (Web application firewalls) IPS (intrusion prevention systems) Load balancers, servers and nodes.

DETAILED DESCRIPTION OF THE DRAWINGS

The principles and operation of the system according to a present embodiment may be better understood with reference to the drawings and the accompanying description. The present disclosed subject matter, in some embodiments, is directed to a system for testing and verifying the integrity of a perimeter security mitigation strategy of an organization while maintaining operation of the targeted organization's IT infrastructure. The method of the perimeter security testing service facilitates ongoing and recurring operation and integrity of the perimeter security mitigation strategy, at regular intervals and without causing service disruption to the IT infrastructure or production services, thus removing the need for disruptive maintenance windows in organizations. A feature of this perimeter security testing service is non-disruptive perimeter security testing simulation for production environments, including checking all vectors of an organization's perimeter security mitigation strategy in an ongoing way.

This system is applicable for perimeter security, and is not limited but typically includes web application validation, web application security, web security strategies, phishing attack detection, DDoS testing services, DDoS mitigation strategies, phishing detection, CVE based attack detection and strategies, IPS security, brute force attacks, fuzzing attacks, firewalls, malware attacks, malicious payloads, scraping, sandbox strategies or any other validation and remediation of security systems deployed on the perimeter of an internal network or protected services on systems serving the public or internal employs from cyber threats arising on the Internet.

For simplicity, this description refers to perimeter security attacks, which may include, for example, web application attacks. This use should not be interpreted as limiting, and also applies to other types of attacks.

The systems and methods of the disclosure provide for diagnostic and attack testing occurring during normal operation of the networks so as not to disrupt normal operation of the networks (both production and external networks). Accordingly, this testing is known as non-disruptive testing, as it occurs during normal production operations, such that the network or networks do not need to be taken offline or require a maintenance window out of hours for performing the aforementioned testing.

In general, a method for testing, including performing diagnostics on one or more coordination devices, as well as performing simulated attacks, includes deploying a coordination device, for example, on a production network (for example, which may include multiple physical and logical entities including production services). The coordination device optionally emulates a network service for being attacked or for signaling to other components. The production network is protected by one or more perimeter security devices or components, the aforementioned perimeter security devices or components forming a perimeter security system (PSS). A response monitoring baseline is generated of each production service's normal operation on the production network; this can be done with either or both response monitors or coordination agents. Before perimeter security testing, the coordination device receives pre-diagnostic information, when a diagnostic procedure is to be performed, or pre-attack notification information, when a simulated attack is to be performed. The pre-attack notification information includes one or more types of attacks to be launched, when each type of attack will be launched, and parameters of each type of attack. During an attack, the coordination device collects operation data based on the pre-attack notification information. The production service is monitored for, example, by monitors on the external network, generating response monitors towards a production service on the internal network. This allows "normal" behavior of the service being monitored to be defined, i.e., understanding what a stable production service looks like. The monitor's operation data is reported back to the monitor controller during an attack, and if the monitor controller determines that the operation data is out of a pre-determined range, e.g., outside of the baseline, the attack is altered or terminated. Coordination agents may be part of a pre-attack or pre-diagnostic information and post attack and post diagnostic data collection. Coordination agents 222X generally function as a monitor deployed on a production server 124 or coordination device 220 collecting agent operation data (which, for example, includes traffic, such as packet or packetized traffic), to be used as part of creating baselines for different operation data including such operation data metrics (agent metrics) such as, e.g. CPU, RAM, gathered traffic statistics, concurrent connections, packet information etc. Baselines are also created for coordination agents to understand what a healthy system looks like, same as response monitors. Later on, the coordination agents 222X, feeding back to the monitor controller 200 can be used alone or in conjunction with monitors 202 to alter or terminate an attack, which may include a simulated attack. The process being similar to that of the monitors being used to alter or terminate an attack, which may include a simulated attack.

In the description below, certain elements are referred to generally by a general number, with individual members of the general element referred to with a suffix. For example, general references to an element include a numeral without a suffix, such as production services (services) 124, production servers 126, monitors 202, simulators 206, coordination device(s) 220, mirror ports (MP) 221, coordination agents (agents) 222, and diagnostic monitors 240.

The receiving of pre-attack notification information (used interchangeably herein with pre-attack information) is a feature of the perimeter security testing service. In addition, monitoring during testing facilitates altering test execution, or terminating test execution (prior to the designated test ending time in the pre-attack information), thus facilitating non-disruptive perimeter testing of live, current production environments. Time can be time or approximate time, depending on specific usage or context with the practical implementation aspects, there may be a delay in network communications or operating system interpretation system signaling commands, whereas sometimes may be set ahead exactly on Universal Time Coordinated (UTC) time triggering all components simultaneously. Pre-attack information can include a variety of information as detailed elsewhere in this document. Pre-attack information normally includes at least a start time and an end time of the attack. This start time, also known as time of the attack may be one or more of an actual time, an exact time and/or an approximate time (e.g., up to a few seconds difference). Proper operation of the system is such that all devices should use the same time reference (for example, all devices use UTC). All pre-attack notification information that is relevant for a coordination device will be sent to the device. For example, the coordination device 220, receives some or all of the pre-attack information, including the time and time length of the attack, from a monitor controller 200. Once the pre-attack information is received, the coordination device 220 may parse the received pre-attack information, taking what information it requires for itself, to apply when checking for attack leakage. Additionally, based on the pre-attack information it received, the coordination device 220 may send a subset of the received pre-attack information to one or more of the coordination agents (CA) 222 for which it is relevant, which for example, are associated with the production servers 126A-126D and/or services 124. With this pre-attack information, coordination agents are able to parse and send back relevant data metrics (agent metrics), including data points or metrics (e.g., CPU usage, RAM usage, traffic statistics, concurrent connections, DPI data, hard disk storage information etc.), during attack simulations, as requested in this pre-attack information.

The collection (gathering) of operation data includes, but is not limited to, measuring of operational (operation) parameters of a component, device, server, service, packet(s), memory and/or receiving operational (operation) information or metrics regarding a component, device, server, service, packet(s), such as load, processes running, memory use, CPU stats, and the like. Operation data can also be data received from attack simulations that have traversed any security mitigation component, such as any defined in a Perimeter Security System (PSS).

A "pre-determined range" refers to any one or more, or a combination of many parameters (operational parameters) of a device that are measured as part of the collection of operation data being at, above, or below a pre-determined value, or inside or outside a pre-determined range.

Referring now to FIG. 1, a diagram of a network topology in accordance with various embodiments of the disclosed subject matter. An external network, such as Internet 100, (the terms "external network" and "Internet" used interchangeably herein), is connected via a router 106 to an internal network 120. For example, the external network 100 interfaces with the internal network 120 at a perimeter (shown as a vertical broken line 115). The internal network 120 may also be referred to as a production network, as it includes production servers 126 (the terms "internal network" and "production network" used interchangeably herein). In some instances, the external network 100 includes network segments, also known as external network segments, to show different pathways into the internal network 120. In some instances, the internal network 120 includes network segments, also known as internal network segments, to show different pathways within the internal network 120. In some instances, network segments may be referred to, this means any of the internal network segments or the external network segments or combination thereof. Network segments are used as a descriptive way of illustrating how traffic traverses various points of an internal or external network, for example, when a network setup is large multihomed, multi route, multi path, and the like, understanding how traffic traverses can be thought of as various network segments.

Throughout this document, traffic flows from the external network 100 towards the production network 120, such that the external network 100 is located or positioned "upstream" from the internal network 120 (production network), and the production network 120 is located or positioned downstream from the external network 100. Both the external 100 or internal 120 networks may be made up of various segments, where necessary to illustrate a concept, segments are mentioned, and a where the term "network segment" is used this is to illustrate an isolated point of the network on either the internal 120 or external 100 network, for example purposes.

The traffic, for example, including traffic known as attack traffic, simulated traffic, simulated attack traffic, simulator traffic, monitor traffic, test traffic, diagnostic traffic, and the like is typically packetized traffic formed of packets, packet groups or segments and the like. The packets typically contain certain data, which is typically obtained and/or analyzed by various processes, deep packet inspection or some other type of packet parsing analysis, where packet structs and data may be read, which may be performed, for example, at a coordination device 220, a monitor 202A-202N, or simulator 206A-206N, or coordination agent 222A.

The coordination device(s) 220 and monitor controller 200, as well as the mirror ports (MP), for example, mirror port (MP) 221 of FIG. 1 and mirror ports (MP) 221a-221f of FIG. 9, for example, as deployed on a network, i.e., the production network 120, are also known as collection points, through which traffic, such as in the form of packets, is collected, so as to ultimately be available for analysis, as detailed below. Traffic, including the aforementioned packetized traffic, for example, is part of various data, such as operation data, simulation data, monitor operation data, agent operation data, diagnostic data, and the like. At the external network, for example, the Internet 100, one or more users, represented by the user(s) 102, communicate, for example, with services (production services 124A-124D) provided, e.g., hosted by production servers 126, for example, web services, provided by a one or more web servers 126a, DNS services 124B, represented by one or more DNS servers 126B, also known as a DNS Node, a mail service 124C, represented by one or more mail servers 126C, and/or one or more databases (database service 124D), represented by the server 126D. The aforementioned servers and services are in accordance with that detailed in commonly owned U.S. Pat. No. 10,509,909, the disclosure of which is incorporated by reference in its entirety herein. Additionally, for example, the servers (production servers) 126 may also be a virtual node, a lambda instance attached to another instance, a docker, or the like.

One or more attack nodes, represented by the attack node 104, is one example network location from which real perimeter security attacks on the services 124 and/or production servers 126 and/or any other locations on the Internal Network 120 may originated and/or be facilitated.

A perimeter security system (PSS) 230 sits upstream from the production services 124, and, for example, extends along both the external network (Internet) 100 and the internal network (the production network) 120. Alternately, the PSS 230 may be in the internal network 120 alone, or in the external network 100 alone.

The PSS 230, for example, includes perimeter security devices or components 109, 250, 252, 254, 256. For example, component 109 (ESS) is typically deployed upstream of the router 106, typically on/along the external network 100, while components 250, 252, 254, and 256, are typically deployed after or downstream of the router 106 on/along the internal network 120. However, for example, the PSS 230 components may be deployed on/along the external network 100 or the internal network 120. The PSS 230 protects the services (production services) 124 (e.g., deployed on/along the internal or production network 120), specific services indicated by element numbers 124A-124D, and/or the productions servers 126 (e.g., deployed on/along the internal or production network), with specific production servers represented by element numbers 126A-126D. The PSS 230 components include, for example, one or more of each of (one of each shown for example purposes) of: an External Security Services (ESS) module 109 (hereinafter "ESS"), External Security Services (ESS) Module; DDoS mitigation module 250, Firewall 252, web application firewall (WAF) 254, Intrusion Protection System (IPS) 256, Antivirus, Anti-malware, Sandbox protections, Antispam, and the like.

An External Security Services (ESS) module 109 (hereinafter "ESS"), for example, sits upstream from the router 106 on the Internet 100 or external network. The ESS 109, for example, includes computers, computerized devices/modules, services, and the like. The ESS 109, for example, may also be used as part of an organization's perimeter security mitigation strategy. The ESS 109 includes one or more security modules or components which are typically autonomous and/or distributed by location, and which are designed to mitigate malicious, benign or unwanted traffic, from the Internet and pass clean, sanitized or permitted only traffic to the Internal network 120. Example devices or services within the ESS 109 include one or more of, a scrubbing center for DDoS traffic mitigation (such as that described in U.S. Pat. No. 10,509,909) and/or cloud security services or technologies (as disclosed in U.S. Pat. No. 10,509,909), such as, WAF (Web Application Firewall), IPS (Intrusion Prevention systems), antivirus, antispam, firewall, antimalware, geolocation blocking, sandbox detection and other technologies designed to detect and/or mitigate malicious, threatening, disallowed or abnormal traffic types, preventing such traffic from reaching the internal network 120. The ESS module 109 may be distributed, over multiple locations along the internet 100 and/or the internal network 120, to protect internal network 120.

The ESS 109, router 106 and the other perimeter security devices 250, 252, 254, 256 (detailed below) form the perimeter security system (PSS) 230 (also known as a perimeter security mitigation system). The aforementioned components ESS 109, router 106, components 250, 252, 254, 256, may also be in the form of one or more modules. As used herein, a "module", for example, includes a component for storing instructions (e.g., machine readable instructions) for performing a process, and including or associated with processors or executing the instructions. Additionally, the router 106 functionality may be included in the PSS 230. The internet side 100 of the network topology of FIG. 1 additionally includes one or more diagnostic monitors 240A-240N controlled by a monitor controller 200, and an API (Application Programming Interface) Controller 242. The monitor controller 200, as detailed below, typically is the component for orchestrating the system, i.e., controlling traffic flow, data generation, data collection, data analysis, initiating attacks, diagnostic tests, performing diagnostics, and the like. Alternately, another computer, processor or other device may be part of the system, replacing or augmenting the operation of the monitor controller 200.

The diagnostic monitor(s) 240A-240N is/are configured, for example, to send legitimate traffic to a target or intended destination, such as one or more of the production servers 126 or services 124, as part of a diagnostic procedure. One example diagnostic procedure is used to determine whether a mirror port (MP) 221, along the internal network 120, is operational, and the extent or effectiveness of its operation. Legitimate traffic includes, for example, packetized traffic and other traffic which is intended for a target, and which is known to be legitimate, so that it is not blocked by one or more of the ESS module 109 or the other perimeter security devices 250, 252, 254, 256, and will pass through to the target, e.g., the one or more production servers 126, or services 124, an intended destination for the legitimate traffic. For this reason, unless a specific need arises, malicious traffic is typically not used in diagnostic procedures, as there is a high likelihood, that it will be partially or completely blocked by the ESS module 109 (of the PSS 230) or another perimeter security device (of the PSS 230) 250, 252, 254, 256, prior to reaching the mirror port 221 which is being analyzed to determine whether it is operating or to what extent it is operating at.

The monitor controller 200 communicates with one or more coordination devices 220 (detailed below), for example, along the internal network 120, to provide notification information, such as pre-diagnostic notification information, that designated legitimate traffic will be sent to a target, from the diagnostic monitor 240, for example, at a given time and given frequency. The sending of the designated legitimate traffic, by one or more diagnostic monitors 240A-240N, is typically performed under the control and signaling of the monitor controller 200. Alternatively, the monitor controller 200, based on the reasoning for triggering a diagnostic event or other optimizations, may decide to use another existing monitor, for example, Monitor A 202A, to perform the diagnostic procedure. In some cases, during the diagnostic procedure, the diagnostic traffic may be transmitted independently of the diagnostic monitors 240, for example, by a user 102 on the Internet 100 connecting to a production server 126, when the start and/or stop time of the diagnostic traffic is unknown.

In some examples, the monitor controller 200 serves as a collection point or collector for data from the various coordination devices 220, agents 222, simulator controller 204, simulators 206, PSS components, and performs analysis of the data to determine various aspects and vulnerabilities of the system as detailed herein. The monitor controller 200, for example, may be exchanged with or supplemented by other components, such as simulator controller 204, or coordination device 220 to render various decisions on traffic, system vulnerability, vulnerability mitigation, operation of the PSS 230, system health, and the like.

The monitor controller 200, monitors 202A-202N, diagnostic monitors 240A-240N, simulator controller 204 (detailed below and in accordance with that detailed in U.S. Pat. No. 10,509,909), simulators 206A-206N (detailed below and in accordance with that detailed in U.S. Pat. No. 10,509,909), users 102, and the external security system (ESS) 109, which may be a module, for example, deployed on the external network, e.g., Internet 100.

One or more monitor controllers, typically a single monitor controller 200 controls the one or more monitors 202, such as exemplary monitor-A 202A through monitor-N 202N. Alternatively, a single device such as monitor controller 200 can be configured to perform the functions of a monitor controller and monitors. Monitor controller 200 is in communication with (one or more) simulator controllers 204, (one or more) API controllers 242. Typically, this communication is constant (such as using a "stay alive" or "heartbeat" signal, or "control message" signaling as is known in the art) to ensure the proper functioning of the perimeter security testing service, in particular to help implement fail-safe procedures for maintaining stable operation of internal network 120 (the targeted organization's IT infrastructure) during non-disruptive diagnostic and perimeter security testing. One or more simulator controllers, typically a single simulator controller 204 controls one or more simulators 206, such as exemplary simulator-A 206A through simulator-N 206N. Alternatively, a single device such as simulator controller 204 can be configured to perform the functions of a simulator controller 204 and simulators 206. Alternatively, a single device such as the monitor controller 200 can be configured to perform simultaneously the functions of the monitor controller 200, monitors 202, simulator controller 204, and simulators 206.

In the context of this document, the term "target" is generally used to refer to an element that is the subject of an attack such as, services (e.g., production services 124 hosted by production servers 126), daemon, IP address or FQDN name. The object being attacked, towards which an attack is directed. For example, a target can be an organization in general, an organizations internal network (such as the internal (e.g., production) network 120), a server device (such as one or more of the production servers 126, such as web server 126A), or a service (such as one or more of the services 124, such as mail service 124C). The Internal network 120 (for example, which may be in the cloud), for example, includes components downstream of the router (R) 106 and which may include the router 106, represents the targeted organization's IT infrastructure, and is also referred to in the context of this document as the "organization's network" or "network at the organization". The internal network 120, for example, includes a variety of physical or virtual implementations and architectures, including but not limited to one or more subnets and additional networks co-located or in physically or virtually diverse locations.

The internal network 120 may also be such that traffic flows to the production servers as well as to actual internal users. As a result, a particular threat is meant to be blocked by either the Internet 100 ESS 109 or other perimeter security devices (components) 250, 252, 254, 256, even if in a separate part of the Internal Network 120. Other security mitigation apparatus may be deployed at the perimeter or in the cloud (other than those shown in FIG. 1).

The internal network 120, for example, includes one or more perimeter security devices (virtual machine, embedded virtual machines, docker/container, hardware based or other such platforms enabling of security protection software or services) for illustration purposes include perimeter security system (PSS) 230 devices 250, 252, 254, 256, but may include other perimeter security devices, protecting one or more production servers 126. One or more coordination devices 220, e.g., the one shown, communicates (e.g., links) with a corresponding mirror port (MP) 221.

The coordination device 220, is similar to, and in accordance with, the coordination device 220 of U.S. Pat. No. 10,509,909. The coordination device 220 communicates with the monitor controller 200, to receive information as to diagnostic tests as well as simulated attacks. For example, in both the diagnostic tests and simulated attacks, the coordination device 220, for example, functions as a receiver, or includes a receiver, and receives information, for example, as to parameters of each type of attack such as begin (start) time, end time, e.g., the start and end times being actual times typically in real time, amount, size, speed, repetition, location, traffic/packet types, data within packet(s), and the like, as well as other information of the diagnostic test/simulated attack. The coordination device 220 also receives information as to what analysis to perform on the received mirrored packets/representative data, and the data/information to send back to the monitor controller 200 about the diagnostic test/simulated attack. Typically, the coordination device 220 does not but may optionally include an emulated service 124E, shown as part of the coordination device 220 (in U.S. Pat. No. 10,509,909).

The emulated service 124E, when in use, serves to provide signaling functions or other service emulation during pre-tests. The emulated service 124E, for example, also receives a simulated attack, which is, for example, associated with preattack notification information, and for receiving pre-attack notification information and signaling. The signaling or signaling functions may be, for example be used to update the monitor controller 200. The emulated service 124E, for example, is optionally deployed on the coordination device 220, and configured for receiving a simulated attack associated with pre-attack notification information, for receiving the pre-attack notification information and/or for receiving and sending signaling, for example, to the PSS 230 or one of the PSS components 109, 250, 252 or the like, associated with the pre-attack notification information. The router 106 may also be signaled to by the emulated service 124E or the monitor controller 200. Routers may be utilized as part of remediation efforts by the disclosed embodiment.

The coordination device 220 is able to be deployed at/along multiple locations of the external 100 and/or internal 120 networks, depending on need and distribution of the organization, e.g., if two physical locations run production services 124, then two coordination devices 220 may be deployed, one coordination device 220 at each of the two locations. All information is transmitted back to the monitor controller 200 for reporting, evaluation, and backup. However, other considerations may require multiple coordination devices in the same physical or virtual locations. Coordination devices can be communicated with or signaled to individually or collectively simultaneously as per the requirements of collecting operation (or operational) data. Also, when multiple coordination devices 220 are used, deployed along or otherwise in communication with the external network 100 and/or internal network 120, and in communication with corresponding mirror port(s) 221, the coordination devices 200 can operate contemporaneously, including simultaneously, and can communicate with various components, such as one or more of the monitor controller 200, monitors 202, simulator controller 204, simulators 206, diagnostic monitors 240, and API controller 242, contemporaneously, including simultaneously.

Each coordination device 220 can have a separate set of configurations and daemons installed (which can be initially pulled from settings on the monitor controller 200, an alternative setup may be that the coordination device 220 pulls a configuration for the coordination device 220 from the simulator controller 204 or another device acting as a configuration server). All the configurations are preferably stored on the monitor controller's 200 database and can be re-installed easily for new deployments.

The configuration on the coordination device 220 can be backed up alternatively or only on the coordination device 220. Though this functionality may not be required for organizations (in this case relatively larger, more diverse, with a larger internal network 120), local backup can be helpful in using the perimeter security testing system and manually configuring the coordination device 220. In another scenario backups may be stored on the monitor controller 200, simulator controller 204 or any other device acting as a backup server.

The configurations on the coordination device 220 may, for example, optionally include services 124 such as example service 124E such as a set of daemons and other information extracted from perimeter security mitigation devices (perimeter security system components) 109, 250, 252, 254, 256 and also manually input services 124. A goal of the optional service 124E on the coordination device 220 is to emulate as much as the real production network (internal network 120) and the networks services 124 as possible (for example, HTTP, DNS), there services will provide more realistic pre-attack testing targets. These configurations on the coordination device 220, which are a set of daemons and services, are sent traffic from the simulators 206, monitors 202 or diagnostic monitors 240. The sent traffic is recorded by the coordination device 220. Traffic is also recorded by the coordination device 220 when simulators 206 send perimeter security tests towards the production services 124 or production servers 126 via the mirror port(s) 221. The traffic statistics and other required information is stored (on the coordination device 220 or the production servers 126 (by the coordination agents 222, as appropriate), and then sent back to the monitor controller 200 (the monitor controller 200 functioning as a collector or collection point for the aforementioned data, information, and the like) for evaluation via the coordination device 220 of that particular test. In some scenarios, the coordination device 220 may be setup to send data gathered from coordination agents 222 or other internal network 120 devices to the simulator controller 204 or similar server acting as a data storage facility. The coordination agents 222, while shown, may be optional.

The reason different configuration setups may be needed on the coordination device 220 is that there is a high likelihood that different networks for the same organization are responsible for different services 124. Also any new physical subnet or network segment which has other production servers will require another coordination device 220 to have the analysis capabilities and traffic monitoring capabilities (on a mirror port 221) for the services 124 for which production traffic passes through. Since during non-disruptive perimeter security testing the coordination device 220 needs to sniff traffic targeting the production services 124 in order to gather leakage statistics of how much, or, which type of traffic, or understand data manipulation which has occurred to the sent traffic, passed through the perimeter security mitigation module 230. The traffic captured on the coordination device 220 can also potentially be coupled with other data gathered on a particular coordination agent (for example coordination agent 222B) on the coordination device 220 and sent to the monitor controller 200 for further analysis and or conclusions.

One or more perimeter security devices (components), 250, 252, 254, 256, for example, sit between the router 106 and the production servers, which as detailed above, are represented generally by element number 126, and specifically, as Web Server 126A, Domain Name Server (DNS) 126B, Mail Server 126C and Database server 126D, as well as any other production servers, and/or services 124. Coordination Agents (CA) referenced by element number 222 or variations thereof, such as 222A-222D, and 222X, similar to coordination agents 222A-222N of U.S. Pat. No. 10,509,909, and are, for example, in accordance with the descriptions in U.S. Pat. No. 10,509,909. Additionally, the coordination device 220 may include one or more coordination agents (CA), represented by the coordination agent 222X. The coordination agent 222X, for example, serves to gather and collect server statistics which typically include but in no way limited to, CPU usage, RAM usage, concurrent connections, or other important performance metrics which can be baselined, to be used as part of operational decision making for either cut-off decisions, attack altering decisions, vulnerability understanding or other operational understandings which may be derived from such information.

The perimeter security devices or services 109, 250, 252, 254, 256, of the PSS 230 (shown by the broken line box in FIG. 1) alternatively, though not illustrated, may sit between the router 106 and other internal network users and/or services which may traverse at least one or more of security devices 109, 250, 252, 254, 256. These perimeter security system (PSS) 230 devices include, for example, but not limited to, an ESS 109, a DDoS CPE 250 (similar to the Internal DDoS mitigation module 122 of U.S. Pat. No. 10,509,909), a firewall 252, a Web Application Firewall (WAF) 254, and an Intrusion Prevention System (IPS) 256, which mitigates and/or blocks malicious traffic.

The perimeter security devices 250, 252, 254, 256 of the PSS 230 may, for example, be implemented as one or more of hardware, software, on standalone devices, as one or more components of existing devices, either alone or in combination. Components of the perimeter security mitigation system 230, including those of the internal network 120, may be activated or deactivated, additional components added, and components removed.

One or more mirror ports, represented mirror port (MP) 221, sit anywhere between any of the router 106 and the perimeter security devices (components) 250, 252, 254, 256, and the production servers 126 and/or upstream to the muter 106 but downstream from various ESS 109 components, all together the perimeter security components 250, 252, 254, 256 and ESS 109 make up the perimeter security system (PSS) 230. These mirror ports 221 electronically communicate with one or more coordination devices 220. The mirror ports 221 copy or "mirror" the traffic, e.g., packets forming the traffic, as it passes through the mirror port 221. The mirror port 221 sends (or otherwise makes available to the coordination device 220) the copied traffic to the respective coordination device 220 (which includes a collector or functions as a collector for the copied traffic) upon obtaining the traffic, or at intervals, and typically, for example, in real time. Additionally, the mirror ports 221 and/or coordination service 124E can obtain logs from a log management system, and based on the logs can change results of the diagnostic tests or simulations (e.g., simulated attacked, discussed below and also in detail in FIGS. 8 and 10A), which was run previously or its currently running. With this log information, sent to the monitor controller 200 for processing, the API controller 242 can be triggered for updating the any parts of the perimeter security system (PSS), for example ESS 109, the other perimeter security devices 250, 252, 254, 256, and/or the target servers (e.g., production servers 126 and/or services), as detailed below. Alternatively, logs may be sent directly to the API controller 242.

Figure 12:
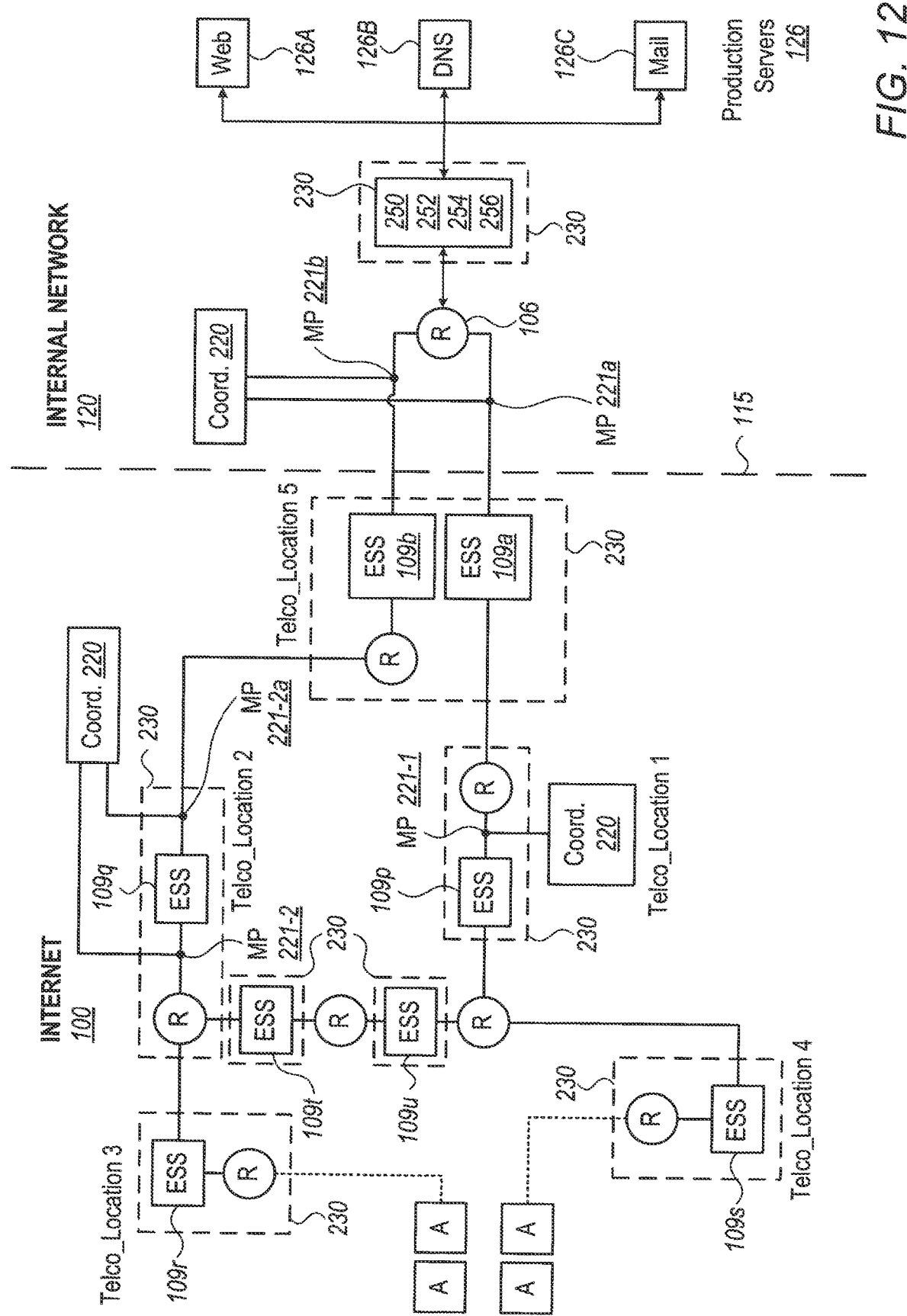
Figure 13:
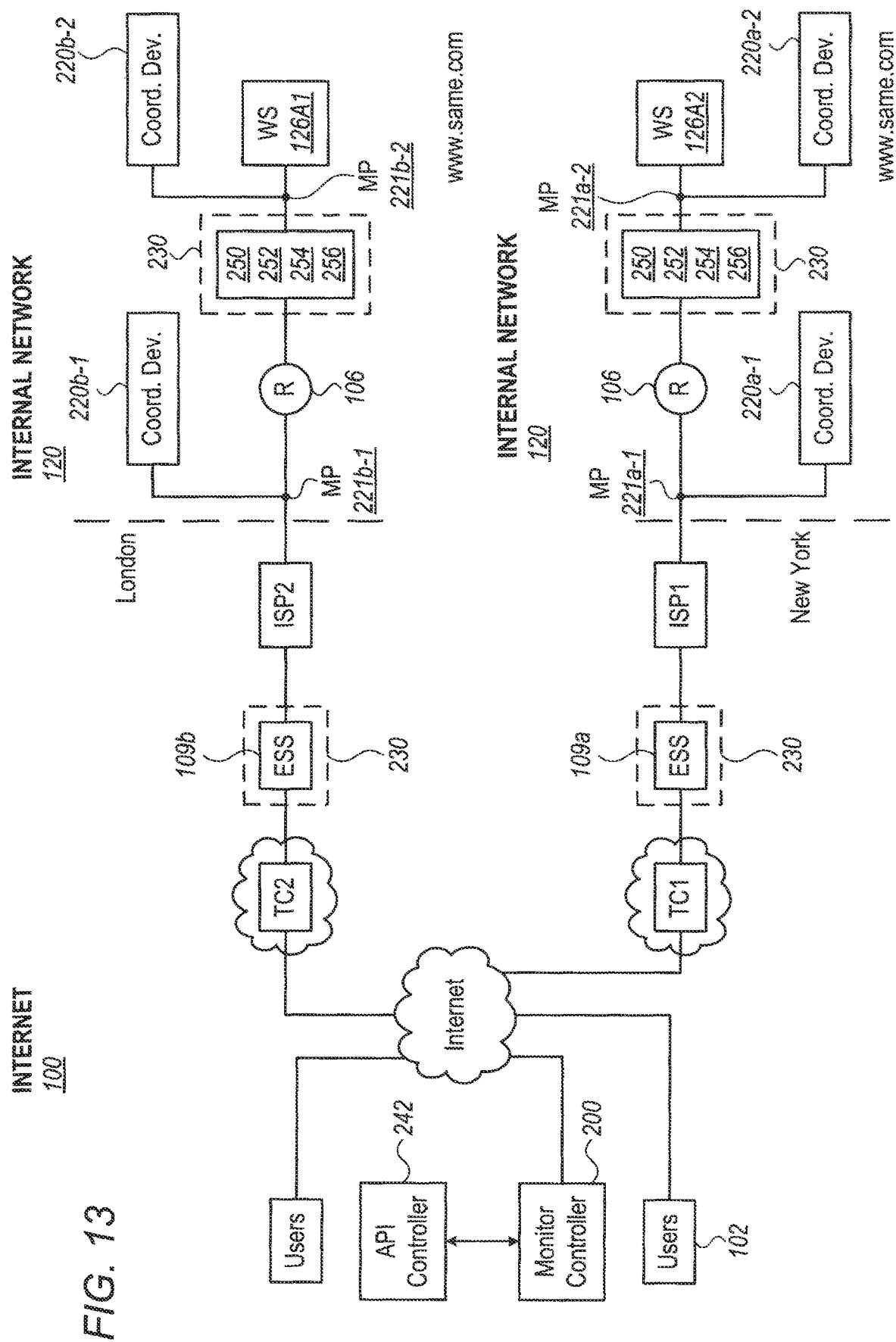
Figure 15:
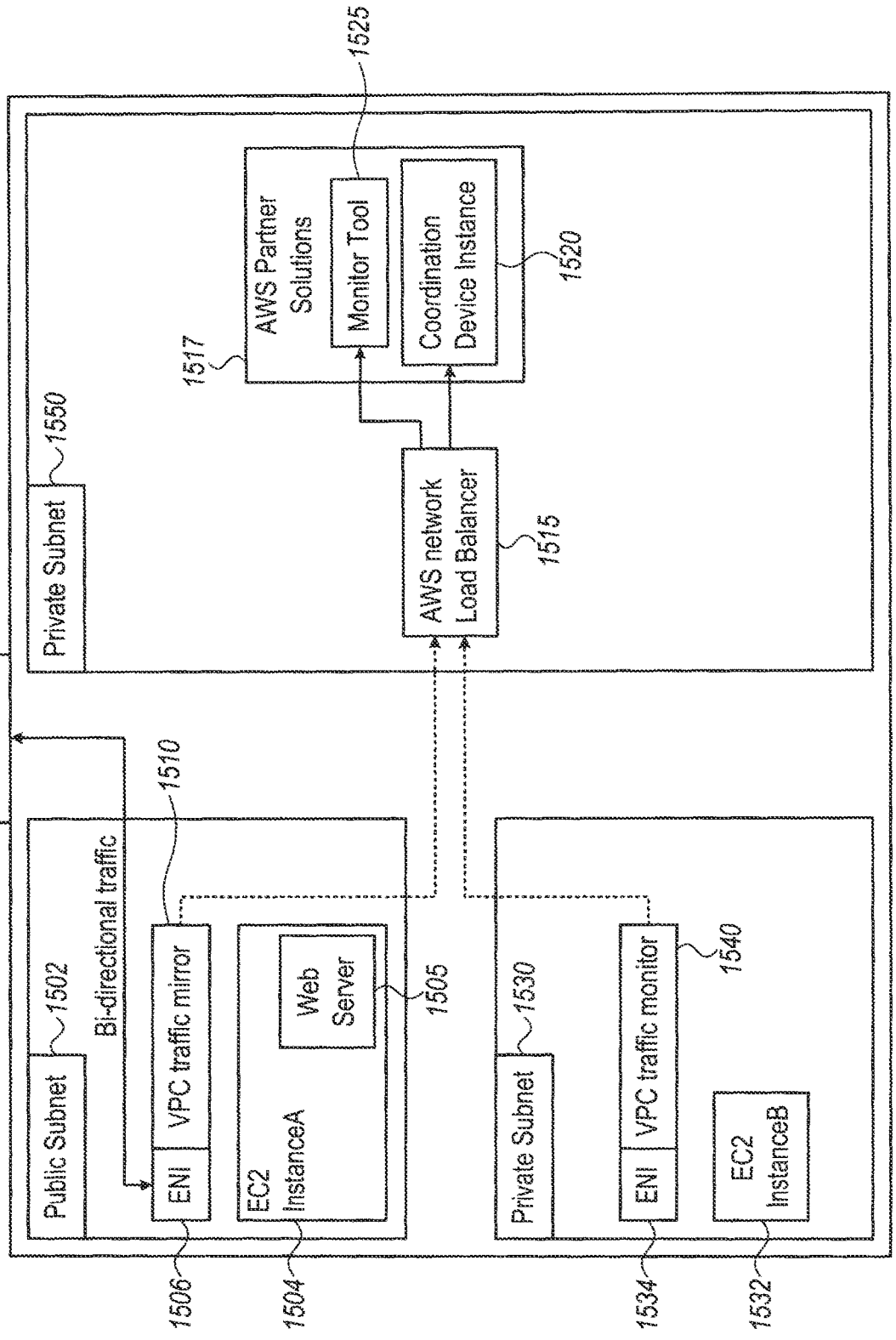

A coordination device 220 is also deployed on the internal network 120 or at other locations (e.g., including network segments) where various ESS 109 components may be deployed on the external network 100, or any other network segment in the internal or external network, as illustrated in FIG. 12 and FIG. 13, this typically may include cloud deployments as defined in FIG. 15. In addition, or alternatively to the coordination device 220, coordination agents 222 can be deployed on the internal network 120 (to obtain data, e.g., operation data including packetized traffic, from network segments, e.g., running along a pathway from the respective ESS 109 to the router 106, via the respective separate Internet service providers ISP1, ISP2 of FIG. 13, the segments between the respective ESS 109a, 109b and corresponding ISP1 and ISP2 being external network segments). Typically, coordination agents are deployed on devices providing services, for example coordination agent 222A on web server 126A with web service (HTTP) 124A, coordination agent 222B with DNS node 124B and coordination agent 222X with the coordination device 220. One or more of the services 124 typically run on one or more production servers 126. For clarity, most services 124 are drawn without the corresponding hardware on which the services 124 are running.

Features of the perimeter security diagnostic and attack testing service include:

1. An automated method for ongoing "non-disruptive", "Ongoing diagnostic and attack testing", and simultaneous validation of single or multiple environments being protected by one or more perimeter security services or appliances, collectively referred to as "non-disruptive perimeter testing" including:
   Verifying that the production environment(s) is currently stable prior to non-disruptive perimeter testing from monitor controller 200 statuses, as well as continually verifying health of the production network during non-disruptive perimeter testing; this is done by creating a baseline of normal response times and/or coordination agent 222 data for the actual services 124 or coordination device(s) 220 being verified, these servers and services 124 are queried directly for response times by the monitors 202 and the baseline stored on the monitor controller 200 for decision making and analysis. Additionally ensuring that the required mirror port(s) 221 are functioning as expected in the coordination device(s) to eliminate the possibility of false negatives or other misleading and/or damaging effects. Multiple coordination devices 220, multiple mirror ports 221, multiple monitor controllers 200, multiple simulator controllers 204, multiple coordination agents 222A, multiple services 124E or other components of the system can be configured to work in conjunction where practicalities of implementation require such.

b. In the case of attack testing, such as attacks on the services 124 and/or production servers 126, optionally first launching a series of attacks towards the production environment's coordination device 220 from an external network, not towards the production servers, at first only pre-testing the coordination device 220. This optional pre-testing towards the coordination device 220, may determine if further testing towards other production services 124 should continue based on the outcome of the testing of the coordination device 220. In the cases where pre-testing is selected, after validating the attack against the coordination device 220, the attack is then run against the real production, though typically launching traffic directly to the production server 124 is also an option, which options is selected is dependent on the type of environment and the type of cyber-attack being run and will be based on configurations of the system, which settings may or may not be dynamically configured, i.e., with or without human intervention. Attack testing traffic, which is, for example, launched from simulators 206 towards the production services 124 will be sniffed (gathered) by the coordination device 220, since all traffic generated by the simulators 206 towards the services 124 is monitored on a mirror port 221 by the coordination device 220 (the coordination device 220 is configured on a mirror port 221 of the internal network 120).

c. Send data gathered from the coordination device 220 or devices to the monitor controller 200. This is the data gathered from the attack simulation traffic sent by the simulators 206, towards the coordination device 220 or production servers 126 being monitored by the coordination device 220, or additionally diagnostic monitor traffic 240 sent towards production service(s) 124 or server(s) 126.

d. Stopping any traffic simulation coming from the simulators 206 or diagnostic monitors 240 (when diagnostic tests or simulation of non-disruptive perimeter testing), if any of the production environment (internal network 120) is adversely affected, i.e., in an unhealthy status received from the monitor controller 200. Actual production servers and the services 124 are monitored by the monitor controller 200, and the simulator controller 204 is updated (by the monitor controller 200 in most cases, or directly) with the real-time health status of the production services 124 or the coordination device 220 (with coordination agents 222 results gathered from internal servers, e.g., the web server 126A).

e. Based on the data received from the monitor controller 200 (which is updated regularly with various data gathered on the coordination device 220 or devices, the monitors 202 and the simulator controller 204), then the monitor controller 200 decides if a perimeter security vulnerability has been identified, or alternatively the tested target is protected (or some other status) for the production environment being validated. For example, if 100 SYN packets are sent towards the production service 124A from one or more of the simulators 206, with destination port 80 and the coordination device 220 receives on its mirror port 221 all 100 SYN packets it may be concluded that the server and its underlying infrastructure is susceptible to SYN flood attacks.

f. Coordination agents 222 deployed on production servers (such as the web server 126A) may also produce statistical baselines which are used to determine if a server is vulnerable to a particular perimeter security attack or becomes unstable during a test. The coordination agents 222 report to the coordination device 220 and the coordination device 220 reports back to the monitor controller 200 in as close to real-time as possible. This allows the monitor controller 200, which may be due to previously stored baselines, to make decisions about the production environment's (internal network 120) stability status. The monitor controller 200 may combine both the coordination agents 222 baselines and the monitor controller 200 baselines to decide if a health issue (vulnerable or not vulnerable) has been detected on the targeted production server (for example the web server 126A) and then altering or terminating the attack may be initiated, similar to the logic of the process laid out in FIG. 3. For ease of understanding, one example may be that an HTTP flood is launched towards the web service 124A at 100 CPS (connections per second) for 5 seconds from the simulators 206. During the non-disruptive perimeter security attack testing the monitor controller's 200 monitors 202 baseline for HTTP traffic may not have deviated from a healthy state, however the coordination agent 222A data gathered by the coordination device 220 and passed back to the monitor controller 200 may show that 500 current open TCP connections (in a TIME_WAIT state) are now open on the targeted server 126A and this is enough of a deviation from the previous normal healthy baseline to consider the web service 124A now unhealthy for the coordination agent 222A baseline. This means the HTTP Flood attack did pass through the perimeter security mitigation system 230 (i.e., not mitigated) but did not adversely affect the web service 124A for external users 102 wanting to utilize the web service 124A (i.e. users 102 could still connect without any delay to the website). However, in the decision making process on the monitor controller 200 the web service 124A may be concluded to be (depending on administrator or dynamically defined settings) vulnerable to the HTTP Flood attack vector when the administrator of the system views the results through the reporting. Or additionally, without regards to the vulnerability status the target service 124A to the attack, the target service 124A is deemed unhealthy (Though no user 102 has noticed any performance impact and can connect as usual) and therefore the attack terminated by the monitor controller 200.

g. The entire system working together gives an administrator an immediate and real-time overview of how a perimeter security attack passed through each ring of security (even if all other perimeter security defensive systems have failed).

h. Additionally, once concluded that a target service 124A or server 126 is vulnerable. Using any or all of the previously gathered data, i.e., Monitor/Agent Baselines, simulated attack information and conclusions, operation data stored from current or previous simulated attacks, can be used by the API 242 controller in conjunction with any of the components of the PSS 230 to automatically or semi automatically close identified vulnerabilities.

The elements (components) described in this document assist to provide a quick understanding of a real-time attack underway. The elements may include the coordination device 220, the coordination agents 222, and previously stored statistics/baselines from the monitor controller 200. This feature of knowing what is affected can be available via a user interface (UI or GUI) that shows how the stability of the internal network 120 has changed under a real perimeter security attack from real attack nodes 104. This is possible, in part, by the monitors 202 continuously monitoring the production services 124 and the coordination device 220 continuously updating the monitor controller 200, in addition, the coordination agents 222 are monitoring the services 124 data and all this data is gathered and reported back to the monitor controller 200 via the coordination device 220, this means all currently affected services 124 that are unhealthy are seen in real-time. The gathered data can then be used by the monitor controller 200 (or another device) to make (calculate, generate, and/or infer) conclusions about affected services 124. In addition, previously identified perimeter security weaknesses detected by the method described of non-disruptive perimeter security testing (perimeter security testing service) allow for speedier diagnosis and analysis when under real-time perimeter security attack from attackers at attack nodes 104, as compared to the amount of time necessary for diagnosis and analysis using conventional techniques. Additionally patching all vulnerabilities identified, ensures automatic mitigation in the future by, ESS 109, DDos CPE 250, Firewall 252, Web Application firewall (WAF) 254, and Intrusion Prevention System (IPS) 256.

2. Automatic rechecking of the environment:

a. If there are any configuration changes to the system 230, devices in the organization's internal network 120, or new IPs are detected on the internal network 120 (for example, from an IP/Port scan launched by the one of the monitors 202), this may trigger the monitor controller 200 to run a series of diagnostic tests from diagnostic monitors 240, or to tell the simulator controller 204 to run a series of perimeter security testing simulations.

b. Responses can also be read from traffic launched on the simulator nodes 206. This assists in further understanding perimeter security mitigation capabilities deployed at the organization, this may include information such as which types of attack mitigation mechanisms triggered during the perimeter security test. For example by reading responses during an SQL injection web based attack test the simulators 206 may be able to understand that captcha was presented, this can be understood through the parsing of the HTTP response packet received on the simulator 206 from the WAF service 254 during the attack.

3. A method of automatic hardening of the environment post perimeter security test:

a. The monitor controller 200 via the API controller 242 or coordination device 220 may be setup to send instructions garnered from the perimeter security testing run/results, to various devices within the internal network 120 or Internet 100 ESS 109 (deemed relevant to the perimeter security mitigation strategy). Commands can be sent via the API controller or any communication protocol the mitigation device or service supports. This assists in strengthening the environment (organization's production environment) and may include configuration changes to third party devices, e.g. routers, perimeter security mitigation devices or ESS modules 109, and/or other perimeter security devices 250, 252, 254, 256, or the router 106.

b. The commands sent to the devices of the perimeter security mitigation system 230 directly from the monitor controller 200, API controller 242, or via the coordination device 220 are, for example, configuration changes to the various security policies on the various appliances or services protecting the organization at each ring of security. Any configuration changes made to the internal network 120 devices will be communicated from the monitor controller 200 via the coordination device 220 and services such as the ESS 109 on the external network 100 may be from the monitor controller 200 via the coordination device 220 or directly from the monitor controller 200 not passing through the coordination device 220. All configuration changes may alternatively be directly completed by the API controller 242.

c. Devices that receive commands from the coordination device 220 or monitor controller 200 but typically from the API controller 242 may include, for example, any component from the PSS 230, perimeter security devices 109, 250, 252, 254, 256, firewalls, routers, web application firewalls (WAFs), and intrusion prevention systems/intrusion detection systems (IPS/IDS). The API controller 242 or other components performing a similar function to that in FIG. 10B, may in its flow have an additional element (Not shown), requiring human approvals at various stages prior to each update happening to a PSS 230 components being applied.

d. The statistics gathered and aggregated on the monitor controller 200 can also be used to assist engineers troubleshooting an attack underway in real-time with an in-depth understanding of how an attacker has bypassed the various systems intended for perimeter security mitigation. This is possible with two or more (two, three, or four) of the following components working together: the coordination agents 222, the coordination device 220, the simulator controller 204, and the monitor controller 200. This quick analysis can be facilitated by these components reporting to a single user interface (UI) where a graphical analysis is displayed to an administrator of the system.

4. A method to read current statistics on various perimeter security mitigation devices and understand if an attack could be successful:

a. The coordination device 220 polls statistics such as open connection information (e.g., TCP stack), CPU utilization etc. from various network devices included in the perimeter security mitigation system 230, data from the coordination agents 222 can also be polled.

b. This information is then sent to the monitor controller 200 for further analysis and utilized in improving the current perimeter security risk level assessment.

5. A method of knowing where to do more disruptive perimeter security testing in limited maintenance windows:

a. After the ongoing non-disruptive perimeter security testing has been completed and results are known (and viewable through a user interface (UI), all perimeter security weaknesses, point of weakness, ring of security breached, such as vulnerabilities are identified, they can be reported, and are accessible real-time in the user interface.

b. This report can now be used automatically to suggest the most relevant perimeter security attacks to check during the maintenance period of strenuous more disruptive perimeter security testing.

Attack Vectors to be Checked

The system is designed to verify known perimeter security, including, for example, perimeter security attack vectors or customized unknown attack vectors, against proprietary protocols, servers, network equipment, applications, services and Application Programming Interfaces (APIs). The attack vectors simulated and tested can focus on, for example, perimeter security attacks, Web application attacks (layer 7), other application attacks, fuzzing attacks, scanning attacks, DNS attacks, cross site scripting (XSS) attacks, phishing attacks, brute force attacks, web scraping, malware attacks, spam attacks and DDoS attacks.

Some vectors include attacks, malicious traffic or unwanted benign traffic (this is a brief list and does not necessarily include all known attacks) i.e., is not comprehensive: SQL injections, Geo IP blocking validations, banner grabbing, Cross site scripting (XSS), directory path traversal, port scanning, cross-site scripting, phishing attacks, exploit attempts. ACK Floods, SlowLoris, HTTPS SSL renegotiation. Botnet simulations, exploitation fuzzing.

The perimeter security testing attacks (e.g., simulated attacks) are possible for both IPv4 and IPv6 networks as well as any other transport protocol that could be used to attain delivery to a production system (like internal network 120). The addressing scheme of TCP/IP is neutral, and this testing system may be applied to any protocol addressing scheme. An important point is the method of gathering statistics to make assumptions on the vulnerability of the environment being validated whilst simulating perimeter security testing attacks. In addition, implementations of the current method for perimeter security testing are able to understand, using traffic captured on the coordination device(s) 220 if the environment(s) is/are indeed vulnerable. This understanding of perimeter security attack vulnerability of the environment is highly accurate, false positive free, very efficient in coverage and non-disruptive to an organizations IT infrastructure, for many Internet 100 originating attacks, compared to conventional vulnerability scanning, pen-testing or other security testing techniques. Perimeter security testing can either directly proceed against production servers 126 or first complete non-disruptive perimeter security testing against the coordination device 220. Regardless of method chosen, a similar methodology of verifying system health at each stage of the attacks, the non-disruptive perimeter security testing is coupled with fail-safe or cut-off mechanism, altering or terminating of the ongoing perimeter security test being sent by the simulators 206 and avoiding disruption to the targeted organizations IT infrastructure or services.

Services Validated During the tests of the perimeter security testing may include any protected service, daemon, or application (for example web servers, gaming servers, email servers, DNS servers etc.). Any service 124 or daemon, or server 126 that serves users 102 directly or indirectly is valid for perimeter security testing.

This may include but is not limited to HTTP servers, VOIP servers, HTTPS servers, SMTP servers. DNS servers, SIP servers, VPN servers, database servers (MSQL, SQL, and the like), FTP servers, SSH daemons, and other customized servers providing external or internal services.

Testing Methods:

Tests are designed to validate that the perimeter security system(s) (PSS 230) deployed, which may include components such as ESS 109, Firewall 252, WAF 254, DDoS CPE 250, IPS 256, and, for example, where all function to intercept and mitigate attack, malicious or unwanted benign traffic or payloads before that traffic can get to its intended destination and cause harm or damage on the end service 124, server 126 or IT production system(s) of the internal (e.g. production) network 120. Such tests are designed to ensure that threats including perimeter security attacks, such as web attacks, DDoS attacks, application exploitation attempts, port scanning, web scraping and other attacks are detected without having to rely on the fact that the end service, server or infrastructure are patched correctly. The tests and are designed to make sure that even in the event those threats are not patched, the intermediate perimeter security systems are mitigating those threats. Using this method, in certain cases, it may be possible to identify weaknesses in the perimeter security systems, even before the end server or service has an actual vulnerability. For example, assuming WAF rules are not auto configured, if a web application has a POST form, and it is possible to send POST requests to that form, however the web form is not vulnerable to an SQL injection, using this method, through sending SQL queries towards the web application, simulating the process to identify the potential for an SQL injection i.e. fuzz the application, our method can identify if those fuzzing queries are able to traverse the perimeter security systems relied upon, if those systems don't trigger then one can enable protections on the WAF for any future vulnerability which could appear in that same POST form. This will proactively mitigate any damaging attack in the future and significantly harden the protections for the web server.

Attacks used by the perimeter security testing service to perform an attack simulation (e.g., sending attack traffic or simulated attack traffic), are malicious traffic patterns or any traffic which may include data within the packet taken from known CVE/BID or unknown proprietary researched exploits. The attack patterns are created according to real life perimeter security attacks, for example, web attacks, phishing attacks, malicious payload exploit attempts or DDoS attacks. Generally, there are predefined checks towards the coordination device 220. Once all checks are completed to make sure the components in the system are all working as expected, simulated attacks are launched from the simulators 206 and are designed to bypass current known mitigation systems incorrectly configured or lacking perimeter security mitigation technology or have an incorrect architecture design with regards to perimeter security attacks. Furthermore, the perimeter security testing service can do perimeter security vulnerability tests that are less focused on traffic flow and manipulation and more focused on a flaw or flaws within an application. Examples may be seen at:

http://web.nvd.nist.gov/view/vuln/detail?vulnId=CVE-2013-5211, and http://web.nvd.nist.gov/view/vuln/detail?vulnId=CVE-2007-0087

There may also be optional traffic generation options from the simulator nodes (simulators) 206 configured through the monitor controller 200, which updates the simulator controller 204. This optional traffic can be utilized to create realistic and customized scenarios designed to validate perimeter security mitigation system 230 capabilities or distributer security systems, when the organization is targeted with a sophisticated and prolonged perimeter security attack from malicious attackers, for example, from attack nodes 104. This is done because some perimeter security mitigation devices may have behavioral algorithms based on previously learnt statistics, or are security systems split between two environments or multihomed systems, and require more traffic to identify the vulnerability in various rings of security, together with the particular service or appliance. This means that the simulator nodes 206 can generate attack traffic to appear as legitimate clients and or malicious traffic. This assists in getting more realistic results in some cases during a more complex non-disruptive perimeter security test.

Frequency of Checks

The tests, for example, attacks, simulated attacks, health and diagnostic tests, can be scheduled to run on a daily, weekly, or monthly level at predefined (predetermined) times for time periods (start time/end time for the test and time length for the test, between start and end times), through a non-disruptive perimeter security testing scheduler setup by an administrator, or on triggered events setup by the administrator. The "time" for the test, in addition to the actual time of the test, for example, in real time, includes an approximate time with respect to the test, so that the system, e.g., the coordination devices 220, can collect traffic at or approximately at the predefined time of the attack or simulated attack. Optionally, custom settings can be used when a test is run and to adapt to the environment or the test (for example perimeter security mitigation system (PSS) 230 and internal network 120). For example, if the coordination device 220 communicates a change in configurations on the internal network perimeter security system (PSS) 230 mitigation devices 109, 250, 252, 244. (of the external network, e.g., Internet 100), this change could automatically trigger a retesting of the perimeter security mitigation system 230. Tests may also be manually initiated by the administrator of the system, for example, an administrator or engineer using an interface (such as a GUI) configured on the monitor controller 200 to generate and/or configure a test, initiate the test, and then monitor the test (attack while in progress real-time). Another example is updates on the simulator controller 204 device to definitions of new perimeter security attacks being added may also trigger a test to take place. Alternatively, based on previous baselines created by the monitor controller 200, non-disruptive perimeter security simulated attack testing may be set to run at the most suitable time automatically selected by the administrator, e.g., when the production servers 126 or services 124 are under the least amount of load (during a day or week). Alternatively settings may be configured dynamically configured, without human intervention, based on gathered data, for example from, baselines, logs or other operation data, gathered from various controllers from coordination agents 222, monitor baselines 202, diagnostic monitors 240, simulators 206, or even the API controller or coordination device 220 statistics, e.g., legitimate traffic rate identified towards targets.

Asset Monitoring

All services 124 being protected by the perimeter security system 230 are monitored from one or more of the monitors 202. At a high-level monitors can be thought of as simulating users 102, however monitors 202 do much more, as described throughout this document. The monitoring may take place from one or more monitor nodes 202A and from one or more locations (for example, US and Asia, or London and Moscow). Having monitoring nodes (e.g., monitors 202) in multiple locations may be important due to geo-location protections triggering dynamically on some mitigation modules (such as ESS 109 of the perimeter security system 230) on the path to the coordination device 220 or services 124, even when small initial sample tests are taking place. The monitor controller 200 is preferably in constant communication to update the simulator controller 204. One way of understanding the monitor controller 200 is that the monitor controller 200 assists in ensuring there is no downtime caused by the perimeter security simulated attack testing performed against the organization. In a case where the monitor controller detects deviation from normal behavior, that may result in potential disruption of one or more components of the organization's network (internal network 120) the monitor controller can inform the simulator controller 204 at any time to terminate simulators 206 sending simulated attack traffic. Coordination agent 222 data may also be used in conjunction with monitor 202 data to determine system stability deduced by the monitor controller 200.

A sample of data that the monitor controller 200 can relay to the simulator controller 204 includes, but is not limited to:
1. If particular IP/FQDN (fully qualified domain name) and/or service is in healthy (meaning no service availability or degradation issues) status this can be determined through response monitoring of servers and services and previous baselines created and that the current responses are within a healthy level. For example, if a HTTP GET request to the web service 124A normally gets and HTTP response within 200 milliseconds (ms) (according to the current baseline), and currently the HTTP response time is 230 ms this may be considered healthy.
2. If a particular IP or service is no longer in a healthy status (meaning a service availability or degradation issue has started), this is detected by one of the monitors 202 not receiving a response from a service or a sufficiently delayed or abnormal response on the coordination device 220 or one of the production services 124. For example, if web service 124A normally has an HTTP response time of 200 milliseconds (ms) for an HTTP GET request to a webpage begin served, and during testing there is no response for the HTTP GET, this lack of response may be considered an adverse effect to the web service 124A or the hosting web server 126A.

These response updates during testing are typically every few seconds at most and designed to be at under a second in many cases, both prior to the simulator controller 204 scheduling tests to be run by one or more of the simulators 206 and during the testing. This will ensure that prior to testing, the production system 120 is stable, (and all services, such as service 124C and web service 124A are available, up, and running as expected). This will also ensure that the tests do not affect production 120 in any way (while the perimeter security testing is being performed). This course of action is done for a higher level of certainty to avoid downtime. In other words, to maintain operation and avoid causing service disruption to the organization's services 124.

If the monitor controller 200 picks up a predefined level of "bad/unhealthy" health for a particular production service 124, the tests may be stopped or altered on the simulators 206. This will ensure maximum uptime for the production environment 120.

As a redundancy measure, commands can be sent directly to the simulators 206 (for example to simulator-A 206A) from for example monitor controller 200 or simulator controller 204 to terminate any tests being run against a specific service (such as mail service 124C) or all services 124, optionally the simulators 206 themselves can regularly (e.g., typically at a frequency of at least once per second during a simulated attack) query (signal) the simulator controller 204 or monitor controller 200 for health state changes. Additionally, should a simulator 206 lose signaling contact with either the monitor controller simulator controller 204 or monitor controller 200 the simulator 206 itself can terminate any ongoing simulated attack ongoing autonomously, and without being instructed to by any controller. This can be configurable as to when this redundancy measure is taken. This redundancy layer is an extra layer of protection to prevent the organizations IT infrastructure being affected in any way due to the perimeter security tests being run on the production servers 126 of the internal network 120. This would likely only happen if the simulator controller 204 was out of contact and unable to communicate with associated simulators 206 (for example, loss of network connectivity) for a pre-determined amount of time. Optionally, implementation of this redundancy can also take into account additional parameters such as is the site "unhealthy/unstable" on a pre-determined level, with the monitor controller 200. One of the simulators 206 (for example simulator-A 206A). Additionally, a simulator 206 can terminate autonomously without being in contact with any controller 200, 204, in the event the simulator internal software, processes, resource usage or operating system has been deemed to become unstable by a process monitoring such processes on the simulator 206 node.

Target Health and Diagnostic Checks Prior to testing (running attacks, checks) being run, all system status should preferably be healthy and working as expected according to the monitor controller 200.

The perimeter security tests are normally run with the below main parameters, these parameters may be extended or reduced depending on the perimeter test or security threat being validated:
1. Target—In FQDN or IP format (for example service 124A or database 124D).
2. Attack type—This is the type of attack to be launched. E.g. SQL injection attempt through browser emulation https://insecure-mazebolt.com/blog?category=Web'+OR+1=1—
3. Fragment packets—If to fragment packets towards the target or not.
4. Target port/service—The TCP or UDP socket e.g., TCP port 80 (HTTP) or UDP port 53.
5. Rate—What speed the test should be run at in terms of repetition of same attack type, Kbps/Mbps, PPS, or CPS.
6. Time—How long the particular test will be run for (for example 30 seconds).
7. Number of simulator nodes 206 from which to run (to use to generate the attack).
8. Iterations (with configured rate/time increases) to run— For example: Run 2 iterations—iteration1 to target x, port y, rate 300 PPS, time 30 seconds. Iteration 2 to target x, port y, rate 600 PPS, time 60 seconds. Or run attack X 3 times from 3 different source locations.

How Many Separate Nodes should the Test Run from (Typically One or More).
   7. Location of nodes from which to run tests (generate attacks)—Specify the location to run test from. The location can be one or more locations, either specified generally (for example Europe, only Europe, or Europe and Asia) or specified more specifically (for example London).

An example of SYN Flood parameters, for single simulation (there may be additional parameters added as needed for the test):

Time to run=10 seconds
PPS (Packets per second)=500
Target FQDN=device.mazebolt.com (this would map to the IP of the coordination device 220)
Target port=80
Nodes to run from =1
Location to run from=ANY The parameters normally include "number of iterations", "rate increase per iteration," and "time increase per iteration". This allows a gradual buildup to testing an upper limit without having any downtime. Before proceeding to the next test, the monitor controller 200 can validate the health of the environment.

Updating the Perimeter Security Testing Service

The perimeter security testing service, for example, has a predefined list of attacks to check. However, there are new attacks emerging in the wild all the time. These new attacks can be updated by the developer based on research done on perimeter security attacks in the wild as well as on the organization's environment.

The updates can be done from the monitor controller 200 to the simulator controller 204 or the coordination device 220 or both. The attacks can be updated on the monitor controller 200 and the receiving definitions updated on the coordination device 220 controller.

On the coordination device 220, updating can include updating receiving daemons/operating system/processes/services/applications (to which the simulator nodes 206 send traffic) from the monitor controller 200 or locally installed. Other components and configurations that may need to be updated on the coordination device 220 may include information from a device in the organization, e.g., two or more of the PSS 230 components 109, 250, 252, 254, 256, including any other configurations and/or updates/changes.

Updates to the coordination device 220 software can also be done by connecting from the coordination device 220 to the simulator controller 204, the monitor controller 200 or another server with similar functioning. The coordination device 220 preferably has an auto rollback feature in case there are issues during the software update. The coordination device 220 preferably has a guided re-install procedure in the event of a software failure. The guided re-install procedure can format all data on the coordination device 220, including giving the coordination device 220 minimal amount of information possible to re-install, i.e., IP address and username and password of the monitor controller 200 from where the coordination device 220 will get configuration parameters and software updates.

The updates can be scheduled for automatic updates at intermittent periods or manual updates. An important point is that updates are configurable per organization, if required, all configurations should be available for editing by a system administrator or other privileged users of the system (for example via a graphical user interface (GUI)).

For example, no information is passed out of the organization/from the perimeter security testing service in clear text—all data will be, any one or more combination of, encapsulated, hashed or encrypted. An exception is response monitoring for monitors 202. Monitoring is normally done in whatever protocol is necessary for the particular service e.g., HTTP response monitoring would not be necessary to encrypt but HTTPS would be by design. The method of communication between the coordination device 220 and the monitor controller 200 or the simulator controller 204 is preferably over an encrypted link, i.e., SSL communication, IPSEC or other similar methods.

How the Results are Posted Back to the Perimeter Security Testing System

The results of perimeter security testing by the perimeter security testing service are typically displayed in a management console user interface provided to the administrator utilizing the system. Each customer normally has a login to the system and can view at least the following information:

1. What aspects were verified for the test—for example, SQL attack towards production service 124A.
2. The parameters of the test, i.e., from where the test was run, from how many nodes the test was run, amount of time run, what locations, if packets were fragmented or not, what padding was enabled, and the like.
3. Test result differences between locations can also be displayed with regards to monitoring data from the monitors 202 and or the coordination agents 222A.
4. If additional information was gathered from other sources, e.g., API calls to various equipment (for example perimeter security mitigation devices 109, 250, 252, 254, 256).
5. If changes were made to the monitor controller 204 configurations because of information gathered by the coordination device 220, for example the removal of a coordination agent (the coordination agent 222A) from the web server 126A may take agent baselines out of future testing decision making made on the monitor controller 200 during a future perimeter security test.
6. If any changes were made to other network devices by the coordination device 220 or monitor controller 200 based on the results of the perimeter security testing run, e.g., if the router 106 was modified by API controller 242 during the testing or as a result of the testing.
7. A snapshot in time of the stability of all devices being monitored in the chain while the perimeter security testing was underway, e.g., a graph showing past/healthy baselines and during perimeter security testing baselines of a particular or many services 124. This includes the stability status of the coordination agents 222 on the production servers 126, e.g., the coordination agent 222A on production web server 126A, stability of response time monitoring of the production service from the monitors 202 and stability of response time monitoring of the production server 126A, from the monitors 202. This can also include information on how the decision was made for if a particular one or more of the production servers 126 (for example web server 126A) or the coordination device 220 was vulnerable or not during the perimeter security test. All this is provided to the administrator of the system (for example graphically via a GUI) and with some text through the user interface. Additional information is also provided on each ring of security in the perimeter security mitigation system 230 was bypassed during the attack, e.g., ESS 109 (or particular ESS component), Firewall 252.

8. A snapshot of the entire system can be taken in order to be able to understand what happened at a point in time. For example, how did all monitored services 124 change in health status during perimeter security tests as opposed to during normal production time without perimeter security testing or real perimeter security attack underway. Snapshots of the system simultaneously are a part of the system.

How the Device is Configured and Multi Configurations Monitoring of System for Administrators and During Tests When a test is running, the administrator is preferably able to see in a user interface the following information:
1. If the test was performed.
2. What parameters were set during the test with regards to type of perimeter security attack and attack parameters (for example 25 repetitions for up to 30 seconds of SQL injection attack X to port 443).
3. If any challenges were identified, e.g., layer 7 or layer 4 challenges (for example, a web captcha challenge).
4. If the challenge can be bypassed, and if so how (show the methodology to bypass a captcha challenge and if so are there other perimeter security attack mitigation options available to mitigate this bypass).
5. An overview of how many test iterations were run (for example repeat this entire test from 1-4, 5 times) and the result for each.
6. How many tests passed or failed (i.e. if the target service 124A or mail service 124C are vulnerable to perimeter security attacks or not) and what the results are, the decision making process of why that was concluded (For example during and HTTP flood when some unknown mechanism triggered with the perimeter security system 230 from London and USA all monitors were unable to GET the home page and the graph shows monitoring baselines in both locations as unhealthy, so the testing was stopped for that perimeter security test). This can also be according to location, since different locations may have different results.
7. Suggestions for hardening the site when viewing a particular target server (one of the production servers 126, for example web server 126A.
8. A level of severity may also be assigned to a specific result to highlight the importance of the data being reviewed by and administrator, e.g., high, low, and critical.
9. Mentioning other nuances identified by the testing e.g., how to optimize or enable a certain protection, e.g., enable sandbox protection in ESS 109 of the PSS 230, for all emails going to mail server 126C.
10. The decision-making process of the conclusion "vulnerable", "protected" or "partially protected" to a particular attack.
11. Viewing each attack per target if the target is vulnerable or protected with decision information, i.e., why the target was deemed vulnerable, for example the web server 126A was exposed to or protected to a particular web application banner grabbing technique.
12. A history of decision making for attack simulations with the conclusion per past attacks launched (for example on June the first 2014 a SYN flood against target X showed target X was exposed to a SYN flood attack vector. On July the first a SYN flood against target X showed target X was protected against a SYN flood attack vector). So, the entire history of past attacks with the various decision-making parameters are available to the administrator of the perimeter security testing system. A. Current perimeter security testing ongoing against specific targets.
B. Overall current monitoring stability status of various targets (for example healthy or unhealthy). Also, administrators are able to view which specific monitored protocols are in the healthy/unhealthy status for a particular target (for example HTTP GET or PING).

What Daemons can be Installed on the Coordination Device and What Other Characteristics does the Coordination Device Have?

On the coordination device 220, the following daemons can optionally be installed. This is only an example list and potentially any network service can be installed:

API communication daemon, syslog service, HTTP daemon, HTTP daemon with virtual hosts, HTTPS daemon Vulnerable HTTPS daemon, FTP service, DNS service, SMTP service.

This list does not include all potential services and this will grow with the evolution of new application and networking services as well as customized software created within the organization. Essentially any socket that accepts a network connection can be setup on the coordination device 220 and included with it any higher level application. An SNMP or similar daemon can also be installed to get logs from various network devices, for example from the coordination agents 222 or perimeter security mitigation devices 109, 250, 252, 254, 256, used to gather configuration changes of devices in the network. A daemon handling coordination agents 222 traffic is required on the coordination device 220. In some instances, the coordination device 220 may also run a local coordination agent 222X for analysis on pre-attacks towards services (for example service 124A that is hosted on the coordination device 220). The coordination device 220 continuously analyzes and/or aggregates and/or passes data gathered from perimeter security attack simulations launched towards production services 124 (for example web service 124A or mail service 124C) for statistical analysis and/or decision making to be passed back to the monitor controller 200. The coordination device 220 can also gather data from coordination agents 222 regarding all production services 124 (which have a coordination agent 222 deployed), and sends the gathered data back to the monitor controller 200. The gathered data may be used to create baselines on the monitor controller 200 regarding things such as CPU utilization, TCP stack information or memory usage etc. (on each of the production servers 126 and/or services 124.). The coordination device 200 or coordination agent 222A can also be gathering or collecting generic data (e.g., with or without regards to specific sources) passively when simulated attacks are not being run. Such data is used for additional data analysis and decision making by the perimeter testing system. For example, understanding peak traffic to a particular target 126A during the week, can be done passively since all legitimate traffic sent by users 102, towards such target 126A is additionally copied to the coordination device 200 through the mirror port(s) 221 or coordination agent 222A.

Prior to perimeter testing being done, the monitor controller 200 communicates pre-attack information to the coordination device 220, such as what types of attacks are being launched against the production environment (internal network 120). This way, the coordination device 220 understands (from the content of the pre-attack information) what SRC IPs (from simulators 206), DST IP or FQDN name of production server 126, rate of expected packets (e.g., PPS), type of packets (e.g., PSH+ACK to port 80), attack length time (e.g., 60 seconds) etc. to monitor for on mirror port(s)

221 or self service, and also which traffic data to gather, and/or the time the attack is scheduled to end. Then when the attack is over the coordination device 220 can pass this information (the gathered data) back to the monitor controller 200 to make conclusions about if the perimeter security attack vector was successful or not against the particular target e.g. web server 126A. This signaling between the monitor controller 200 and the coordination device 220 is important for understanding how successful the attack vector was, i.e., how much of the attack passed through the currently deployed perimeter security system 230. For example prior to the simulators 206 launching an SQL injection attack against the web service 124A, the coordination device 220 is first informed by the monitor controller 200 about the attack specifics going to be launched (simultaneously the coordination device 220 may inform the coordination agent 222A if configured to do so), e.g., 1 SQL injection payload, to port 80, for 2 seconds targeting DST IP of web server 126A from source IP simulator-A 206A. The coordination device 220 begins monitoring source IP of the simulator-A 206A (also additionally the coordination agent 222A may do the same on the host on which coordination agent 222A is deployed) until coordination agent 222A is signaled by the monitor controller 200 the perimeter security testing for the Web application SQL injection is complete. At this point the coordination device 220 updates the monitor controller 200 that the coordination device 220 received the malicious SQL payload targeting the web server 126A port 80 from SRC IP simulator-A 206A. Additionally, the update may include any other information gathered from the coordination agent 222A via the coordination device 220 update or any other internal network 120 devices from which the monitor controller 200 is configured to receive updates/logs. This way, the monitor controller 200 understands how much attack traffic passed the perimeter security system 230 and how deep into the internal network 120 the attack penetrated. Where the protocol used to transfer malicious simulations from simulators 206 to production targets 126 and relevant services 124, are encapsulated in SSL/TLS or other encrypted traffic, the traffic will have to be decrypted on the coordination device(s) 220, in order to identify leakage for certain attacks, traffic can usually be decrypted by applying a private certificate/key or other decryption method on the coordination 220 device(s). Additionally, this may also apply when the ESS 109 is a CDN based protection with WAF controls. This is required in order to read meta data from packets where SRC IP or other data in the encrypted traffic is required for understanding of leakage calculations on coordination device(s) 220.

The coordination device 220 can also analyze network traffic to a very low level if needed. This can include parsing packets from layer 2 through to layer 7. This analysis feature can be used when analyzing traffic in real-time on the coordination device 220, and the resulting statistics can be viewed through the user interface by an administrator. This functionality may also be used for threat assessment calculations as needed. This functionality is useful when troubleshooting or when the production environment (internal network 120) is under a real-time perimeter security attack.
Application Programming Interface (API) to Integrate with Other Systems Based on Results or New Threats An API on the coordination device 220 can interact with various devices (elements, sub-modules of the) perimeter security system 230. The API can query devices that have been setup for querying. Gathering information from various perimeter security (mitigation) devices (components) 109, 250, 252, 254, 256 assists in minimizing the amount of traffic needed to trigger a particular event in the perimeter security attack mitigation, i.e., sending a minimal amount of traffic to trigger a particular perimeter security mitigation mechanism on a particular device, for example, on the internal network 120 perimeter security mitigation devices, which typically include devices (components) 250, 252, 254, 256. The gathering of information may help optimize perimeter security testing times. For example, if SYN flood protection is triggered (identified from a configured API query to the internal (network) perimeter security mitigation devices 250, 252, 254, 256) after 50 PPS of SYN flood traffic towards a specific target and the data gathered on the coordination device 220 from the simulator shows no packets were captured during the test (meaning attack completely blocked) and the health status for monitored services 124 was unchanged a conclusion could be made that a further iteration of perimeter security attack testing is not needed for SYN Flood for that port and target.

The API Controller 242 may also communicate with the simulator controller 204 and the monitor controller 200.
Interaction with Other Logs or Data from Other Systems During Test For enhanced reporting to administrators, logs can be used from systems in the organizations. Logs are not limited to only the perimeter security system (PSS) 230, but any other components such as firewalls, routers, IPs, and the like, to make smarter reporting available for the administrator.

For instance, if an attack is partially blocked logs can indicate that the administrator should tune a network device (for example a component of perimeter security system 230, such as router 106) to strengthen the current perimeter security attack mitigation strategy.

The gathered data and logs can also be used to enhance the threat level of low, medium, high, and critical.
Alerting (Notification) System Alerting can be provided in a dashboard (for example, a GUI used by an administrator of the perimeter security testing service) and can also be provided in other forms such as email or SMS message (if setup to do so). Alerting can include notification (including initiating notifications) regarding new weaknesses or other important messages the perimeter security testing system wants to inform the administrator about. The system can also be configured to send syslogs to SIEM systems. Alerts can be configured by the administrator on what alerts the administrator wants to see, including default alerting options. Preferably, at a bare minimum alerts should be shown in the interface to the administrator.

Referring again to FIG. 1, traffic, for example from the simulators 206, can be sent directly production services 126, port mirroring can be used (for example in the router 106) to send a copy of traffic destined for the production servers (such as web server 126A) to the coordination device 220, Port mirroring is one way the coordination device 220 can receive a copy of all incoming traffic towards the production services 124. Additionally, traffic, for example from the simulators 206, can be sent directly to the coordination device 220. Port mirroring is used on a network switch to send a copy of network packets seen on one switch port (or an entire VLAN) to a network monitoring connection on another switch port. This is commonly used for network appliances that require monitoring of network traffic such as an intrusion detection system, passive probe, or real user monitoring (RUM) technology that is used to support application performance management (APM). Port mirroring on a Cisco Systems switch is generally referred to as Switched Port ANalyzer (SPAN) or Remote Switched Port ANalyzer (RSPAN), in AWS port mirroring can be done through VPC (Virtual private Cloud), on Google through packet mirroring from VPC (Virtual private cloud). Other vendors have different names for it, such as Roving Analysis Port (RAP) on 3Com switches, some cloud vendors may additionally have packet brokers to enable such functionality. The coordination device(s) 220 supports incoming traffic from one or more mirror ports (MP) 221.

A network tap is a hardware device that provides a way to access the data/traffic flowing across a computer network. In many cases, it is desirable for a third party to monitor the traffic between two points in the network. If the network between points A and B consists of a physical cable, a "network tap" may be the best way to accomplish this monitoring. The network tap has (at least) three ports: an A port, a B port, and a monitor port. A tap inserted between A and B passes all traffic through unimpeded, but also copies that same data to its monitor port, enabling a third party to listen. Either way, all services 124 being tested in the internal network 120 by the non-disruptive perimeter security testing system must have network traffic mirrored to the coordination device 220.

Coordination Device

Referring again to the FIG. 1, as described above, the monitor controller 200 and/or simulator controller 204 can communicate with the coordination device 220. The coordination device 220 is, for example, located, or otherwise deployed, wherever components of the PSS 230 may be located, this may include an organization's internal network 120 or external network 100, and typically protected by the perimeter security mitigation strategy deployed in the organization, implementation practicalities and considerations will normally dictate coordination device(s) 220 deployment locations. The coordination device 220 receives statistical and other information from coordination agents 222. Assuming the attack traffic bypassed the upstream PSS components and coordination device 220, with corresponding mirror port(s) 221 are working as expected, the coordination device 220 also receives attack traffic from the simulators 206 regardless of if the traffic is destined for coordination device 220 or one of the production services 124. The coordination device 220 can communicate bi-directionally with the monitor controller 200 and may also be configured to communicate with other third party devices such as but not limited to the simulator controller 204. The coordination device 220 can assist in calculating whether or not the production environment is exposed to a certain type of perimeter security attack. For example, with the gathered statistics of non-disruptive perimeter security testing traffic from the simulators 206 data captured towards one of the production services 124. In an alternative configuration, the coordination device 220 can capture traffic for later analysis or on the fly (real time, current) analysis.

Roles of the coordination device 220 include the following:

1. The coordination device 220 is primarily a data collector (e.g., of operation data including packets of traffic/mirrored traffic having traversed some or all of the internal network 120) for the monitor controller 200. In some cases, the coordination device 220 may interact with elements other than the monitor controller 200, for example, the coordination agents 222 such as coordination agent 222A or simulator controller 204. The coordination device 200 may also communicate with parts (modules) of the perimeter security system 230 strategy, for example, the ESS 109 or other internal perimeter security devices 250, 252, 254, 256 in the organization (e.g., on the internal network 120) (for example applying or removing a blacklist on the router 106 with a previous API setup between the coordination device 220 and the router 106).

2. The coordination device 220 can emulate one or more services 124 or daemons in the organization being protected by the perimeter security system 230, these services can be used for signaling between components or a service to receive an attack. Services 124 can include but are in no way limited to, HTTP, DNS, SMTP, SIP, and other services needed to provide value to users 102 and customers. The services 124 (for example the web service 124A or the mail service 124C) are services that an organization needs to provide to the users of the organization's infrastructure. For example, if a web service 124A is running on a web server (not shown) in the organization's production environment (internal network 120), a web service daemon would be setup on the coordination device 220. Setting up a web service daemon is represented in the current figure by the service 124A on the coordination device 220. A similar scenario (emulation) would happen for other available services (for example, the DNS node 124B, and the mail service 124C). In this way an alternative in a pre-attack is that the simulators 206 may target, with non-disruptive DDoS testing prior to other production servers 126, first the services 124 on the coordination device 220.

3. The coordination device 220 receives traffic from the simulators 206. The traffic is stored and evaluated by the coordination device 220 as needed per the pre-attack notification information. The results from the coordination device 220 are sent out from the internal network 120 back to the monitor controller 200 for evaluation and analysis. In a non-limiting example, prior to a perimeter security test the coordination device 220 is informed by the monitor controller 200 to expect "100 PPS of type SYN flood from simulator nodes 206A and 206N SRC IP's, to port 80 for 10 seconds, towards target IP of the web server 126A". Having this pre-attack notification information, when the perimeter security test is completed, the coordination device 220 will then inform the monitor controller 200 of received data, for example "X packets, to port 80, with destination IP of web server 126A". The monitor controller 200 can then make conclusions of how successful the DDoS testing was against web server 126A, and if web server 126A is protected or unprotected against the SYN flood). The coordination device 220 may also signal to the coordination agents 222 that non-disruptive DDoS testing is about to start (in conjunction with the DDoS attack specifics), the information in this signaling to the coordination agents 222 may include some of the pre-attack notification information provided to the coordination device 220. Pre-attack notification information is sent to the coordination device 220 regardless of if the perimeter security testing being done is towards the coordination device 220 or towards one of the production servers 126.

4. The coordination device 220 receives various attacks from the simulators 206. The attacks can include high rate and low rate floods, web application attacks, DDoS attacks, phishing attack simulations, exploitation attempts, scanning attacks, malicious payload transfer, or other cyber attacks originating on the internet 100 being sent towards production 120 servers 126 or services 124. The coordination device 220 will receive traffic destined both for production web services 124 (for example 124A, 124B) via port mirroring and destined toward the coordination device 220 where required.

5. The coordination device 220 can pool data from the perimeter security devices (components) 109, 250, 252, 254, 256 (e.g., the ESS 109 deployed on the external network 100 as a perimeter security device) and coordination agents 222 and also aggregate or analyze in real-time received network traffic.

6. Typically, the coordination device 220 collects information from the coordination agents 222. The coordination agents 222 collect information about the services 124 with which the coordination agents 222 are deployed (for example, coordination agent 222A collects information regarding web service 124A (for example TCP stack information, CPU utilization, number of open Apache processes etc.), and the coordination agent 222B collects information about DNS node 124B). Combined information from the coordination device 220 can then be passed to the monitor controller 200 and/or the simulator controller 204. Information from coordination agents 222 can be used to determine the health and status of the system. The coordination device 220 can communicate with both the simulator controller 204 and the monitor controller 200.

Coordination Agents

The perimeter security testing system may include one or more coordination agents 222 deployed on one or more productions servers or the coordination device 220 on an organization's internal network 120. The coordination agents 222 report statistics regarding operation and status of the server on which the coordination agent is deployed. Reporting includes, but is not limited to, TCP stack information, process information, CPU utilization, memory utilization, and the like. Normally the coordination agents 222 report to the coordinating device 220. The statistics gathered by the coordination agents 222 may be used to understand the stability of the particular device or server on which the reporting coordination agent is deployed. The coordination agents 222 continually report operation data back to the coordination device 220 (which in turn reports operation data back to the monitor controller 200), to subsequently create baselines/thresholds on the monitor controller 200.

In an alternative configuration, the perimeter security testing service can be implemented only with coordination agents 222 (without the use of the coordination device 220). In this case, communication is directly between the coordination agents 222 and the other devices (such as the monitor controller 200), as opposed to the preferred configuration of communicating via the coordination device 220.

Monitor Controller

The monitor controller 200 is a logical controller (node, device), which commands one or more monitors 202 to start or stop sending various monitor traffic towards the organization's production servers or the coordination device 220. The monitor controller 200 assists in creating statistical information baselines about how stable the production servers 126 are, or how stable the coordination device 220 is. The monitor controller 200 controls what monitors 202 are started, with which cloud provider (node provider) and how many. Some of the information the monitor controller 200 will tell the monitors may include but not limited to, how frequently to send a probe network packet to the monitored production server or coordination device 220 services 124, what type of packet to send e.g. HTTP GET packet or PING, and what metric to report back to the monitor controller. The monitor controller 200 can be supplied with the pre-attack notification configuration information as a source for commanding, controlling, and monitoring the monitors 202 (for example monitor frequency). The monitor controller may also be utilized to initiate and control API controller 242 requests, diagnostic monitor(s) 240 and control when diagnostic procedures should happen and which diagnostic monitor(s) should be involved. Additional or other logical functions for the overall system may be implemented on the monitor controller 200.

Monitors

The testing system includes one or more monitors 202 (202A-202N) and diagnostic monitors 240 (240A-240N). Monitors are nodes (devices) that are instructed by the monitor controller 200 as to what types of network probes to send and to which targets. Typically, there is a multitude of monitors 202 monitoring production servers or the coordination device 220 emulated services 124E.

Diagnostic monitors 240, send similar traffic towards production servers 126 or services 124, in order for the coordination device(s) 220 to ascertain the extent to which mirror port(s) 221 are functioning. For example, if twenty-five legitimate probes are sent to web server 126A, the target of the attack, and twenty-five probes are seen on coordination device mirror port 221, the mirror port(s) 221 can be confirmed to be operating at 100% reliability. This will avoid the possibility of a false negative wherever this type of confirmation has been completed on all relevant coordination 220 device(s), prior to a perimeter attack being launched by one or more simulators 206.

Monitors 202, gather various traffic statistics and other data (for example, identified mitigation traffic sent by a mitigation device like SYN cookie protection) to send to the monitor controller 200. The monitor controller 200 can use this gathered data for decision making, in particular regarding the health and status of the organization's production environment (internal network 120) or targeted web server 126A. The monitors 202 can be used to understand the system stability status view from the external network (Internet 100). Additional elements can contribute to this understanding and are reported to the monitor controller. For example, the coordination agents 222 generally report to the coordination device 220, which in turn reports to the monitor controller 200. The reported data from the coordination agents 222 can then be used by the monitor controller 200 to assist in evaluating the health and status of the system (production environment, e.g., including the production network 120 and components deployed along the production network 120).

Similar to the above-described operation of monitors 202, the simulators 206 generate attack test traffic towards both the coordination device 220 and other servers on the internal network 120. Other servers include devices and nodes such as a web server 126A running the web service 124A, a mail server 126C running the mail service 124C, or a database server 126D configured with database service 124D.

Traffic generated by the simulators 206 can include Web attacks. Phishing attacks, DDoS attacks, Malware attacks, e.g. SQL injections, UDP floods, malicious attachments, or any other cyber attack patterns. Attack from the simulators 206 is sent in a predictable way to the coordination device 220 or other internal network 120 servers (also known in a predictable way to the coordination device 220, the coordination device 220 typically knows the non-disruptive diagnostics or testing attack specifics, which the coordination device 220 gets preferably from the monitor controller 200, prior to the attack traffic being launched towards the target of the planned attack. In some cases, the coordination agents 222 will also receive advanced notice of non-disruptive testing attack about to be done and when the non-disruptive testing attack is complete, since the coordination agents 222 may also alter behavior during non-disruptive testing).

Simulator Controller

The simulator controller 204, also referred to in the context of this document as a "traffic simulator controller", contributes to governing attack traffic should be launched against the targeted environment. The simulator controller 204 is a logical controller (node, device), which commands one or more simulators 206 to start or stop sending various diagnostic or attack traffic towards the organization's production servers 126 or the coordination device 220. Some of the commands the simulator controller 204 can tell simulators 206 include: when to start and stop sending traffic, what type or traffic to send, what rate to send the traffic at, how long to send the traffic for.

The simulator controller 204 can also communicate bi-directionally with the monitor controller 200 and can receive commands such as stop attack, start attack, configuration updates, etc. There are many commands that the simulator controller 204 can get instructions from the monitor controller 200, for example to stop a currently active attack, because the targeted system is detected as unhealthy. This communication between the monitor controller 200 and simulator controller can avoid disruption to the targeted network. Alternatively, the simulator controller 204 can also communicate with the coordination device 220.

Simulators

One or more simulators 206A-206N are nodes (devices) that launch attack simulation traffic (or attack traffic). The simulators 206 receive commands mainly from the simulator controller 204. The received commands include, but are not limited to stop attack or start a certain type of attack for a certain amount of time at a certain rate against a specific target (perimeter security testing attack parameters). The simulators 206 may also report data back to the simulator controller 204 and read responses from the targeted network undergoing the simulation. Examples of responses are SYN cookie challenges or ICMP replies. Simulators 206 can be set to send an exact amount of packets towards a production server (for example web server 126A) or to the coordination device 220 for an exact amount of time. Signaling between the simulators 206 and the simulator controller 204 is preferably bidirectional. The simulators 206 may also be configured to stop all non-disruptive attack traffic, if communication (signaling) is lost with the simulator controller 204. This is done, for example, as a failsafe mechanism.

Operation of the Perimeter Security System (PSS 230) During a Simulated Attack (or Attack)

The point of the ESS 109, 250, 252, 254, 256 appliances and security service modules is to protect the target network (s) 120 servers 126 and services 124. All these security modules and appliances, commonly referred to as "perimeter security" or "perimeter security services". When all perimeter security systems (PSS) 230 are working together, they create a layered and multi-threat defensive barrier against the array of cyber-attacks targeting the production servers 126 and infrastructure network 120 originating on the internet 100. The outer layer of this defensive barrier may be referred to as the outer ring of security and the inner layer referred to as the inner ring of security. Alternatively, each ESS 109 module may have a ring of security, as may each appliance, for example WAF 254 may be its own logical ring of security protecting against web based attacks.

The verification system (perimeter security testing service) is typically configured on the external network (Internet 100) with two main controllers: the monitor controller 200 and the simulator controller 204. Both controllers (the monitor controller 200 and the simulator controller 204) communicate with each other for coordination purposes (to coordinate operation of the perimeter security testing service). The monitor controller 200 directs monitors 202. Simulator controller 204 directs simulators 206.

The monitor controller 200 and the simulator controller 204 have a bidirectional communication channel for coordinating activities. The coordination device 220 has a communication channel with at least one of the controllers (monitor controller 200 or simulator controller 204) for coordinating monitoring and simulation activities.

The coordination device 220 is generally deployed in the de-militarized zone (DMZ) and can see (monitor) all traffic from the Internet 100 entering the internal network 120 (for example traffic towards the production servers 126).

All traffic coming from the monitors 202 or the simulators 206 should traverse the perimeter security mitigation strategy deployed 230. Traffic from the simulators 206 can be analyzed or received by the coordination device 220. Traffic coming from the monitors 202 can reach the services 124 being monitored. As described elsewhere, the coordination device 220 may be configured with services 124 and/or coordination agents 222.

The monitors 202 generate traffic towards both the coordination device 220 and other servers on the internal network 120. Other servers include devices and nodes such as a web server running the web service 124A, a mail server running the mail service 124C, or a database server configured with database service 124D. Traffic is sent in a predictable way to either the coordination device 220 or other internal network 120 servers or the coordination agents 222.

The coordination device 220 records all traffic generated from the simulators 206. Traffic is recorded by the coordination device 220, regardless of whether or not the target of the traffic from the simulators 206 is generated towards a production server 126 (for example, web server 126A) or the coordination device 220.

The monitor controller 200 validates that the (internal) services 124 and/or the coordination device 220 is stable prior to the simulator controller 204 signaling to the simulators 206 to send perimeter security simulated attack traffic. The monitor controller 200 decides if the targeted services 124 (for example 124B) are stable by utilizing information gathered from the monitors 202 and/or the coordination device 220.

Prior to beginning a test (attack on the internal network 120), the test is designed or selected, typically by an administrator user or default settings in the system. User interaction, in particular for an administrator to configure the system can be considered a user interaction module (not shown in the figures). For example, the user interaction module 102 can be configured on a computer separate from, or on one of the monitors (monitor controller 200, simulator controller 204, monitors 202, simulators 206, coordination device 220), or another local or remote computer device. For simplicity of this description, a preferred embodiment is where the user interacts via the user interaction module installed on the monitor controller 200. The desired test of the organization's perimeter security mitigation 230 is characterized by pre-attack notification information regarding the parameters of the test to be conducted. Parameters can include, but are not limited to one or more types of attacks to be launched, when each type of attack will be launched, and parameters of each type of attack such as begin time, end time, amount, size, speed, repetition, location, and the like. Typically, the monitor controller 200 sends the pre-attack notification information to all appropriate devices, normally the monitor controller 200, the simulator controller 204, and the coordination device 220. Subsequently, the monitor controller 200 sends the appropriate information to the monitors 202 to monitor the test/change monitoring frequency, the coordination device 220 sends the appropriate information to the coordination agents 222 to monitor the test/change monitoring frequency, and the simulator controller 204 sends appropriate information to configure appropriate simulators 206 to be prepared to generate the non-disruptive perimeter security testing attack.

When the monitor controller 200 deems the target (for example, mail service 124C, coordination device 220, or web service 124A) is stable, the monitor controller 200 will signal to the simulator controller 204 to begin sending traffic towards the internal network 120. The simulator controller 204 will signal to simulators 206 to begin sending traffic according to the specification (pre-attack notification information) previously sent by the simulator controller 204.

During the time that the simulators 206 are sending traffic towards the internal network 120, if the monitor controller 200 detects any stability issues with the monitored services 124 or coordination device 200, the monitor controller 200 can make the decision to alter or stop the simulators' 206 traffic. This can be done by signaling from the monitor controller 200 to the simulator controller 204. In turn, the simulator controller 204 notifies the simulators to alter or stop the traffic being generated by one or more simulators 206. An alternative setup may be that the monitor controller 200 may signal directly to the simulators 206 directly to start or stop the perimeter security (simulated) testing attacks.

The simulators 206 may also stop sending traffic if signaling is lost between one or more simulators 206 and the simulator controller 204. The simulators 206 have the ability to terminate sending traffic autonomously. For example, in a case where signaling is lost between simulator-A 206A and the simulator controller 204, simulator-A 206A can make a decision, independent of other system devices, to terminate sending traffic.

Generating Baselines

Monitors 202 send traffic probes through the perimeter security (mitigation) system (PSS) 230 (for example, via the ESS 109, the router 106, and/or the other perimeter security (mitigation) devices (components) 250, 252, 254, 256) to services 124. The probes facilitate verification of response rates both when the simulators 206 are generating traffic and when the simulators 206 are not generating traffic (idle). Using this method, the monitor controller 200 knows what a normal/healthy response rate from services 124 and an unstable/unhealthy response rate from services 124 looks like. In other words, the monitors 202 can use probes to characterize the normal, stable, operational, defending, unstable, and crippled status of the internal network 120 and/or services 124. Monitor controller 200 utilizes monitors 202 to create baselines to understand and differentiate between normal responses and unstable/unhealthy responses.

A current baseline is one piece of data that allows the monitor controller 200 to make decisions since the baselines are determined prior to testing (adjusted with previous monitoring, using operation data from either coordination agents 222 or monitors 202) ranges of stability/health levels. Decisions made by the monitor controller 200 could cause signaling to occur to the simulator controller 204, the monitors 202, or the coordination device 220. Baselines are normally stored on the monitor controller 200. Baselines can indicate one or more services 124 are currently unstable or down (unavailable). Baselines are a constantly updated running average or some other measurement used to be able to identify current normal (stable/healthy) service 124 statuses and also be able to identify current abnormal (unstable/unhealthy) service 124 statuses. Multiple baselines may be created for a single service, for example ICMP response time per minute, per hour, per day or per week. Baselines are then utilized to understand if a service has become unstable based on how far the response time has deviated from the response time's normal/stable threshold. For example, if the normal baseline for ICMP response (for a particular monitored target) prior to a non-disruptive DDoS test being performed is 100 milliseconds (regardless at which monitoring frequency the response threshold was recorded at) and then the non-disruptive DDoS testing attack starts against the target and the baseline (preferably under a high level of monitoring frequency e.g. 3 seconds) changes to an ICMP response time of 200 milliseconds, the response threshold may be deemed to have deviated enough to now be considered that the current monitored ICMP response time is over the threshold of unstable and therefore the monitored service 124 is considered in an unstable state. Baselines are created both for monitors 202 data and the coordination agent's 222 data, just with coordination data the baseline being created is more for system specific information (e.g., TCP stack usage, free memory, possess information, and the like).

Testing Against the Coordination Device

Referring also to FIG. 1, an optional use case where the example is described below in which the simulators 206 first validate various perimeter security attack traffic against the coordination device 220. After the simulators 206 have finished perimeter security attack testing without an unstable/downed state being detected by the monitor controller 200 (with information gathered from monitors 202), then verification (attack test) takes place against production services 124 (for example 124A, 124C). This case includes the following steps:

1. Simulator controller 206 launches perimeter security attack traffic via simulators 206 against the coordination device 220 on the internal network 120. The coordination device 220 is validated against that particular attack (for example, a web attack with malicious payload).
2. Based on settings for the testing service, if the coordination device 220 is protected (the coordination device 220 settings are dynamic), then simulator controller 204 will signal to the simulators 206 to launch attacks directly against the production servers (for example, web server 126A and corresponding web service 124A).
3. The attacks are performed with simulator controller 204 settings (as per the pre-attack notification information), including such parameters as type of perimeter security attack traffic, rate of the attack traffic, iterations, and time to run. The simulator controller 204 may get its settings from the monitor controller 200 or any other similar configurations setting device.
4. During the time the production server (in this example web server 126A) is being tested by the simulators 206 all traffic is monitored by the coordination device 220.

The traffic can be monitored because all traffic in the internal subnet 120 has been mirrored to the coordination device(s) 220.

5. If the production service (for example web service 124A) or any other server (other than web server 126A, based on monitor controller 200 settings) are deemed to be in an unhealthy status, i.e., response time slowed down on the monitor controller 200 baselines (i.e., the response time is now at an unhealthy threshold), or coordination agent 222A (which updated coordination device 220, which updated the monitor controller 200) baselines, have deviated to unhealthy, the attack may be stopped (by the appropriate simulators 206) and the relevant threat status assigned.

6. A similar process as the above-described takes place for each type of attack run, first against the coordination device 220 and then against the actual production server (for example web server 126A). The perimeter security testing service can also be configured to refrain from testing (not perform testing/attacks).

Testing Via an ESS (External Security Service)

Also in FIG. 1, another example use case is now described in which the testing is done using the ESS 109. The simulator controller 204 signals simulators 206 to generate traffic to the internal network 120 via the ESS 109. As in the previously described cases, traffic may be sent first to the coordination device 220 and baselines generated. This case includes the following steps:

1. Simulator controller 204 signals to simulators 206 to launch perimeter security attack traffic targeting a production target 126 or 124, with all traffic sent via the ESS 109.
2. One or more, typically all, production servers (for example, web server 126A) are monitored at a rapid rate by the monitors 202 similar to other tests (cases). Any unstable status detected by the monitor controller 200 may lead to termination of the generation of test traffic by the simulators 206.
3. Checking of the production servers can be done one at a time (serially) or more than one simultaneously (in parallel).
4. Alternatively, the coordination device 220 can be validated by a simulation prior a production target 126, 124 being validated. If no instability is detected when checking the coordination device 220 the monitor controller 200 would continue on to validate production targets 124, 126.
5. For the decision making process of if the attacked service (for example web service 124A) is vulnerable or protected, the traffic sent from the simulators 206 can be sent via an ESS 109 or directly to the organization's internal network 120 (via the router 106).

Continuous Monitoring

Figure 2:
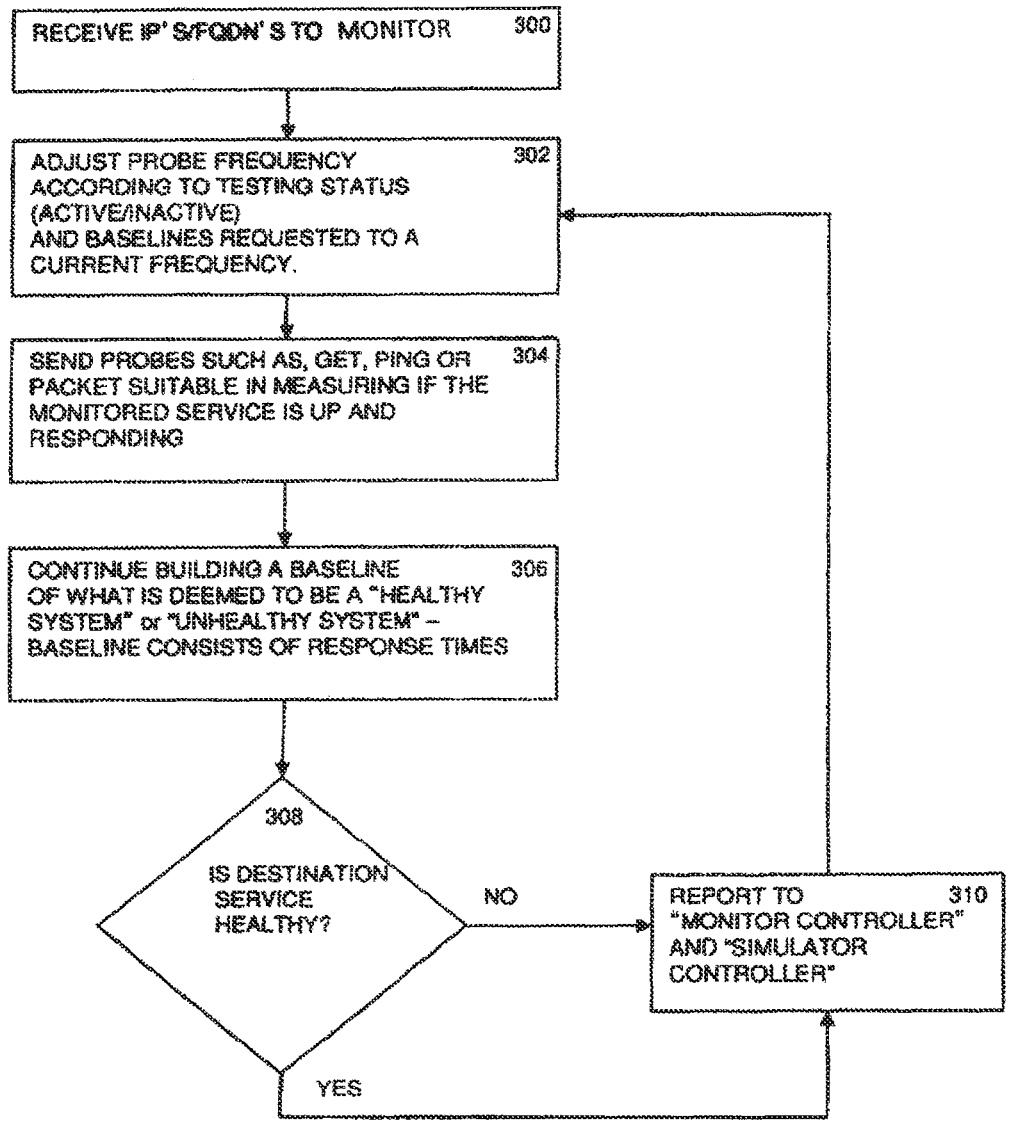
FIG. 2 is a flowchart of a method for the monitor controller to continuously monitor input IPs and FQDNs.

Refer now to FIG. 2, a flowchart of a method for the monitor controller 200 to continuously monitor input IP (internet protocol) addresses (also referred to simply as "IPs") and fully qualified domain names (or referred to simply as "FQDNs") in a registry of the monitor controller 200.

The IPs and FQDNs are normally production servers on which actual production services or the coordination device 220 service are running on the internal network 120 at the organization's site. If the perimeter security (mitigation) system (PSS) 230 is successful (sufficiently effective) the IPs and FQDNs should not be affected during testing (during an attack simulation). The monitoring cycle on the monitors 202 of the current figure can be sped up (increased) and slowed down (decreased) depending on whether there is a perimeter security test ongoing (an active test). For example, without a test ongoing a query every 20 or 30 seconds may be sufficient to monitor the services and create a healthy system baseline in the organization during normal operation. However, while a test is being performed the monitor controller 200 may instruct the monitors 202 to increase the monitoring cycle to be, for example, every 1 second to reduce the likelihood of any adverse effects on the production environment by detecting a deviation from the normal healthy baseline as quickly as possible. Depending on the requirements of the organization and configuration of the perimeter security testing service, the monitor controller 200 can decide how to handle the messages (information being returned by the monitors 202). The monitoring cycle is also referred to as "monitoring frequency" or simply "frequency". As monitoring is typically done using probes, the monitoring cycle is also referred to as "probe frequency". An increase in the monitoring cycle corresponds to a higher (quicker) frequency, and similarly a decrease is a lower (slower) frequency.

In step 300 ("steps" may also be referred to as "blocks" herein), the monitor controller 200 receives IPs and FQDNs to be monitored during a scheduled test (pre-planned attack) to monitor, or, ongoing monitoring (to continually update the baseline) without a scheduled attack. First, a baseline of normal response for at least one network service (for example HTTP GET response) on at least one IP and/or FQDN is generated (in the setup and ongoing phases). In step 302, the monitoring frequency is adjusted to an appropriate current frequency (of whether or not an attack is active or about to be active/inactive). As described above, if an attack simulation is about to take place, the monitoring frequency will be increased from a relatively lower frequency used during normal operation (for example, every 20 or 30 seconds) to a relatively higher frequency used during testing (for example, every 3 seconds). This increase is frequency during testing helps to avoid a delay in understanding if the system under test has become unstable. Optionally, one or more coordination agents 222 can be updated to speed up monitoring. In step 304, the monitor controller 200 initiates sending probes to the IPs and FQDNs at the relevant current frequency set in step 302. For example, the monitor controller 200 controls one or more monitors 202 to send probes to the targeted servers. Types of probes include, but are not limited to "HTTP GET", ping, and other known probes. In step 306, a baseline is created and/or updated using the information received from monitors 202. Examination of the baseline can be used to see if the target is healthy or unhealthy (service availability of production servers 124 adversely affected or not) or has become unhealthy for the particular service (network service) being monitored. In step 308, the current baseline is evaluated to understand if the current baseline is healthy or unhealthy. In step 310, regardless of the health status of the target being monitored, the current health status is reported to the monitor controller 200 and the simulator controller 204. Then monitoring continues by returning to step 302 and adjusting the monitoring frequency, as necessary and continues updating the baselines with information from the monitors 202. In step 310 the monitor controller 200 could alternatively signal the simulator controller 204 to terminate ongoing non-disruptive DDoS attack testing on the simulators 206. In step 300 other monitoring commands may be received by the monitor controller for example, adding/removing new IPs or FQDNs, starting stopping service monitoring etc.

As also described in this document, an alternative method of operation has the monitor controller 200 shutdown the simulators 206 by signaling the simulator controller 204. The shutdown may be necessary if the destination services 124 being monitored (by monitors 202) are continuously deemed unhealthy or unstable.

Checking Status and Decision to Continue Testing

Figure 3:
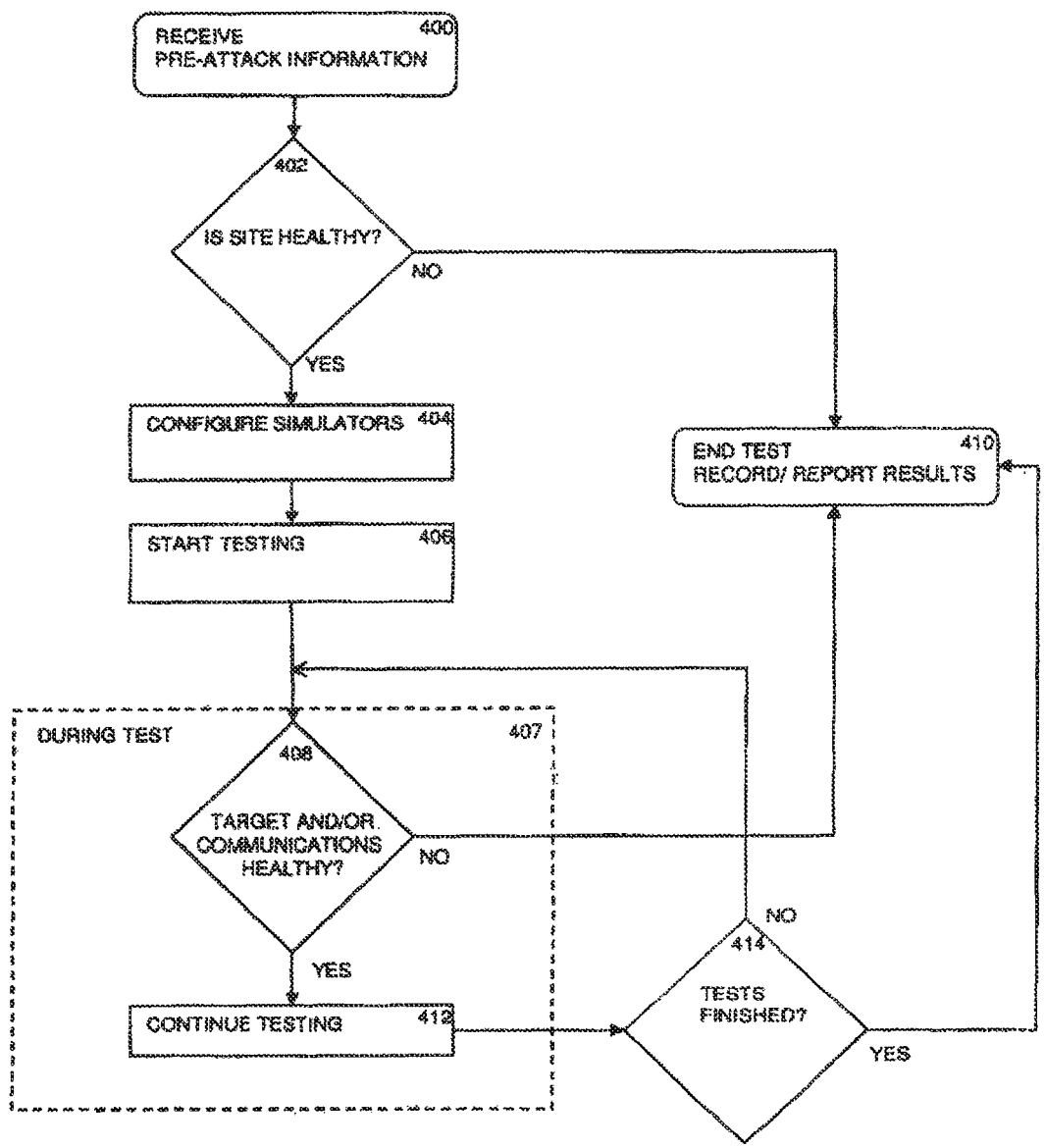
FIG. 3 is a flowchart of a method for checking status and deciding to continue testing.

In FIG. 3, a flowchart of a method for checking status and deciding to continue testing. In step 400, the simulator controller 204 receives the perimeter security attack simulation parameters to use for the relevant perimeter test (pre-attack notification information). In step 402, the monitor controller 200 is queried to validate system health status. The answer to this query in combination with various administrator-defined settings will decide if the perimeter security simulation (testing attack) will proceed, however preferably the monitor controller 200 will signal the simulator controller 204 to continue or terminate the ongoing non-disruptive perimeter security testing attack. If the attack will not proceed, the method continues at step 410 and the test is ended (in this branch, before the test even began). If the attack will proceed, the method continues in step 404 to configure the necessary simulators 206. Configuring the simulators 206 includes for each one or more simulators 206 sending appropriate pre-attack information (pre-attack notification information), preparing, and making ready to launch the perimeter security simulation attacks. After the simulators 206 are configured and prepared, then in step 406 perimeter security attack testing is started (at this point the coordination device 220 and/or the coordination agents 222, the monitor controller 200, have already been updated with pre-attack notification information).

During testing (shown as box 407) in step 408 the monitor controller 200 is checked for a change in system health status. The simulator controller 204 can also receive updates from or query the monitor controller 200 and can be used in step 408 to make a decision regarding system health. If the system health (health of the service 124 and/or servers such as web server 126A) is unacceptable (not healthy/unstable) and/or there is insufficient communication between components (communications are inactive or crippled between monitor controller 200 and simulator controller 204), the method continues to step 410 and the test is ended. This is another fail-safe mechanism to avoid downtime during non-disruptive testing, including, for example, DDoS testing. In contrast, if the system health (health of the services 124 and/or servers such as web server 126A) is acceptable (healthy/stable) and there is communication between components (communications are active between monitor controller 200 and simulator controller 204), the method continues to step 412 and testing continues. In step 414, a check is made if the pre-arranged tests (based on the pre-attack configuration information) are finished. If the tests are finished, the method continues to step 410 and the test is ended. If the tests are not finished, the method continues and returns to step 408. Either way, (from either step 408 or step 414) at step 410 when the test is ended, the testing results are recorded for use by the administrator, for example for reporting and to view through a user interface.

A similar procedure is performed by the Monitor Controller 200. Diagnostic Testing Monitors 240A-240N, and one or more simulators 206, when the health/stability of the target is monitored in association with a diagnostic test.

Figure 4:
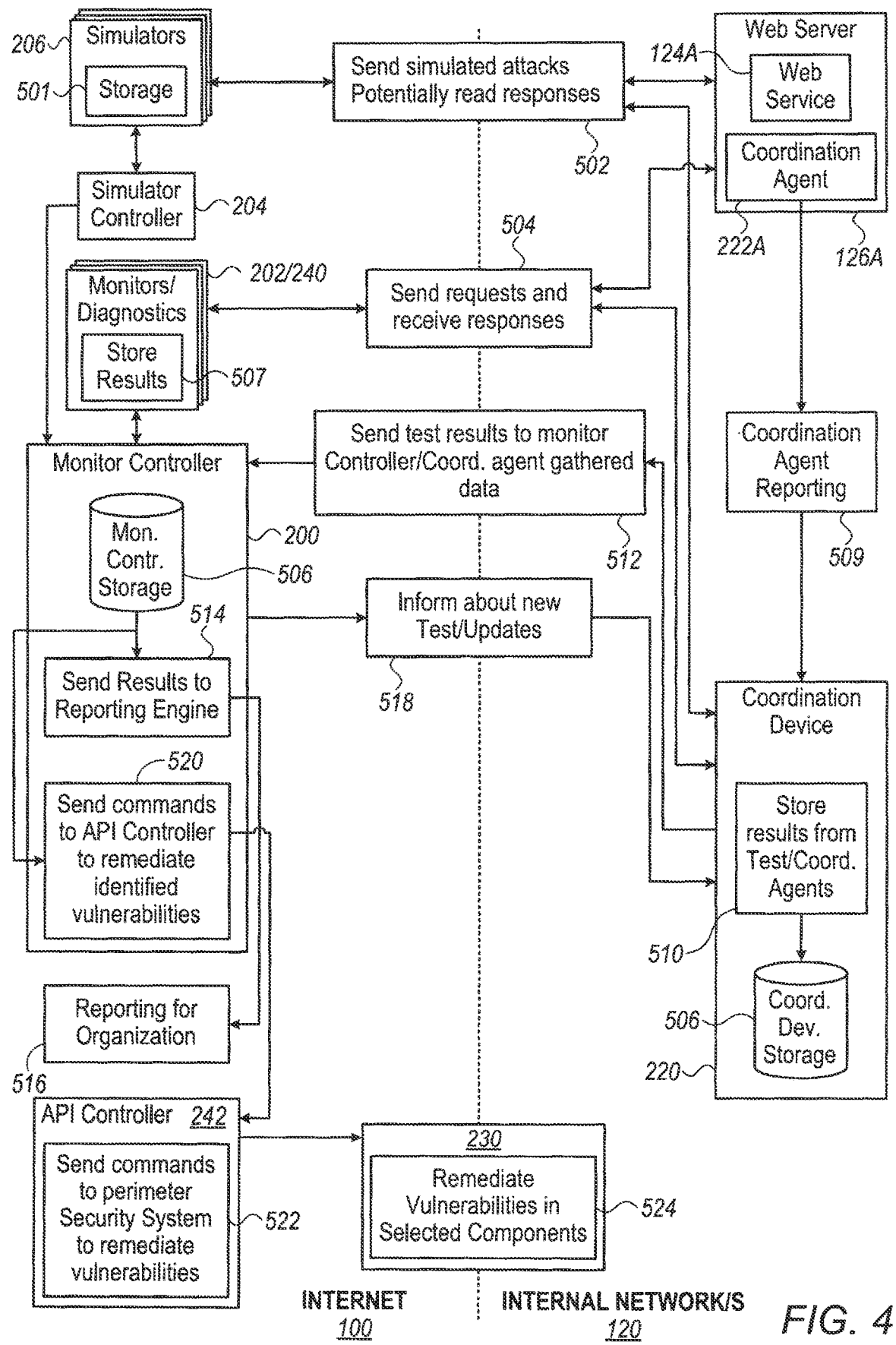
FIG. 4 is a simplified diagram showing interaction of perimeter security testing service elements.

Interaction of Perimeter Security Testing Service Elements During a Simulated Attack FIG. 4 is based on the topology of FIG. 1. FIG. 4 is a simplified diagram showing interaction of perimeter security testing service elements (devices of components of the PSS), shows a basic configuration of how the monitor controller 200 on the external network (Internet 100) and the coordination device 220 or one of the production servers 126, such as web server 126A, interact with each other, for example, during a simulated attack, subject to mitigation by the perimeter security system 230 and/or the perimeter security devices (components) 109, 250, 252, 254, 256. In general, results from the coordination device 220 are sent to the monitor controller 200 for further processing and reporting.

As described elsewhere in this document, simulators 206 send simulated perimeter security attacks 502 against the internal network 120, to components such as the coordination device 220, or services 124 on production machines, for example, production servers 126. Simulators 206 may be able to read some of the perimeter security attack traffic responses, this can be used to understand more about how that particular attack traffic is being mitigated, or not mitigated). Optional storage 501, respectively on the simulators 206 may be used to store data. The simulator controller 204 could also optionally have local storage data (not shown).

Coordination agents 222, such as coordination agent 222A, typically report 509 to the coordination device 220. Reporting is preferably as close to real-time as possible (during non-disruptive perimeter security attack testing), and sent to the monitor controller 200 for updating the particular coordination agent's 222A baseline.

The coordination device 220 stores results from tests 510 in a local coordinator device storage 506 during testing. After each perimeter security attack (from the simulators 206), the data gathered on the coordination devices storage 506 is sent to the monitor controller 200 for analysis and decision-making (for example was the perimeter security attack test successful or not). Regardless of success or not, if another non-disruptive perimeter security attack test takes place, the pre-attack information (transmitted from the monitor controller 200 to the coordination device 220) needs to be initiated once again.

Monitors 202 send requests (for example HTTP GET) and receive responses (HTTP response). For example, this is how health (stability) baselines are created for a particular service e.g., web service 124A, being monitored for a particular server, e.g., web server 126A, in the production network 120. Baselines for both monitors 202 and coordination agents 222 can be stored and updated on the monitor controller storage 508. When needed, the monitor controller storage 508 is queried to get the necessary data for decision-making (for example stopping an ongoing perimeter security attack test). In another example, if a perimeter security attack test is ongoing, and simulators 206 are sending (simulated) attack traffic 502 the monitor controller 200 may use all the latest data gathered from the coordination agents 222 (e.g. coordination agent 222B collected data on current CPU utilization, memory utilization etc. of the DNS node 124B) and also the latest data gathered from the monitors 202 (for example DNS query/response time is X ms) and make a decision on whether or not to inform the simulator controller 204 to tell the simulators 206 to stop the perimeter security attack testing traffic currently being generated to production node 124B.

Perimeter security attack test results are sent 512 from the coordination device 220 to the monitor controller 200. Gathered data results can include from operation data from coordination agents 222 and/or the coordination device 220, either before, during, or after an attack (test).

The monitor controller 200 can inform 518 the system regarding new tests, send pre-attack information, pre-diagnostic information, update configurations, and send updated operation information (for example to adjust settings, increase monitor cycle time of coordination agents 222 or the coordination device 220) during perimeter security attack testing or diagnostic testing. The monitor controller 200 can also send commands 520 to the API controller 242 to remediate any identified vulnerabilities in the perimeter security system 230. The commands, once at the API controller 242, are sent by the API controller 242 to the perimeter security system 230 to remediate the identified vulnerabilities 522. Once the commands reach the perimeter security system 230, the vulnerabilities in the identified vulnerable components are remediated 524.

Both simulators 206 perimeter security attack test traffic data (if any and if enabled for analyzing potential mitigation mechanisms in place (e.g., SYN cookie challenge) and monitors 202 store results, for example monitors 202 store on respective result storage 507, and simulator controller 204 may also include storage (not shown).

The monitor controller 200 controls communication and signaling to and from monitors 202 and diagnostic monitors 240. Additionally, the monitor controller 200 collects information and operation data originating from diagnostic monitors 240A-240N, previously received and/or generated on the co-ordination device 220.

Results can be sent 514 to a reporting engine, for example at pre-determined times, as per the pre-attack configuration, or upon administrator requests via a user interface. Processing of results takes place on the monitor controller 204 or at another location, such as another element doing reporting for the organization 516.

Interaction of Simulator Controller and Simulators

Figure 5:
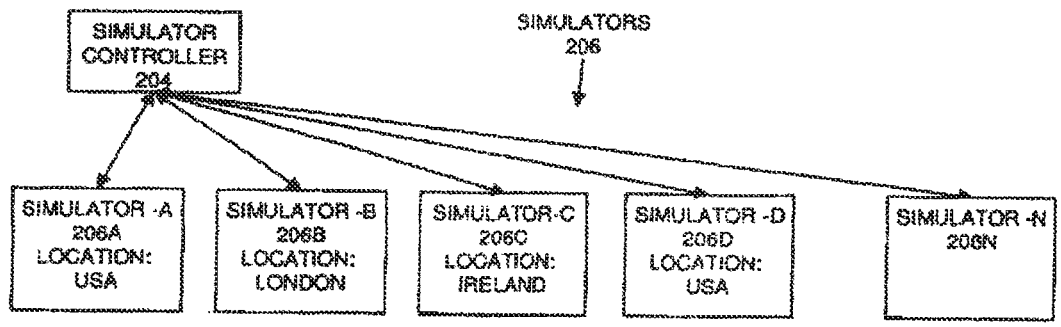
FIG. 5 is a diagram of interaction between the simulator controller and the simulators.

Refer now to FIG. 5, a diagram of interaction between the simulator controller 204 and the simulators 206. The simulator controller 204 and the simulators 206 initiate attack traffic generation from various locations around the world. This is done by starting (initiated by the simulator controller 204) one or simulators 206 in various physical locations, for example, Simulator A 206A in the US, Simulator B 206B in London, Simulator C 206C in Ireland, and, Simulator D 206D in the US. The simulators 206 are configured and controlled by the simulator controller 204 based on at least the pre-attack configuration information. If any of the simulators 206 are in the middle of a attack test generating traffic, and lose communication with the simulator controller 204, then preferably the simulator that has lost communication terminates generation of attack testing traffic. This termination is independent, in other words the simulator that has lost communication terminates attack testing traffic generation autonomously. That is, the specific simulator (such as Simulator A 206A) of the simulators 206 that has lost communication with the simulator controller 204 can terminate the attack test traffic with an independent decision not requiring communication with the simulator controller 204.

Using multiple locations (geographically dispersed) for attack test simulators 206 is helpful due to the fact that attack mitigation systems may take into account the geographic location of source traffic and make mitigation decisions based on this geographic location.

The simulator controller 204 is typically used for decision-making and orchestration of the attack testing simulators 206. The simulator controller 204 can receive and send signals and updates from and to the monitor controller 200, the simulators 206, and the coordination device 220.

Interaction of Monitor Controller and Monitors

Figure 6A:
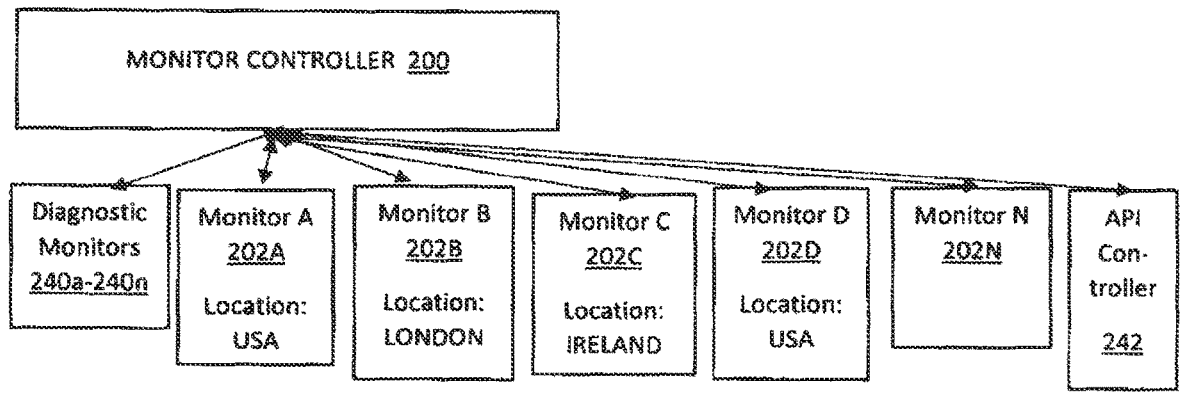
FIG. 6A is a diagram of interaction between the monitor controller and the monitor of FIG. 1.

Referring now to FIG. 6A, a diagram of interaction between the monitor controller 200 and the monitors 202, for attack testing traffic, and 240 for diagnostic testing traffic. The monitor controller 200 controls one or more of the monitors 202, 240 in various locations around the world or diagnostic monitors 240. For example, monitor-A 202A in the US, monitor-B 202B in London, monitor-C 202C in Ireland, and monitor-D 202D in the US. This would also hold for monitors 240a-240n, associated with the diagnostic testing traffic. Distributing the monitors 202, facilitates the monitor controller 200 creating accurate baselines. Because of the nature of perimeter security mitigation systems, monitoring during attack testing from monitors 202, from multiple locations, is important, and may be necessary to create accurate system status baselines, as well as real-time perimeter security attack termination decision-making. For example, if monitoring were to be setup only from London, and the particular perimeter security mitigation system being tested only allows clientele from the US and China to access the organization (internal network 120/services 124), then an incorrect baseline could be generated. In the example, as the perimeter security mitigation system does not allow connectivity from the geographic area of the monitor, probes from the monitor in London 206B would be blocked by the perimeter security mitigation system 230, the London monitor 202B would fail to respond, and an incorrect baseline may be generated. Another example may be that the non-disruptive perimeter security testing system knows that during normal time (a time when perimeter security testing is not being run) all monitor locations are stable (e.g., US, Europe, Asia). However, when under an HTTP flood (a perimeter security test), because of various perimeter security mitigation 230 mechanisms triggering (and previously seen in other perimeter security testing performed), monitors 202 in the US may move to an unhealthy/unstable status (because of the triggered perimeter security mitigation 230 mechanism) but other monitors (other than in the US) continue to be in a stable state. This would likely result in a decision being made to terminate the ongoing perimeter security attack traffic on the simulators 206. However, because this behavior was expected, the perimeter security testing system can be configured to continue the perimeter security testing until completion and not have a terminate action sent to the simulators 206.

The monitor controller 200 has a bidirectional communication channel with the monitors 202, 240. The monitors 202, 240 can send and receive data from the monitor controller 200. The monitor controller 200 can send and receive data from monitors 202, 240, coordination device 220, and the simulator controller 204. As with the simulators 206, the monitors 202, 240 may be configured to stop generating requests towards the monitored services (for example service 124A) if communication with the monitor controller 200 is lost. This decision of a monitor (for example, monitor-A 202A of the monitors 202) can be made independently by the monitor 202 (in this example monitor-A 202A).

Interaction of API Controller 242 and Components

Figure 6B:
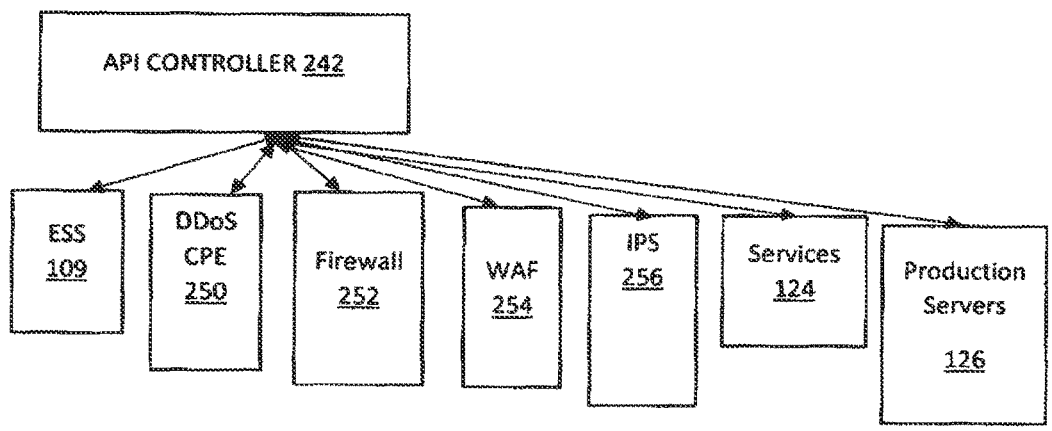
FIG. 6B is a diagram of interaction between the API controller and the perimeter security components of FIG. 1.

Referring now to FIG. 6B, a diagram of interaction between the monitor controller 200 and the API controller 242. The API controller 242, interacts, either directly or indirectly with components including, for example, the perimeter security devices 109, 250, 252, 254, 256, services 124 and production servers 126.

Figure 7:
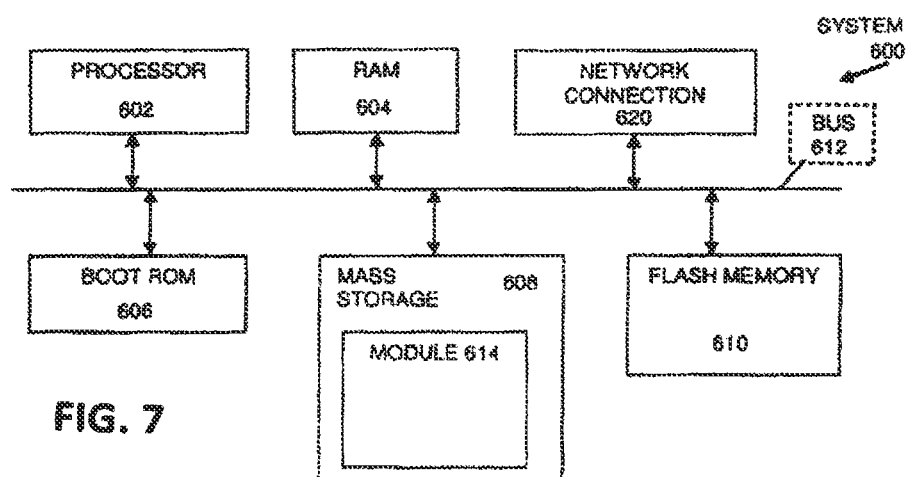
FIG. 7 is a high-level partial block diagram of an exemplary system configured to implement the coordination device.

FIG. 7 is a high-level partial block diagram of an exemplary system 600 configured to implement the coordination device 220 of the present invention. System (processing system) 600 includes a processor 602 (one or more) and four exemplary memory devices: a RAM 604, a boot ROM 606, a mass storage device (hard disk) 608, and a flash memory 610, all communicating via a common bus 612. As is known in the art, processing and memory can include any computer readable medium storing software and/or firmware and/or any hardware element(s) including but not limited to field programmable logic array (FPLA) element(s), hard-wired logic element(s), field programmable gate array (FPGA) element(s), and application-specific integrated circuit (ASIC) element(s). Any instruction set architecture may be used in processor 602 including but not limited to reduced instruction set computer (RISC) architecture and/or complex instruction set computer (CISC) architecture. A module (processing module) 614 is shown on mass storage 608, for example, and could be located on any of the memory devices.

Mass storage device 608 is a non-limiting example of a non-transitory computer-readable storage medium bearing computer-readable code for implementing the testing methodology described herein. Other examples of such computer-readable storage media include read-only memories such as CDs bearing such code.

The system 600 may have an operating system stored on the memory devices, the ROM may include boot code for the system, and the processor may be configured for executing the boot code to load the operating system to RAM 604, executing the operating system to copy computer-readable code to RAM 604 and execute the code.

Network connection 620 provides communications to and from system 600. Typically, a single network connection provides one or more links, including virtual connections, to other devices on local and/or remote networks. Alternatively, system 600 can include more than one network connection (not shown), each network connection providing one or more links to other devices and/or networks.

The system 600 can be implemented as a server or client respectively connected through a network to a client or server.

Figure 8:
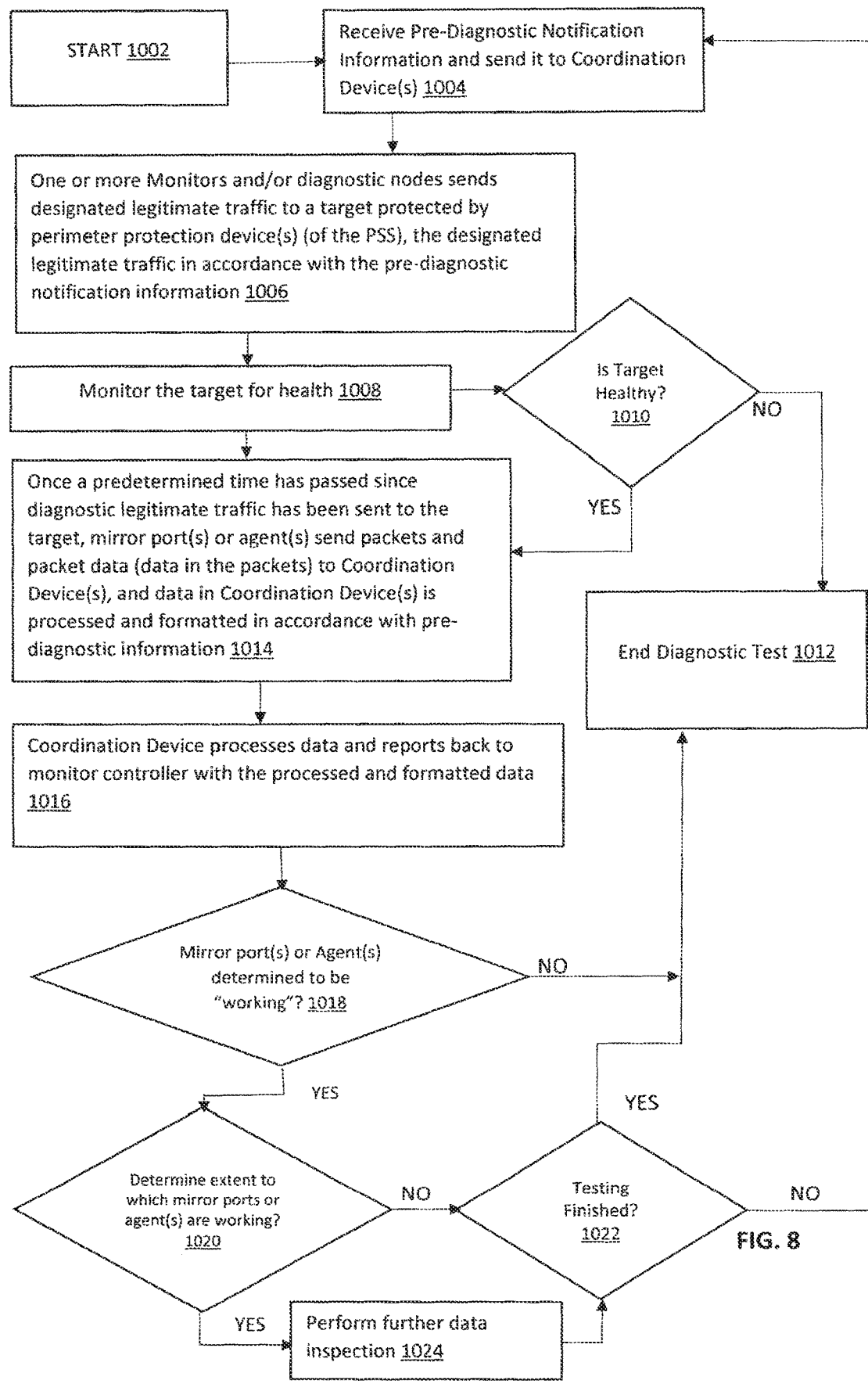
FIG. 8 is a flow diagram of a process for diagnostic testing of one or more coordination devices in the network topology of FIG. 1.

Turning to FIG. 8, the environment shown in FIG. 1 is usable in describing a diagnostic procedure (diagnostic testing procedure, diagnostic test, or diagnostic). The diagnostic procedure is used, for example, to determine operation of the mirror port (MP) 221, and the extent to which the mirror port 221 is operating. The extent to which the mirror port 221 is operating, should be known, in order to avoid false negatives. In the event the mirror port is not operating at all, or operating at a very limited capacity, such as receiving no or partial traffic, simulated packets sent from simulators 206A-206N, which reached a production target 126 may not have been detected at the mirror port 221, even though they may have not been blocked, i.e., successfully penetrated security ring of the upstream of one or more of the perimeter security devices 109, 250, 252, 254, 256. This results in a false negative determined by the monitor controller 200. Such a false negative may result in damage to a production server 126A-126D by real malicious or unwanted traffic.

An attack simulation (for example, of simulated attack traffic, validation, emulated attack, simulation, simulated attack, attack), includes but is not limited to, attack traffic of DDoS Attacks, web based attacks (e.g., SQL injections, Non-SQL injections, cross site scripting, fuzzing, version enumeration, dictionary based attacks, and the like), other brute force attacks, phishing attacks, website scraping, service scanning, host scanning, sending malicious files, exploits or data payloads, disallowed IP address or FQDN sources towards production servers and or services or towards other areas of the Internal network 120, which are expected to be mitigated by either one or more modules in the perimeter security devices 109, 250, 252, 254, 256.

The diagnostic procedure begins at START block 1002, where, the start of the attack simulation, is waiting to take place. Alternatively, another reason, to perform a diagnostic check, is for example, for the overall system, a particular component, may want to evaluate the stability of mirror ports 221 in the system at different points at some time, during which the general system is running. The process moves to block 1004, when the monitor controller 200 receives pre-diagnostic notification information including, for example, parameters as to diagnostic traffic (e.g., source IPs diagnostic nodes, DST IP, number of connections, start time, stop time, format to aggregate etc.), which the diagnostic monitor 240A and/or monitor 202A sends to the coordination device 220.

At block 1006, the diagnostic monitor 240A or monitor 202A (or one or more monitors 240A-240N, 202A-202N and/or diagnostic node(s)) sends designated legitimate traffic to a target, e.g., a production server 126, in the internal network 120, for example, the target protected by perimeter protection devices or components, i.e., of the PSS 230) in accordance with the pre-diagnostic notification information.

The process, typically in parallel, moves to block 1008, where the target is monitored for health, for example, by the monitor controller 200, analyzing request and return response times between a monitor and the target being within predetermined acceptable limits. Should a monitored time be outside of the acceptable limits, and therefore, not healthy, at block 1010, the process moves to block 1012, where the diagnostic testing ends. The actual ending is, for example, immediately after an unhealthy status for the target has been determined. This allows for operational traffic to continue without impacting the service level or creating any type of response slowdown or down time of the target. While this process is shown at this particular time, monitoring for target health can and most likely will occur anywhere and at most times along the process.

Returning to block 1010, should the target be healthy, the process moves to block 1014. At block 1014, the monitor controller 200, at a predetermined time after the diagnostic (legitimate) packet traffic was sent (the time of the sending being known from the pre-diagnostic notification information sent by the monitor controller 200), for example, on the order of milliseconds, but not longer than the order of seconds, the mirror port(s) 221 or agent (s) 222 send(s) packets and packet data (data in the packets) to the coordination device(s) 220. The coordination device(s) 220 processes and formats the mirrored data in accordance with the pre-diagnostic information. It is possible that mirror port(s) may have been sending from the start of 1002 to the coordination device 220 in order to not lose any data, though only the packets or data in packets specified in the pre-diagnostic notification at block 1004 will be analyzed at block 1014.

The process moves to block 1016, where the coordination device 220 reports (transmits) the processed and formatted data to the monitor controller 200. The process moves to block 1018, where the monitor controller 200 analyzes the diagnostic data, and determines whether the respective mirror port (MP) 221 or agent 222 is working (e.g., operational). If the determination is that the mirror port 221 is not working, the process moves to block 1012, where it ends. However, If the determination is that the mirror port 221 is working, the process moves to block 1020.

Optionally, the process may now move to block 1020, where the monitor controller 200 determines the extent to which the mirror port 221 or agent 222 is operational or working. Should this determination not be desired, the process moves to block 1022, where the monitor controller 200 determines whether the diagnostic testing procedure is finished. If yes, at block 1022, the process moves to block 1012, where the diagnostic testing ends. If no, at block 1022, the process moves to block 1004, from where it resumes as detailed above.

Returning to block 1020, the extent to which the mirror port (MP) 221 is working can be analyzed. This analysis occurs, for example, at block 1024. For example, from the input received from the mirror port 221, corresponding to a time and specific diagnostic packet traffic sent, as a number of packets that were mirrored from this traffic is determined. This number of mirrored packets is compared against the number of packets sent in the corresponding diagnostic traffic, this number of packets provided by the monitor controller 200. The difference between the numbers is the extent or percentage at which the mirror port 221 is operating. For example, it may be, that if during a diagnostic check, 100 packets were sent from monitor 202A towards production server 126A, and the coordination device 220 received 80 packets from its attached mirror port 221, it may be determined that the mirror port 221 is operating at 80% reliability.

Returning to block 1020, should it be desired perform a further data inspection to see the extent the mirror port is working, the process moves to block 1024. At block 1024, and extended diagnostic may be run in accordance with these subprocesses. In the extended diagnostic, the subprocesses of blocks 1004 and 1016 are run for times on the order of minutes, to look at the extent of the operations by the mirror ports 221 over a longer time period, than the regular diagnostic. From block 1024, the process moves to block 1022, where it resumes as detailed above.

The aforementioned diagnostic tests are run during normal operation of the target, and the target remains on-line and functional to regular traffic during the diagnostic testing. There are typically not any cut-off commands (stopping such diagnostic test) sent for deviation of normal baselines or other system reasons during or just before such diagnostic tests. Accordingly, the target need not be down during the time the diagnostic testing is occurring.

Figure 9:
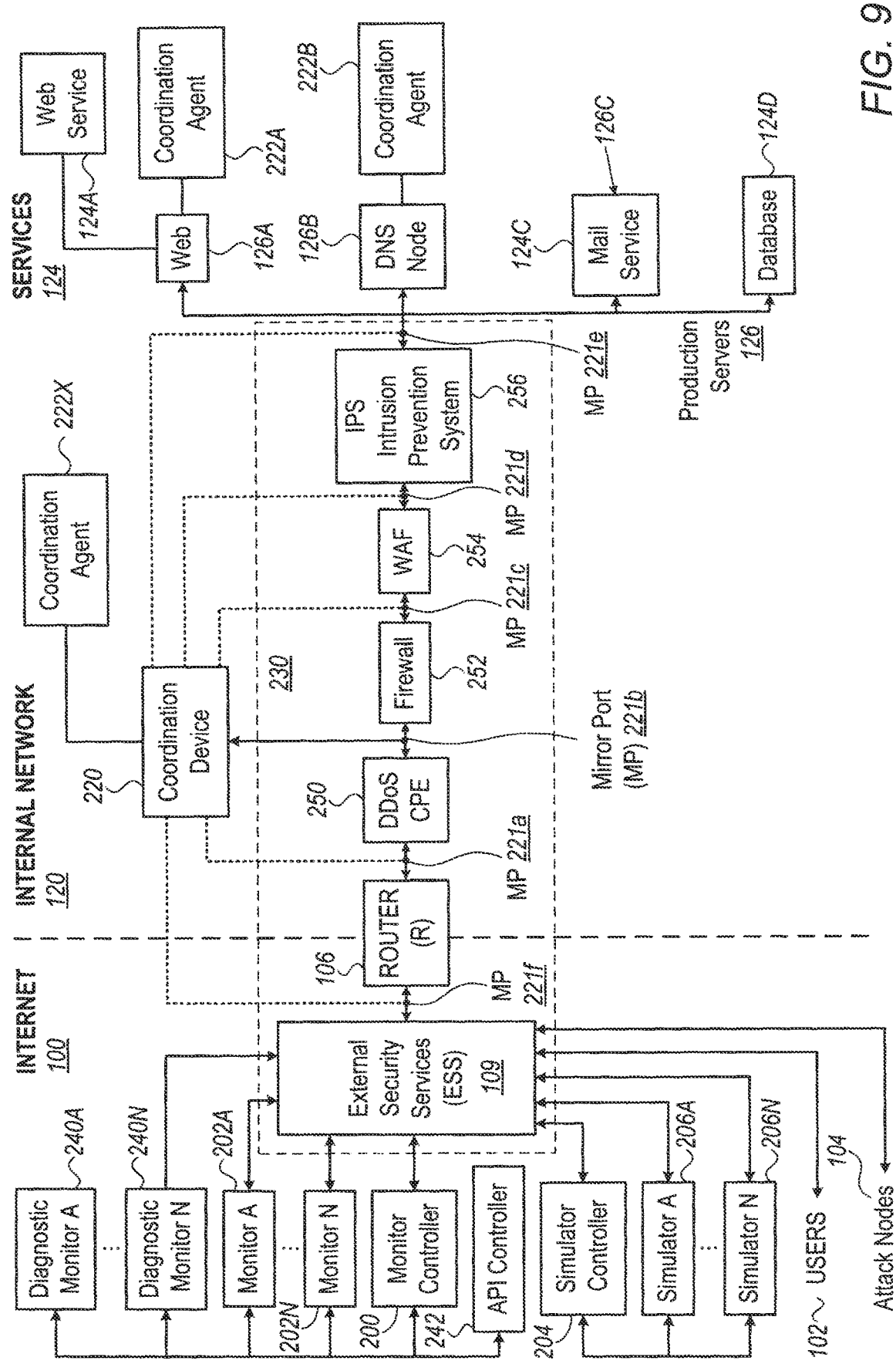
FIG. 9 is a diagram of another network topology used to show another disclosed embodiment.

FIG. 9 shows a system set up for validating multiple profiles at a single time, by looking at the depth an attack penetrates (e.g., downstream depth of penetration of an attack) across multiple technologies or security protections otherwise known as security rings, i.e., each mirror port (MP) 221 or a combination of mirror ports 221 (e.g., 221a-221f) may be construed as a security ring, e.g., firewall 252 is the inner security ring and the ESS 109 is the outer security ring. Through validating multiple security rings at the same time (or at different times), the depth of an attack penetrating from the internet 100 through to the internal target 126 can be known. For example, this is one way of understanding the depth of an SQL attack targeting a target 126 penetrated the outer and inner security ring, all the way up to, and even beyond, the IPS 256. Here, the Internal Network 120 and partially into the external network 100, is configured such that a mirror port 221a to 221f is positioned between each of the perimeter security devices or components (of the PSS 230, as shown in the broken line box) 109, 250, 252, 254 and 256, with each corresponding mirror port 221a-221f linked to the coordination device 220, or alternately different, e.g., multiple, coordination devices (not shown). The coordination device(s) 220 communicate with the monitor controller 200. After an attack simulation has been completed by simulator(s) 206, the depth of penetration would be known based on what traffic each of the mirror ports 221 captured from the origination attack traffic just after each security component deployed, for example, based on the position of the respective mirror port 221a-221f. For example, If the attack traffic was identified to have bypassed ESS 109 and DDoS CPE 250 and Firewall 252 but no attack traffic was identified at the WAF 254 or IPS 256, then the rings of ESS AND DDoS CPE and Firewall security rings can be concluded to be vulnerable, and the WAF and IPS protected, i.e., the depth of penetration is up to and until the WAF 254.

The mirror ports 221a-221f may be for example, span ports, tap ports or any other component which makes and provides a copy of the through-passing traffic, to the coordination device(s) 220. Additionally, the coordination device 220 can obtain logs from a log management system or coordination agent 222A. Based on the log information gathered, monitor controller 200 can change diagnostic test results or simulation results (e.g., simulated attacked, discussed in FIGS. 11 and 12), which were run previously or currently running. This log information may be gathered by the coordination device 220, sent to the monitor controller, or via the API controller 242, sent to the monitor controller 200. With log information gathered and processed, the API controller 242 or other processes detailed herein may be triggered. For example, updating via the API controller 242 the ESS 109 and the other the perimeter security devices 250, 252, 254, 256, and/or the target servers (e.g., one or more of the production servers 126) via the respective coordination agent (CA) 222, as detailed below.

The traffic used for the aforementioned depth (depth of penetration into the internal network and/or PSS 230) analysis is for example, monitor traffic, sent from one or more of the monitors 202A-202N, as discussed above, intended for one or more of the production servers 126. Alternatively, the traffic used may be from simulated attack traffic originating from simulators 206A-206N toward the internal network 120 service or node.

Figure 10A:
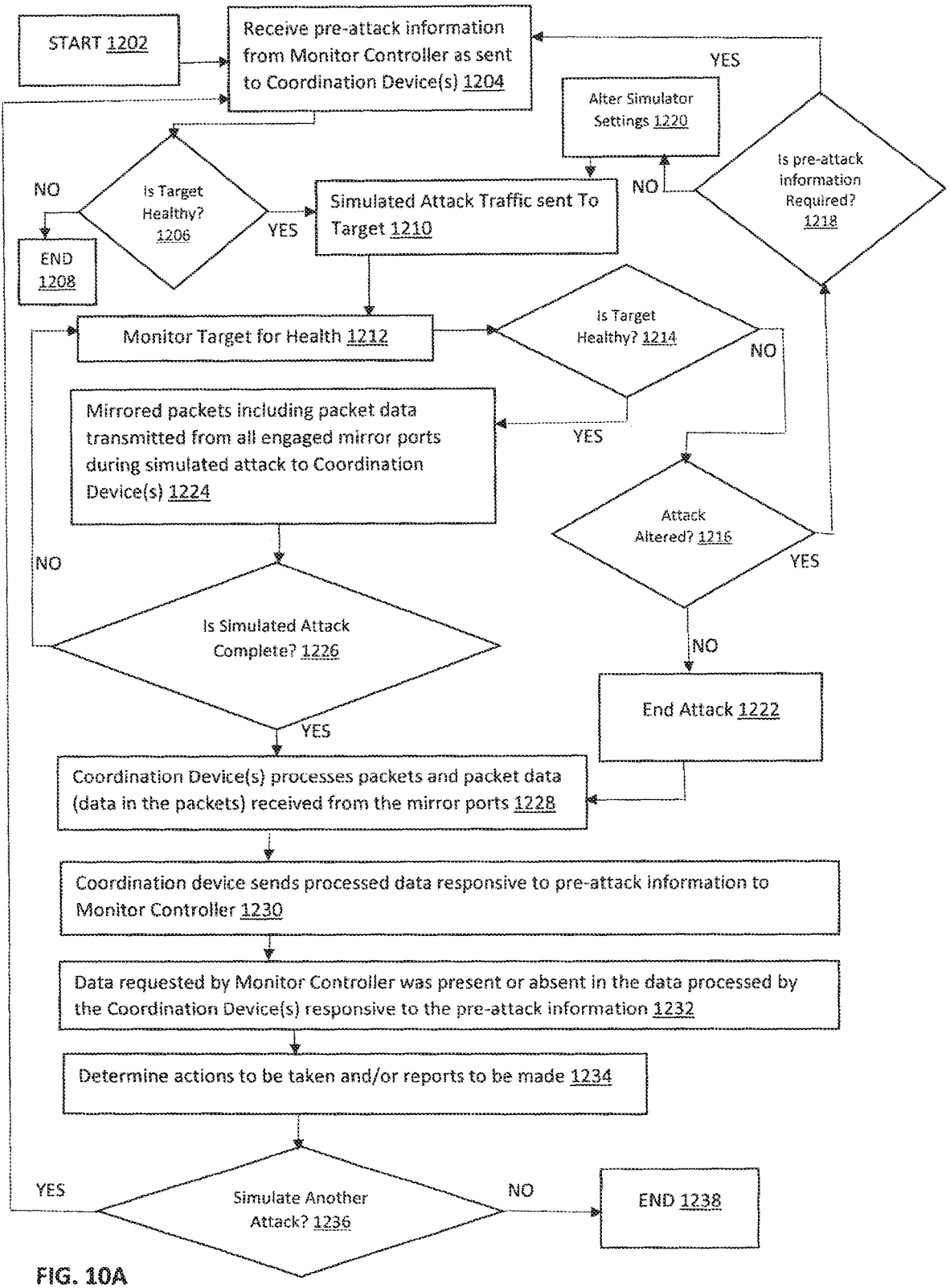
FIG. 10A is a flow diagram detailing a process in accordance with a disclosed embodiment.

In FIG. 10A, a flow diagram of the process for multiple profile analysis is shown for operation of the system of FIG. 9. At a START block 1202, the type of attack traffic is selected along with the simulation attack to a target using the attack traffic, that will be run. At block 1204, pre-attack information is sent from the monitor controller 200 to the coordination device 220, providing the details of the attack and the attack traffic. Also, the pre-attack information typically includes queries, requests, and the like, as to aspects, features, and the like, as to the mirrored traffic, that are to be watched and/or examined in the mirrored traffic by the coordination device(s) 220, and reported by the coordination device(s) 220 to the monitor controller 200.

The process moves to block 1206, where an initial health check is made for the target, e.g., target production service 124 and/or production server 126. The health check may be, for example, in accordance with the health check shown in FIG. 3 and its description above. Should the target be determined not to be healthy, the process moves to block 1208, where it ends and the simulated attack does not proceed, or in some cases, even begin. However, at block 1206, should the target be healthy, the process moves to block 1210. At block 1210, the attack traffic, e.g., simulated attack traffic, is sent destined for the target, for example a production server 126, for example, from one or more simulators 206A-206N, and at a predetermined time, on the order of milliseconds, but not usually longer than seconds, for example, 2 (two) seconds. During and or before the attack, the target is, for example, continuously monitored for health, at block 1212, as the process moves from block 1210 to block 1212.

From block 1212, the process moves to block 1214, where the controller 200 determines whether the target is healthy, for example, by applying the health test to the target production server, as detailed for block 1206 above. Should the target not be healthy at block 1214, the process moves to block 1216, where it is determined whether the simulated attack should be altered or otherwise modified. If the attack should be altered at block 1216, the process moves to block 1218, where it is determined whether pre-attack information for the altered simulated attack is required, and accordingly, needs to be transmitted from the monitor controller 200 to the coordination device 220.

If yes at block 1218, the process moves to block 1204, from where the process resumes. If no at block 1218, the process moves to block 1220, where simulator 206A-206N settings are altered. From block 1220, the process moves to block 1210, from where it resumes.

Returning to block 1216, should the attack not be altered or otherwise modified or changed, the process moves to block 1222, where the simulated attack ends. From block 1222, the process moves to block 1228, from where it continues, as detailed below.

Returning to block 1214, should the target be determined to be healthy, the process moves to block 1224, where the mirrored packets including packet data within the mirrored packets and data associated with these packets, is transmitted from all engaged mirror ports 221 during (and also just before) the simulated attack to the coordination device 220. The process then moves to block 1226, where it is determined whether the simulated attack is finished (e.g., complete). This is typically determined by waiting a predetermined time from the time the simulated attack was sent, the predetermined time on the order of milliseconds, and typically not later than the order of seconds, e.g., up to five seconds. Should the simulated attack not be complete or otherwise finished, the process returns to block 1212, from where it resumes as discussed above. Should the simulated attack be finished, the process moves to block 1228.

At block 1228 (also arrived at from block 1222, as detailed above), the coordination device(s) 220 process the packets and the data therein and associated therewith, which was received (mirrored) from the mirror ports 221a-221e. For example, the mirror ports 221a-221e, continuously transmit their mirrored attack traffic, including, for example, the mirrored packets and data associated with the mirrored packets, to the coordination device 220. While the coordination device 220 shown is typically a single coordination device, it may also be divided into multiple components, or may be multiple coordination devices working simultaneously together. The processing by the coordination device 220 is for data referenced in the pre-attack information, for example, data mirrored at a certain time corresponding to the time of the simulated attack. The coordination device 220 then sends the processed data, requested in the pre-attack information, to the monitor controller 200, at block 1230.

The process moves to block 1232, where the received processed data is analyzed by the monitor controller 200, to determine whether or not it is present. The process moves to block 1234, where the monitor controller 200 determines actions to be taken and/or reports to be made, based on the presence or absence of the processed data. These actions and/or reports may be made based on determined conditions as to the ESS 109 and the other perimeter security devices 250, 252, 254, 256, such as security vulnerabilities, operations of these security devices working or not working, the depth of penetration for the simulated attack (e.g., how far the simulated attack penetrated from the internet 100, through the internal network 120, and to what extent from the perimeter security devices 109, 250, 252, 254, 256 are working), and the like.

The process moves to block 1236, where, for example, the monitor controller 200 determines whether another simulated attack should be made on the same or another target on the internal network 120. If yes, the process moves to block 1204, from where it resumes, as detailed above, as another simulated attack on the same or another target of the internal network 120 is made. If no, at block 1236, another simulated attack is not made, and the process ends at block 1238.

Figure 10B:
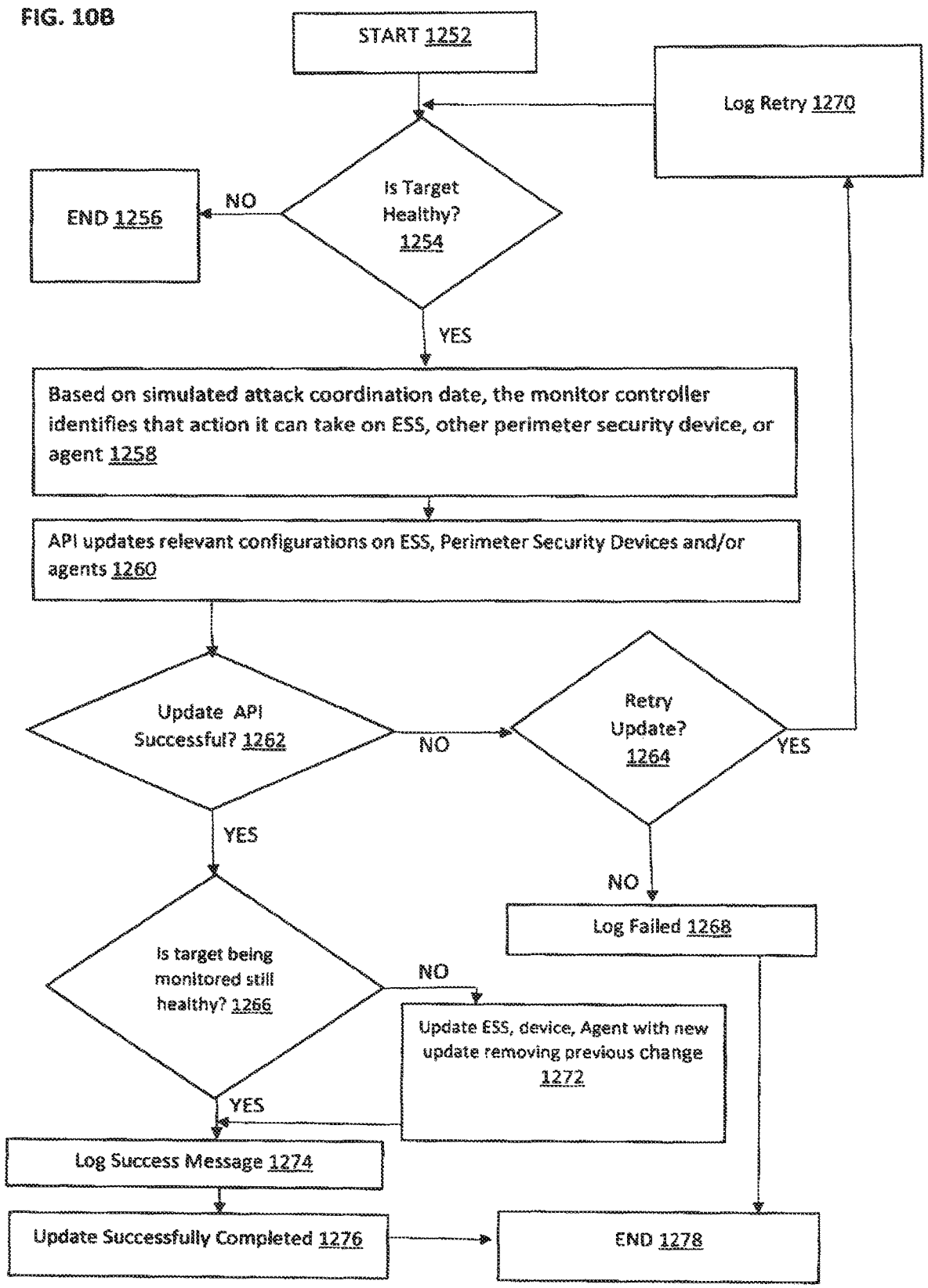
FIG. 10B is a flow diagram of a process for remediating vulnerabilities determined by the process of FIG. 10A.

FIG. 10B, shows a process performed, for example, after the process of FIG. 10A has ended, and, for example, based on the system, e.g., monitor controller 200, having determined that a vulnerability has been determined and/or action should be taken, as per block 1230, which serves as the START block 1252.

The process moves to block 1254 where an initial health check is made for the target 126. The health check may be, for example, in accordance with the health check shown in FIG. 3 and its description above. Should the target be determined not to be healthy, the process moves to block 1256, where it ends and the security update does not proceed or occur.

Should the target be healthy at block 1254, the process moves to block 1258, where based on the received data from the coordination device 220, the monitor controller 200 determines the action to be taken to address the detected vulnerability to one or more of the perimeter security devices 109, 250, 252, 254, 256, and/or on the target itself through an agent 222, to either mitigate or improve the deployed security services designed to protect the target or its services in the system. This protection may, for example, include either mitigating or improving (via the API) the deployed security services designed to protect the target or its services.

Moving to block 1260, the monitor controller 200 may send updates via the API controller 242 or similar channel with configuration changes to otherwise change the settings of the required specific security service or external log service. The API controller 242 may trigger any part of the overall system described herein to again simulate, reapply configuration based on the monitor controller 200, additional API updates or otherwise recheck certain aspects of the target or, for example, its associated ESS 109, perimeter or host security on the target itself.

The process moves to block 1262, where it is determined whether the update API was successful. If no, the process moves to block 1264, where the update is retried. If successful at block 1264, the process moves to block 1270, where the log is retried, and the process returns to block 1254, from where it resumes.

Returning to block 1264, if the update retry fails, a log entry of FAILED is made at block 1268. From block 1268, the process moves to block 1278, where the process ends.

Returning to block 1262, should the API update have been successful, the process moves to block 1266. At block 1266, it is determined whether the target being monitored is healthy, for example, using the test detailed for FIG. 3 above. If the target is not healthy, at block 1266, the process moves to block 1272, where the perimeter security devices 109, 250, 252, 254, 256, and/or agents 222 associated optionally therewith, are updated with a new update, removing all previous changes. The process then moves to block 1274. The process also moves from block 1266 to block 1274 if the target is healthy, at block 1266.

At block 1274, a log success message is issued to a logging system, indicating, for example that the API controller 242 successfully completed the transaction and potentially additional information on the type of update. The process then moves to block 1276, where the update API is now successfully completed. The process moves to block 1278, where it ends, and may be repeated if desired.

Figure 11:
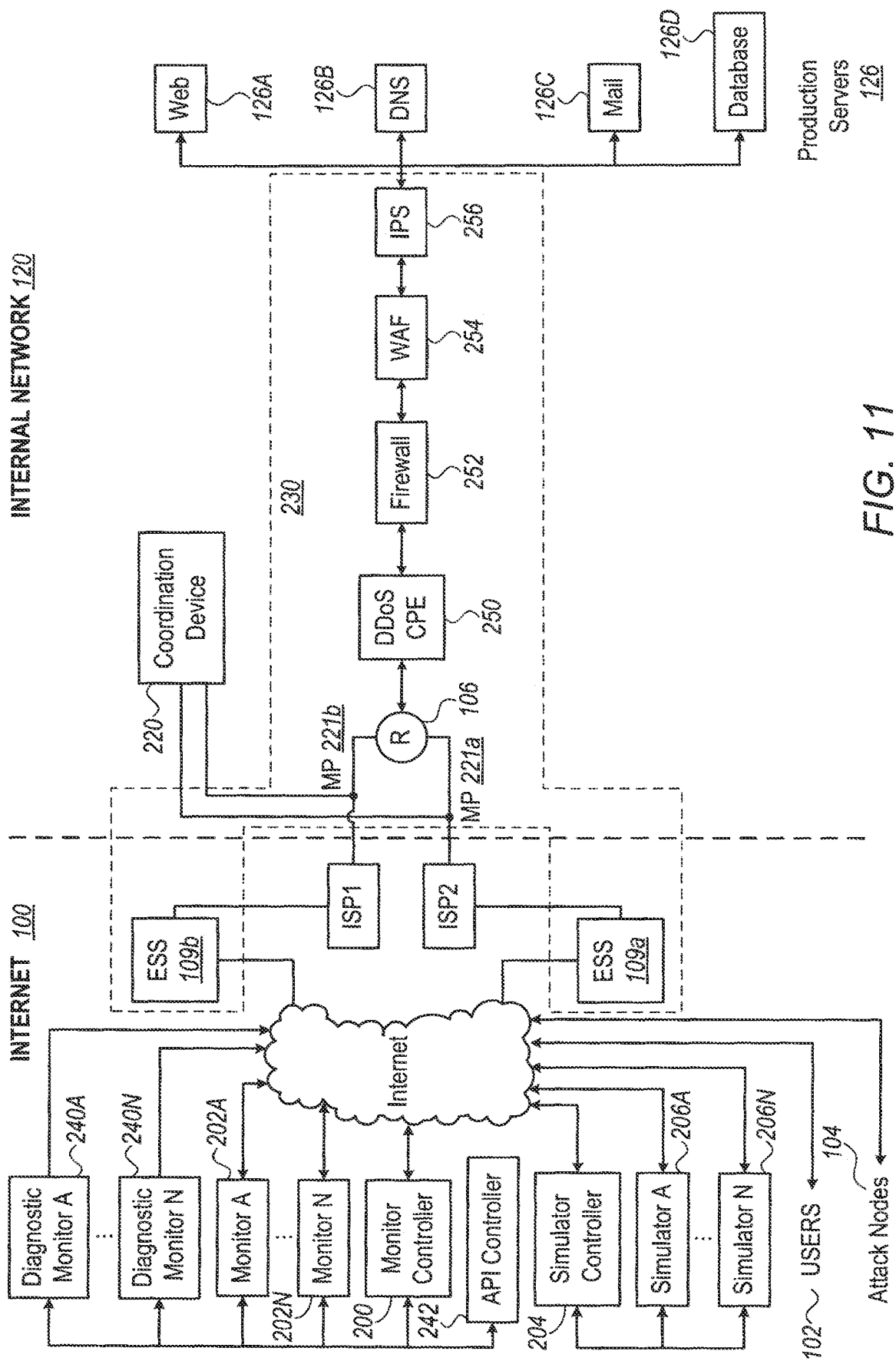
FIGS. 11-14 are diagrams of network topologies used to show other disclosed embodiments; and, FIG. 15 is a diagram showing an example of a coordination device set up in the cloud.

FIGS. 11 and 12 are directed to detecting security profiles across the entire PSS, and, for example, using the detected security profiles to determine when an attack stopped, where it was stopped, what security device or service stopped it, as well as the path the attack traveled, and what security devices were bypassed along the path. These inquiries can be determined by analyzing the data, e.g., operation data, received by the respective coordination devices 220 from the respective mirror ports 221.

In FIG. 11, two mirror ports (MP) 221a, 221b, that transmit mirrored traffic to a coordination device 220 are positioned along separate channels of the Internet 100, between an ESS 109a (part of the PSS 230) for respective Internet Service Provider (ISP1) and a router and between an ESS 109b (part of the PSS 230) for respective Internet Service Provider (ISP2) and a router (R) 106, at the edge (e.g., perimeter) of the internal Network 120. In FIG. 11, the PSS 230 is shown in the broken line box. Also, in FIG. 11 (and also FIG. 14) the separate pathways from the respective ISP (ISP1, ISP2) to the router 106, from the respective ESS 109a, 109b includes network segments, with segments (of the respective pathway) between the respective ESS 109a, 109b and corresponding ISP1 and ISP2 being external network segments.

For example, assuming simulated attack concludes vulnerability status for number of packets leaked and that the mirror ports (MP) 221a, 221b are operational. Should each mirror port (MP) 221a, 221b transmit at least a 30% threshold number of packets to the coordination device 220, from a simulated attack in accordance with the pre-attack information, each ESS 109a, 109b may be considered to be vulnerable. If vulnerable to this specific attack, action is typically suggested to the ISP, or taken, such as by the ISP providing a patch at the respective ESS 109a and 109b to stop any future attack packet leakage.

Alternately, in the example above, should zero, or less than the threshold packet amount get through each ESS 109a, 109b, the internal network 120 is considered protected.

FIG. 12 shows a series of telecom providers (telco), such as Tier 1 providers, such as Verizon®, Sprint®, and the like, protecting an internal network 120 address space and the potential targets therein, such as that of a bank. Each Telco (e.g., an enterprise) is at a location (Locations 1-5) along the Internet 100, and each telco has one or more coordination devices 220 and mirror port (MP) 221 (221-1, 221-2, 221-2a, shown for example purposes) downstream from an ESS 109 (e.g., 109a, 109b, 109p, 109q, 109r, 109s, 109t, 109u, part of the PSS 230) or other perimeter security devices 250, 252, 254, 256 (of the PSS 230). Each coordination device(s) 220 receives pre-attack information at approximately the same time, and, for example, simultaneously, from an upstream monitor controller 200, which orchestrates the simulated attack from simulators 206. Additionally, a diagnostic check may be also orchestrated by the monitor controller 200, designed to validate the various mirror ports (MP) 221 connected to each respective coordination device(s) 220, may be performed in accordance with that described in FIG. 8 above.

Each coordination device 220 of the Internal network 120 receives mirrored traffic from mirror ports 221a and 221b during the time of the simulated attack, and processes the mirrored traffic, such that the processed traffic corresponding to the traffic mirrored during the attack can be analyzed. For example, should the coordination device 220 have received zero or minimal (below a threshold) mirrored packet traffic during the attack, the attack may have traveled, such that this telco was bypassed or the attack was mitigated upstream to the Telco, depending on setup and additional coordination device results. Additionally, to further analyze for bypassing and routes in which traffic travels, the coordination devices 220 and/or the associated mirror ports (MPs) 221 may be turned on and off, to determine whether they are operable as detailed above, to further analyze packet traffic and the route the traffic traveled. The coordination devices 220 may also report to the monitor controller 200, whether the simulated attack is just a single or few packets, e.g., SQL injection attempt against a web server 126A, using this attack depth would be able to be determined.

FIGS. 11 and 12 are setups are known as multi-homed or multi-route environments. A multi-homed environment is such that the network or server security device or defender may not know which protection system a particular attack from attackers 104 (A in FIG. 12) may traverse when an attack is launched, therefore not knowing which ESS 109 or security service is responsible for mitigating the attack, malicious or otherwise unwanted traffic or packets. Using multiple coordination devices 220 and corresponding mirror ports 221, allows multi-homed systems to be non-disruptively evaluated accurately by the validation method and also know where to remediate the various vulnerabilities based on leakage reporting from coordination devices 220.

FIG. 13 is another example of a multi homed environment. Here, the web server (WS) is separated into two web servers (WS) 126A1, 126A2. Each Internet Service Provider (ISP) ISP1 and ISP2 is at a different location, ISP1 in New York, and ISP2 in London. Each ISP has a coordination device 220a (220a-1, 220a-2), 220b (220b-1, 200b-2) and corresponding mirror port (MP) 221a (221a-1, 221a-2), 221b (221b-1, 221b-2) downstream from an ESS 109a, 109b (part of the PSS 230, with the remainder of the PSS 230 including components 250, 252, 254, 256) or other perimeter security devices. Each coordination device 220a, 220b receives pre-attack information from an upstream monitor controller 200, which controls the simulated attack. Each coordination device 220a, 220b receives mirrored traffic during the time of the attack, and processes the mirrored traffic, such that the processed traffic corresponding to the traffic mirrored during the attack can be analyzed. For example, should a coordination device 220a, 220b have received zero or minimal (below a threshold) mirrored packet traffic during the attack, the attack may have traveled, such that this Telco TC1, TC2 was bypassed. Additionally, to further analyze for bypassing and routes in which traffic travels, the coordination devices 220a, 220b may be turned on and off, to determine whether they are operable as detailed above, to further analyze packet traffic and how it travels. The coordination devices 220a, 220b may also report back to the monitor controller 200 whether the simulated attack is just a single or few packets, e.g., SQL injection attempt against a web server, using this attack depth would be able to be determined.

For example, should only one ESS 109a MP 221a have zero packet leakage, or less than the threshold amount of packet leakage through its associated ESS 109b, and MP 221b for ESS 109b is 70% packet leakage, depending on monitor controller decision making, the result may be vulnerable only for the ESS 109b associated with ISP2.

Many variations of the above traffic paths and leakage may exist and will vary from environment to environment. Additionally, a single packet of leakage may suffice to consider something vulnerable, for example, a leaked SQL injection.

Figure 14:
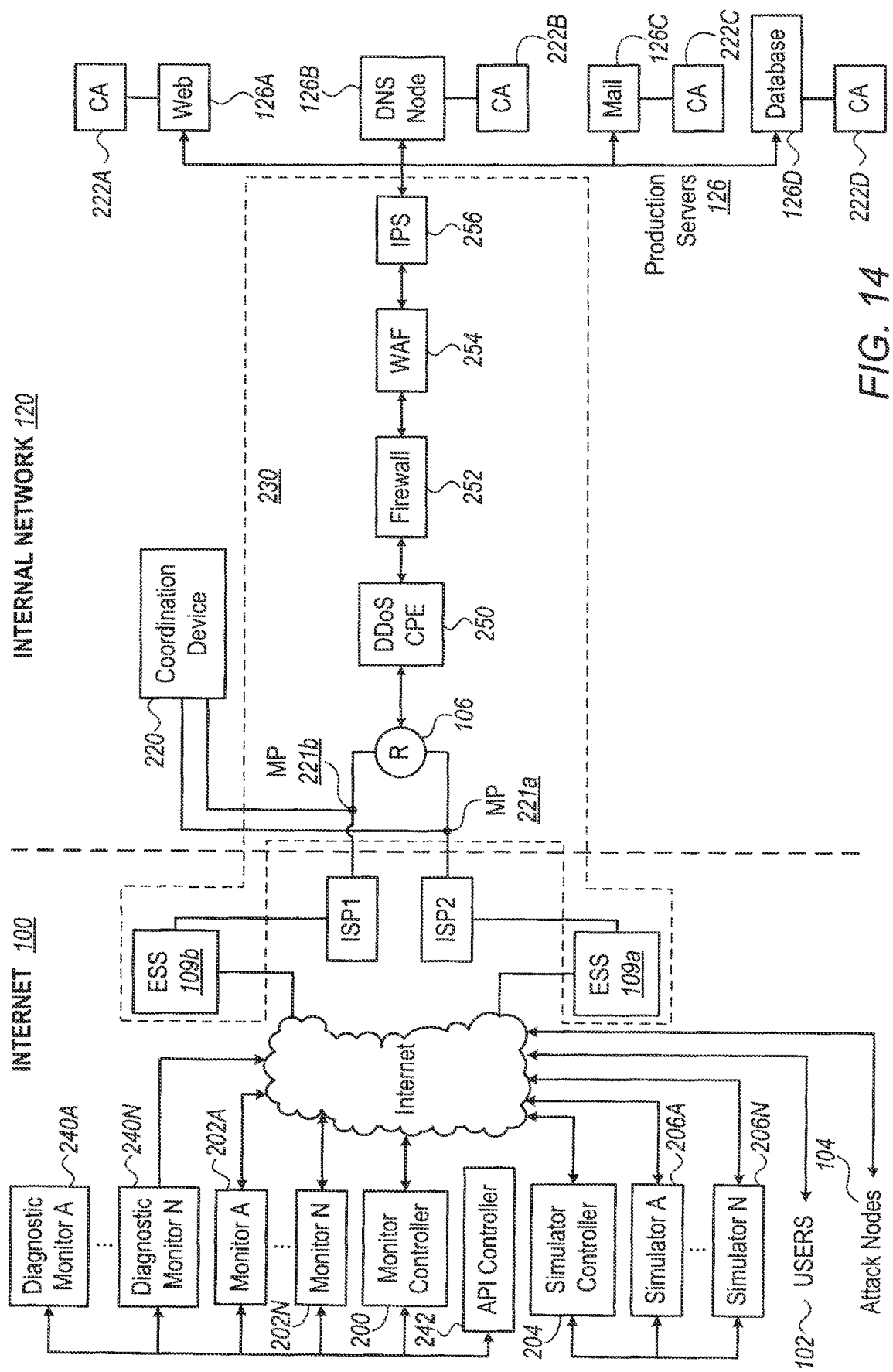

FIG. 14 is similar to FIG. 11 but adds coordination agents (CA) (or agents) 222A-222C at each of the production servers 126A, 126B, 126C, 126D. The agents 222A-222C may function as simulated coordination devices, and may, for example, have an emulated service, associated therewith. For example, the agents 222A-222C may provide data from the network, which may not be available from coordination devices. For example, the agents 222A-222C may obtain baseline statistics, which may be utilized for health baselines, as well as baselines for the CPU of the system. Additionally, the agents 222A-222C may be instructed to look for data on a machine, as well as communicate with the monitor controller 200, 240 to be aware of preattack data or pre diagnostic information. In this figure the PSS 230 is shown in the broken line box.

FIG. 15 is a diagram showing a coordination device set up in the cloud. The configuration shown is one example configuration in the Amazon Web Service (AWS) cloud infrastructure. While cloud infrastructure is shown, the configuration, other infrastructure configurations such as, AWS, GCP, Azure or any other cloud provider, are also suitable, and the setup for mirroring or similar methods of diverting such traffic to the disclosed coordination devices are also suitable. Here, for example, traffic is copied or mirrored to the coordination device/instance 1520 for the target being validated.

FIG. 15 shows the Internet 1500 (accessible through a gateway 1500a) and the public subnet 1502 with an Amazon Web Service (AWS) EC2 1504 in instance 1, hosts, for example, a web server 1505. Instance 1 is where the public would normally connect to from the Internet. Between the Internet 1500 and EC2 1504 instance 1, there is normally a combination of one or more of an ESS and or perimeter security services, such as Cloudfront, AWS shield, AWS WAF, and the like, including external security services like AKAMAI™ or IMPERVA™.

Additionally, in the PUBLIC subnet 1502 of the ENI (Elastic Network Interface) 1506 with a VPC (Virtual Private cloud), a traffic mirror 1510 sends a copy of all its incoming and or outgoing traffic to an AWS network load balancer 1515. The traffic then flows to an AWS partner solution 1517, which in this case, for example, could be the coordination device 1520, and/or, monitor tool 1525 (also known as a packet broker or Mirror service, used to mirror traffic). However, a partner solution may not be required and the traffic may flow directly to the coordination device 1520 from the AWS network load balancer 1515 or may even flow directly from and EC2 1504, 1532 instance A and/or B to the coordination device 1520 in certain setups. Multiple EC2 1504 instances from multiple PUBLIC subnets 1502 communicate to one or more coordination devices 1520 (for example, on the private subnet 1550) through the ENIs, such that the coordination device 1520 receives a copy of all mirrored traffic from each associated EC2 1504, 1532 instance. There may be one or more EC2 instance(s) 1504 to one coordination instance, or many EC2 1504 instances to many coordination instances, in many cloud locations. Additionally, there may be a configuration when the VPC traffic monitor 1510 may not send traffic through an AWS Load Balancer 1515 and may be in a configuration where an EC2 1504 instance sends mirrored traffic directly to the instance with the coordination device 1520. Additionally, agents may be installed on any of the instances 1504 to provide further information and functionalities on the EC2 instance 1510 or other instances.

For example, there may also be scenarios whereby on the PRIVATE subnet 1530, through EC2 1532 instance ENIs 1534, a VPC traffic monitor 1540 may control the sending of mirrored traffic to the coordination device 1520. The instances 1504 and 1532 may even be configured to send mirrored traffic to a coordination device external to the cloud provider's infrastructure.

Some reference links, are listed as exemplary to potential cloud mirroring setups in different providers, cloud providers and underlying technologies have different ways of mirroring, instance and security setups, and the disclosed subject matter can be configured to accommodate the mirroring of each specific cloud:

https://aws.amazon.com/blogs/networking-and-content-delivery/using-vpc-traffic-mirroring-to-monitor-and-secure-your-aws-infrastructure/ https://azure.microsoft.com/en-us/updates/azure-virtual-network-tap/ https://cloud.google.com/vpc/docs/packet-mirroring https://cloud.google.com/vpc/docs/monitoring-packet-mirroring https://cloud.google.com/vpc/docs/packet-mirroring-partners

EXAMPLES

Example 1

A method for testing comprising: (a) configuring a coordination device in communication with a production network, the production network including at least one production service, the production network interfacing with an external network at a perimeter of the production network, the at least one production service downstream from the external network, and, a perimeter security system (PSS) for mitigating multiple threats upstream from the at least one production service; (b) receiving, by the coordination device, pre-attack notification information, the pre-attack notification information including: one or more types of attacks to be launched against the at least one production service; and, (c) collecting, by the coordination device, operation data corresponding to the traffic sent to the at least one production service, the traffic which has at least partially traversed the perimeter security system (PSS) during an attack, where the attack is based on the one or more types of attacks of the received pre-attack notification information, and the collecting during the attack based on the one or more types of attacks of the received pre-attack notification information.

Example 2

The method of Example 1, wherein the coordination device includes at least one emulated service for receiving a simulated attack associated with the pre-attack notification information, and/or for receiving pre-attack notification information or signaling.

Example 3

The method of Example 1 or Example 2, wherein the traffic includes packets.

Example 4

The method of any one of Example 1 to Example 3, wherein the traffic includes simulated attack and/or monitor traffic.

Example 5

The method of any one of Example 1 to Example 4, wherein the traffic includes legitimate traffic.

Example 6

The method of any one of Example 1 to Example 5, additionally comprising: monitoring response operation data of one or more monitors during the attack by a monitor controller, and, determining whether the response operation data is within a predetermined range.

Example 7

The method of any one of Example 1 to Example 6, wherein if the response operation data is determined to be outside of the predetermined range, either altering or terminating the attack.

Example 8

The method of any one of Example 1 to Example 7, additionally comprising: monitoring coordination agent operation data, during the attack by a monitor controller or co-ordination device, and, a co-ordination agent is on a production server and/or the co-ordination device.

Example 9

The method of any one of Example 1 to Example 8, wherein the monitor controller or the coordination device determines whether the agent operation data is within a predetermined range.

Example 10

The method of any one of Example 1 to Example 9, wherein if the agent operation data is determined to be outside of the predetermined range, either altering or terminating the attack.

Example 11

The method of any one of Example 1 to Example 10, additionally comprising, the coordination device sending the collected operation data to a collection point which evaluates the operation of the PSS.

Example 12

The method of any one of Example 1 to Example 11, wherein the collection point comprises a monitor controller.

Example 13

The method of any one of Example 1 to Example 12, wherein the coordination device collecting the operation data includes receiving a copy of the traffic sent to the production service from a mirror port, the traffic having at least partially traversed the perimeter security system (PSS) during the attack, the mirror port along the at least one production network and/or the external network and in communication with the coordination device.

Example 14

The method of any one of Example 1 to Example 13, wherein prior to a simulated attack, and collecting by the coordination device, generating a baseline associated with one or more monitor responses for the at least one production service.

Example 15

The method of any one of Example 1 to Example 14, wherein prior to a simulated attack, and collecting by the coordination device, generating a baseline associated with one or more coordination agent metrics for the at least one production server and/or at least one production service being hosted by the at least one production server.

Example 16

The method of any one of Example 1 to Example 15, wherein prior to the collecting by the coordination device, determining whether the at least one production service is of a predetermined stability to receive the attack.

Example 17

The method of any one of Example 1 to Example 16, wherein the pre-attack notification information includes the time when the attack is launched, and, one or more parameters of the attack.

Example 18

The method of any one of Example 1 to Example 17, additionally comprising: configuring one or more coordination agents on at least one production server hosting the at least one production service, each of the one or more coordination agents configured for: (i) receiving the pre-attack notification information; (ii) collecting the traffic received on the at least one production service and/or the at least one production server: or, (iii) collecting agent operation data from the one or more coordination agents indicative of the operation of the at least one production server.

Example 19

The method of any one of Example 1 to Example 18, additionally comprising: monitoring the one or more coordination agents for agent operation data during the attack, and, determining whether the agent operation data is within a predetermined range.

Example 20

The method of any one of Example 1 to Example 19, wherein if the agent operation data is determined to be outside of the predetermined range, either altering or terminating the attack.

Example 21

The method of any one of Example 1 to Example 20, wherein either altering or terminating the attack is performed by a monitor controller and/or a coordination device.

Example 22

The method of any one of Example 1 to Example 21, additionally comprising: configuring one or more monitors along the external network, each of the one or more monitors configured for: receiving the pre-attack notification information; and, collecting monitor operation data based on the pre-attack notification information and the collecting during the attack, from one or more of: the PSS; or, the at least one production service.

Example 23

The method of any one of Example 1 to Example 22, additionally comprising: monitoring, by a monitor controller, the monitor operation data during the attack, and, determining whether the monitor operation data is within a predetermined range.

Example 24

The method of any one of Example 1 to Example 23, wherein if the monitor operation data is determined to be outside of the predetermined range, either altering or terminating the attack.

Example 25

The method of any one of Example 1 to Example 24, additionally comprising: configuring one or more attack simulators along the external network, each of the one or more attack simulators configured for: receiving the pre-attack notification information; and, collecting simulator operation data based on the pre-attack notification information and the collecting of responses during the attack, from one or more of: the PSS; or, the at least one production service.

Example 26

The method of any one of Example 1 to Example 25, wherein the attack is initiated by a one or more simulators in communication with a simulator controller.

Example 27

The method of any one of Example 1 to Example 26, wherein the simulator controller is in communication with a monitor controller.

Example 28

The method of any one of Example 1 to Example 27, wherein the monitor controller is in communication with the one or more attack simulators.

Example 29

The method of any one of Example 1 to Example 28, wherein if the simulator controller loses communication with the monitor controller, the simulator controller initiates notification to the one or more simulators to terminate the attack.

Example 30

The method of any one of Example 1 to Example 29, wherein the attack is initiated by a simulator controller and performed by one or more simulators.

Example 31

The method of any one of Example 1 to Example 30, wherein if any of the one or more simulators loses communication with the simulator controller or a monitor controller, the simulator that has lost the communication terminates the attack.

Example 32

The method of any one of Example 1 to Example 31, wherein the perimeter security system is within the production network and at least partially in the external network.

Example 33

The method of any one of Example 1 to Example 32, wherein the perimeter security system (PSS), includes at least two of the group of: External Security Services (ESS) Module; DDoS mitigation module; Firewall; Antivirus; Anti-malware; Sandbox protections; Antispam; Web Application Firewall (WAF); or, Intrusion Protection System (IPS).

Example 34

The method of any one of Example 1 to Example 33, additionally comprising: analyzing the operation data collected by a monitor controller and/or the coordination device, the analyzing including: identifying vulnerabilities in the components of the perimeter security system (PSS); and, sending commands from an Application Program Interface (API) controller towards the PSS for remediating at least one of the components of the perimeter security system having the identified vulnerabilities.

Example 35

The method of any one of Example 1 to Example 34, additionally comprising analyzing the operation data in the traffic by processes including deep packet inspection.

Example 36

A method for testing a mirror port for communication with a coordination device, the mirror port along either an external network or a production network, the method comprising: receiving, by the coordination device, pre-diagnostic notification information, the pre-diagnostic notification information including: test diagnostic traffic to be used for the testing of the coordination device and its at least one associated mirror port, the test diagnostic traffic including at least one of: a number of the packets and/or certain data within the packets of the test diagnostic traffic, and the time when the test diagnostic traffic will be transmitted to at least one production service along the production network; the at least one mirror port providing a copy of the test diagnostic traffic to the coordination device, corresponding to the time that the test diagnostic traffic was transmitted to the at least one production service, for which the test diagnostic traffic traversed at least one of the external network or the production network, towards the at least one production service; and, analyzing at least one of: the number of packets and/or the certain data within the packets, in the copied test diagnostic traffic, as provided in the pre-diagnostic notification information received by the coordination device, to determine operational status of the mirror port.

Example 37

The method of Example 36, wherein the test diagnostic traffic is sent from at least one diagnostic monitor.

Example 38

The method of Example 36 or Example 37, wherein the test diagnostic traffic comprises legitimate traffic from at least one external network.

Example 39

The method of any one of Example 36 to Example 38, wherein the analyzing the certain data in the packets includes deep packet inspection.

Example 40

The method of any one of Example 36 to Example 39, wherein the at least one production service is hosted by one or more production servers.

Example 41

The method of any one of Example 36 to Example 40, wherein the diagnostic traffic is transmitted independently of the at least one diagnostic monitor, when the start time and/or end time of the diagnostic traffic is unknown.

Example 42

The method for determining the route of an attack into a production network, the production network including at least one production service, from at least two network segments, including at least one external network segment, comprising: (a) configuring one or more coordination devices for communication with at least two of the network segments, each of the at least two network segments communicating with: 1) a production network, and, 2) a perimeter security system (PSS), the perimeter security system upstream from the at least one production service; (b) receiving, by the one or more coordination devices, pre-attack notification information, the pre-attack notification information including: one or more types of attacks for launching along any one or more of the at least two network segments, and targeting the at least one production service; and, (c) collecting, by the one or more coordination devices, operation data corresponding to traffic sent along at least one of the network segments towards the at least one production service and the operation data having at least partially traversed the perimeter security system (PSS) during an attack based on the one or more types of attacks of the received pre-attack notification information, and the collecting during the attack based on the one or more types of attacks based on the received pre-attack notification information.

Example 43

The method of Example 42, wherein the pre-attack notification information includes, the time of the attack, and one or more of: the attack type, the number of packets in the attack, and/or certain data in the packets of the attack.

Example 44

The method of Example 42 or Example 43, wherein the time of the attack includes the exact time of the attack.

Example 45

The method of any one of Example 42 to Example 44, wherein the time of the attack includes the approximate time of the attack.

Example 46

The method of any one of Example 42 to Example 45, wherein the at least one production service is hosted by one or more production servers.

Example 47

The method of any one of Example 42 to Example 46, wherein the perimeter security system (PSS) is within the production network and at least partially in the external network.

Example 48

The method of any one of Example 42 to Example 47, wherein the perimeter security system (PSS) comprises at least two of the group of: External Security Services (ESS) Module; DDoS mitigation module; Firewall; Antivirus; Anti-malware; Sandbox protections; Antispam; Web Application Firewall (WAF); or, Intrusion Protection System (IPS).

Example 49

The method of any one of Example 42 to Example 48, wherein the attack is initiated by one or more simulators in communication with a simulator controller.

Example 50

The method of any one of Example 42 to Example 49, wherein the simulator controller is in communication with a monitor controller.

Example 51

The method of any one of Example 42 to Example 50, wherein the one or more simulators are in communication with a monitor controller.

Example 52

The method of any one of Example 42 to Example 51, wherein if any of the one or more simulators loses communication with the simulator controller or the monitor controller, the one or more simulators terminates the attack.

Example 53

The method of any one of Example 42 to Example 52, wherein if the simulator controller loses communication with the monitor controller, the simulator controller initiates a notification to the one or more simulators to terminate the attack.

Example 54

A method for testing depth of penetration for perimeter security of a network, comprising: (a) configuring at least one coordination device for communication with at least two points of-at least one network, the at least one network including at least one production service, and, a perimeter security system (PSS) for mitigating multiple threats upstream from the at least one production service; (b) receiving, by the at least one coordination device, pre-attack notification information, the pre-attack notification information including: one or more types of attacks to be launched against the at least one production service; (c) collecting, by the at least one coordination device, operation data which has at least partially traversed the perimeter security system (PSS) during an attack of the one or more attack types in the received pre-attack notification information, and the collecting from the at least two points, based on the attack of the one or more attack types from the pre-attack notification information; and, (d) analyzing the operation data collected by the at least one coordination device from the at least two points of the at least one network, for one or more of: packet leakage and/or the certain data within the packets, to determine one or more of: the downstream depth of penetration through the PSS towards the at least one production service by the attack, or, the effectiveness of one or more of the components of the perimeter security system (PSS).

Example 55

The method of Example 54, wherein each of at least the at least two points of the at least one network includes a mirror port.

Example 56

The method of Example 54 or Example 55, wherein the analyzing the operation data collected at the coordination device, additionally comprises: identifying vulnerabilities in one or more of the components of the perimeter security system (PSS); and, sending commands from an Application Program Interface (API) controller towards the PSS for remediating the at least one of the one or more components of the perimeter security system having the identified vulnerabilities.

Example 57

The method of any one of Example 54 to Example 56, wherein the components of the perimeter security system (PSS) comprise at least two of the group of: External Security Services (ESS) Module; DDoS mitigation module; Firewall; Antivirus; Anti-malware; Sandbox protections; Antispam; Web Application Firewall (WAF); or, Intrusion Protection System (IPS).

Example 58

The method of any one of Example 54 to Example 57, wherein the at least one network comprises a plurality of networks, and including an external network and a production network, and the at least one production service is on the production network.

Example 59

The method of any one of Example 54 to Example 58 the perimeter security system (PSS) is within the production network and at least partially in the external network.

Example 60

The method of any one of Example 54 to Example 59, wherein the identified vulnerabilities includes instructing the API controller to send one or more commands, and is performed by a monitor controller or the coordination device.

Example 61

The method of any one of Example 54 to Example 60, wherein the pre-attack notification information includes, the time of the attack, and one or more of: the attack type, the number of packets in the attack, and/or certain data in the packets of the attack.

Example 62

The method of any one of Example 54 to Example 61, wherein the time of the attack includes the exact time of the attack.

Example 63

The method of any one of Example 54 to Example 62, wherein the time of the attack includes the approximate time of the attack.

Example 64

The method of any one of Example 54 to Example 63, wherein the attack is initiated by one or more simulators in communication with a simulator controller.

Example 65

The method of any one of Example 54 to Example 64, wherein the simulator controller is in communication with a monitor controller.

Example 66

The method of any one of Example 54 to Example 65, wherein the one or more simulators are in communication with a monitor controller.

Example 67

The method of any one of Example 54 to Example 66, wherein if the simulator controller loses communication with the monitor controller or the simulator controller, the simulator controller or the monitor controller initiates a notification to the one or more simulators to alter or terminate the attack.

Example 68

The method of any one of Example 54 to Example 67, wherein the at least one coordination device includes a plurality of coordination devices, and, different coordination devices communicate with at least one point of the at least one network.

Example 69

A system for testing comprising: a coordination device configured for communicating with a network, the coordination device including: a receiver for receiving pre-attack notification information via the network, the pre-attack notification information including: one or more types of attacks to be launched; and, a collector for collecting operation data corresponding to traffic of an attack on the network which has at least partially traversed a Perimeter Security System (PSS), which was sent to a downstream target on the network, the traffic sent to the network based on the pre-attack notification information, and the collecting is during the attack on the network based on the pre-attack notification information.

Example 70

The system of Example 69, additionally comprising a Perimeter Security System (PSS) at least partially along the network to protect the downstream target.

Example 71

The system of Example 69 or Example 70, wherein the PSS includes two or more components selected from the group consisting of: External Security Services (ESS) Module; DDoS mitigation module; Firewall; Antivirus; Antimalware; Sandbox protections; Antispam; Web Application Firewall (WAF); or, Intrusion Protection System (IPS).

Example 72

The system of any one of Example 69 to Example 71, wherein the coordination device communicates with one or more mirror ports which receive traffic having traversed one or more of the components of the PSS along the network.

Example 73

The system of any one of Example 69 to Example 72, wherein the coordination device or a monitor controller is configured to determine by monitoring the response of the target, whether the operation data is out of a pre-determined range, and, if the operation data is out of the predetermined range, initiating a notification to one or more simulators to alter or terminate the attack.

Example 74

The system of any one of Example 69 to Example 73, wherein the downstream target comprises a production service along the network downstream from the PSS.

Example 75

The system of any one of Example 69 to Example 74, wherein the production service is hosted by one or more production servers.

Example 76

The system of any one of Example 69 to Example 75, wherein at least one emulated service is deployed on the coordination device, the emulated service configured for receiving a simulated attack associated with the pre-attack notification information, for receiving pre-attack notification information, and/or, for receiving and sending signaling associated with the pre-attack notification information.

Aspects of the disclosed embodiments may be provided as a system, method or computer program product. Accordingly, aspects of the present disclosed embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosed embodiments may take the form of a computer program product embodied in one or more non-transitory computer readable (storage) medium(s) having computer readable program code embodied thereon.

Implementation of the method and/or system of embodiments of the disclosed subject matter can involve performing or completing selected tasks manually, automatically, or a combination thereof. Moreover, according to actual instrumentation and equipment of embodiments of the method and/or system of the disclosed subject matter, several selected tasks could be implemented by hardware, by software or by firmware or by a combination thereof using an operating system.

For example, hardware for performing selected tasks according to the disclosed embodiments could be implemented as a chip or a circuit. As software, selected tasks according to the disclosed embodiments could be implemented as a plurality of software instructions being executed by a computer using any suitable operating system. In an exemplary embodiment of the disclosed subject matter, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the disclosed subject matter. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable non-transitory storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowcharts and block diagrams in the Figures illustrate the architecture, functionality, and operation of possible implementations of systems, methods and computer program products according to various embodiments of the present disclosed subject matter. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the disclosed subject matter have been presented for purposes of illustration, but are not intended to be exhaustive or limited to the embodiments disclosed. Many modifications and variations will be apparent to those of ordinary skill in the art without departing from the scope and spirit of the disclosed embodiments.

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the disclosed subject matter, which are, for clarity, described in the context of separate embodiments, may also be provided in combination in a single embodiment. Conversely, various features of the disclosed subject matter, which are, for brevity, described in the context of a single embodiment, may also be provided separately or in any suitable subcombination or as suitable in any other described embodiment of the disclosed subject matter.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the disclosed subject matter has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A method for testing comprising:
(a) configuring a coordination device in communication with a production network, the production network including at least one production service, the production network interfacing with an external network at a perimeter of the production network, the at least one production service downstream from the external network, and a perimeter security system (PSS) for mitigating multiple threats upstream from the at least one production service;

(b) receiving, by the coordination device, pre-attack notification information, the pre-attack notification information including: one or more types of attacks to be launched against the at least one production service; and (c) collecting, by the coordination device, operation data corresponding to the traffic sent to the at least one production service, the traffic which has at least partially traversed the perimeter security system (PSS) during an attack, where the attack is based on the one or more types of attacks of the received pre-attack notification information, and the collecting during the attack based on the one or more types of attacks of the received pre-attack notification information.

2. The method of claim 1, wherein the coordination device includes at least one emulated service for receiving a simulated attack associated with the pre-attack notification information, and/or for receiving pre-attack notification information or signaling.

3. The method of claim 1, wherein the traffic includes packets.

4. The method of claim 1, wherein the traffic includes simulated attack traffic and/or monitor traffic.

5. The method of claim 1, wherein the traffic includes legitimate traffic.

6. The method of claim 1, additionally comprising: monitoring response operation data of one or more monitors during the attack by a monitor controller, and, determining whether the response operation data is within a predetermined range.

7. The method of claim 6, wherein if the response operation data is determined to be outside of the predetermined range, either altering or terminating the attack.

8. The method of claim 1, additionally comprising: monitoring coordination agent operation data during the attack by a monitor controller or the coordination device, and a coordination agent is on a production server and/or the coordination device.

9. The method of claim 8, wherein the monitor controller or the coordination device determines whether the coordination agent operation data is within a predetermined range.

10. The method of claim 9, wherein if the coordination agent operation data is determined to be outside of the predetermined range, either altering or terminating the attack.

11. The method of claim 1, additionally comprising, the coordination device sending the collected operation data to a collection point which evaluates the operation of the perimeter security system (PSS).

12. The method of claim 11, wherein the collection point comprises a monitor controller.

13. The method of claim 1, wherein the coordination device collecting the operation data includes receiving a copy of the traffic sent to the at least one production service from a mirror port, the traffic having at least partially traversed the perimeter security system (PSS) during the attack, the mirror port along the production network and/or the external network and in communication with the coordination device.

14. The method of claim 1, wherein prior to a simulated attack, and the collecting by the coordination device, generating a baseline associated with one or more monitor responses for the at least one production service.

15. The method of claim 1, wherein prior to a simulated attack, and the collecting by the coordination device, generating a baseline associated with one or more coordination agent metrics for the at least one production service and/or the at least one production service hosting at least one production server.

16. The method of claim 1, wherein prior to the collecting by the coordination device, determining whether the at least one production service is of a predetermined stability to receive the attack.

17. The method of claim 1, wherein the pre-attack notification information includes the time when the attack is launched, and one or more parameters of the attack.

18. The method of claim 1, additionally comprising: configuring one or more coordination agents on at least one production server hosting the at least one production service, each of the one or more coordination agents configured for:
(i) receiving the pre-attack notification information; (ii) collecting the traffic received on the at least one production service and/or the at least one production server; or, (iii) collecting coordination agent operation data from the one or more coordination agents indicative of the operation of the at least one production server.

19. The method of claim 18, additionally comprising: monitoring the one or more coordination agents for coordination agent operation data during the attack, and, determining whether the coordination agent operation data is within a predetermined range.

20. The method of claim 19, wherein if the coordination agent operation data is determined to be outside of the predetermined range, either altering or terminating the attack.

21. The method of claim 20, wherein either altering or terminating the attack is performed by a monitor controller and/or the coordination device.

22. The method of claim 1, additionally comprising: configuring one or more monitors along the external network, each of the one or more monitors configured for:
receiving the pre-attack notification information; and
collecting monitor operation data based on the pre-attack notification information and the collecting during the attack, from one or more of:
the perimeter security system (PSS); or,
the at least one production service.

23. The method of claim 22, additionally comprising: monitoring, by a monitor controller, the monitor operation data during the attack, and, determining whether the monitor operation data is within a predetermined range.

24. The method of claim 23, wherein if the monitor operation data is determined to be outside of the predetermined range, either altering or terminating the attack.

25. The method of claim 1, additionally comprising: configuring one or more attack simulators along the external network, each of the one or more attack simulators configured for:
receiving the pre-attack notification information; and
collecting simulator operation data based on the pre-attack notification information and the collecting of responses during the attack, from one or more of:
the perimeter security system (PSS); or,
the at least one production service.

26. The method of claim 1, wherein the attack is initiated by one or more simulators in communication with a simulator controller.

27. The method of claim 26, wherein the simulator controller is in communication with a monitor controller.

28. The method of claim 27, wherein the monitor controller is in communication with the one or more simulators.

29. The method of claim 28, wherein if the simulator controller loses communication with the monitor controller, the simulator controller initiates notification to the one or more simulators to terminate the attack.

30. The method of claim 1, wherein the attack is initiated by a simulator controller and performed by one or more simulators.

31. The method of claim 30, wherein if any of the one or more simulators loses communication with the simulator controller or a monitor controller, the simulator that has lost the communication terminates the attack.

32. The method of claim 1, wherein the perimeter security system (PSS) is within the production network and at least partially in the external network.

33. The method of claim 25, wherein the perimeter security system (PSS), includes at least two of the group of:
External Security Services (ESS) Module;
Distributed Denial of Service (DDoS) mitigation module;
Firewall;
Antivirus;
Anti-malware;
Sandbox protections;
Antispam;
Web Application Firewall (WAF); or
Intrusion Protection System (IPS).

34. The method of claim 1, additionally comprising:
analyzing the operation data collected by a monitor controller and/or the coordination device, the analyzing including:
identifying vulnerabilities in the components of the perimeter security system (PSS); and
sending commands from an Application Program Interface (API) controller towards the perimeter security system (PSS) for remediating at least one of the components of the perimeter security system (PSS) having the identified vulnerabilities.

35. The method of claim 1, additionally comprising analyzing the operation data in the traffic by processes including deep packet inspection (DPI).

36. A method for testing a mirror port for communication with a coordination device, the mirror port along either an external network or a production network, the method comprising:
receiving, by the coordination device, pre-diagnostic notification information, the pre-diagnostic notification information including:
test diagnostic traffic to be used for the testing of the coordination device and at least one mirror port associated with the coordination device, the test diagnostic traffic including at least one of: a number of the packets and/or certain data within the packets, of the test diagnostic traffic, and
a time when the test diagnostic traffic will be transmitted to at least one production service along the production network;
the at least one mirror port providing a copy of the test diagnostic traffic to the coordination device, corresponding to the time that the test diagnostic traffic was transmitted to the at least one production service, for which the test diagnostic traffic traversed at least one of the external network or the production network, towards the at least one production service; and
analyzing at least one of: the number of packets and/or the certain data within the packets, in the copy of the test diagnostic traffic to the coordination device, as provided in the pre-diagnostic notification information received by the coordination device, to determine operational status of the at least one mirror port.

37. The method of claim 36, wherein the test diagnostic traffic is sent from at least one diagnostic monitor.

38. The method of claim 36, wherein the test diagnostic traffic comprises legitimate traffic from the external network.

39. The method of claim 36, wherein the analyzing the certain data within the packets includes deep packet inspection.

40. The method of claim 36, wherein the at least one production service is hosted by one or more production servers.

41. The method of claim 37, wherein the test diagnostic traffic is transmitted independently of the at least one diagnostic monitor, when a start time and/or end time of the test diagnostic traffic is unknown.

42. A method for determining the route of an attack into a production network, the production network including at least one production service, from at least two network segments, including at least one external network segment, comprising:
(a) configuring one or more coordination devices for communication with at least two of the network segments, each of the at least two network segments communicating with: 1) a production network, and 2) a perimeter security system (PSS), the perimeter security system (PSS) upstream from the at least one production service;
(b) receiving, by the one or more coordination devices, pre-attack notification information, the pre-attack notification information including: one or more types of attacks for launching along any one or more of the at least two network segments, and targeting the at least one production service; and
(c) collecting, by the one or more coordination devices, operation data corresponding to traffic sent along at least one of the network segments towards the at least one production service and the operation data having at least partially traversed the perimeter security system (PSS) during an attack based on the one or more types of attacks of the received pre-attack notification information, and the collecting during the attack based on the one or more types of attacks based on the received pre-attack notification information.

43. The method of claim 42, wherein the pre-attack notification information includes, a time of the attack, and one or more of: the type of the attack, a number of packets in the attack, and/or certain data in the packets in the attack.

44. The method of claim 43, wherein the time of the attack includes an exact time of the attack.

45. The method of claim 43, wherein the time of the attack includes an approximate time of the attack.

46. The method of claim 42, wherein the at least one production service is hosted by one or more production servers.

47. The method of claim 42, wherein the perimeter security system (PSS) is within the production network and at least partially in the at least one external network segment.

48. The method of claim 47, wherein the perimeter security system (PSS) comprises at least two of the group of:
External Security Services (ESS) Module;
DDoS mitigation module;
Firewall;
Antivirus;
Anti-malware;
Sandbox protections;
Antispam;
Web Application Firewall (WAF); or
Intrusion Protection System (IPS).

49. The method of claim 42, wherein the attack is initiated by one or more simulators in communication with a simulator controller.

50. The method of claim 49, wherein the simulator controller is in communication with a monitor controller.

51. The method of claim 50, wherein the one or more simulators are in communication with the monitor controller.

52. The method of claim 51, wherein if any of the one or more simulators loses communication with the simulator controller or the monitor controller, the one or more simulators terminates the attack.

53. The method of claim 52, wherein if the simulator controller loses communication with the monitor controller, the simulator controller initiates a notification to the one or more simulators to terminate the attack.

54. A method for testing depth of penetration for perimeter security of a network, comprising:
 (a) configuring at least one coordination device for communication with at least two points of at least one network, the at least one network including at least one production service, and a perimeter security system (PSS) for mitigating multiple threats upstream from the at least one production service;
 (b) receiving, by the at least one coordination device, pre-attack notification information, the pre-attack notification information including: one or more types of attacks to be launched against the at least one production service;
 (c) collecting, by the at least one coordination device, operation data which has at least partially traversed the perimeter security system (PSS) during an attack of the one or more attack types in the received pre-attack notification information, and the collecting from the at least two points of the at least one network, based on the attack of the one or more attack types from the pre-attack notification information; and
 (d) analyzing the operation data collected by the at least one coordination device from the at least two points of the at least one network, for one or more of: packet leakage and/or the certain data within the packets, to determine one or more of: the downstream depth of penetration through the perimeter security system (PSS) towards the at least one production service by the attack, or, the effectiveness of one or more components of the perimeter security system (PSS).

55. The method of claim 54, wherein each of the at least two points of the at least one network includes a mirror port.

56. The method of claim 54, wherein the analyzing the operation data collected by the at least one coordination device, additionally comprises:
 identifying vulnerabilities in the one or more components of the perimeter security system (PSS); and
 sending commands from an Application Program Interface (API) controller towards the perimeter security system (PSS) for remediating at least one of the one or more components of the perimeter security system (PSS) having the identified vulnerabilities.

57. The method of claim 56, wherein the one or more components of the perimeter security system (PSS) comprise at least two of the group of:
 External Security Services (ESS) Module;
 DDoS mitigation module;
 Firewall;
 Antivirus;
 Anti-malware;
 Sandbox protections;
 Antispam;
 Web Application Firewall (WAF); or
 Intrusion Protection System (IPS).

58. The method of claim 56, wherein the at least one network comprises a plurality of networks, the plurality of networks including an external network and a production network, and the at least one production service is on the production network.

59. The method of claim 58, wherein the perimeter security system (PSS) is within the production network and at least partially in the external network.

60. The method of claim 56, wherein the identifying vulnerabilities includes instructing the API controller to send one or more commands, and is performed by a monitor controller or the at least one coordination device.

61. The method of claim 54, wherein the pre-attack notification information includes, a time of the attack, and one or more of: the type of attack, a number of packets in the attack, and/or certain data in the packets in the attack.

62. The method of claim 61, wherein the time of the attack includes an exact time of the attack.

63. The method of claim 61, wherein the time of the attack includes an approximate time of the attack.

64. The method of claim 54, wherein the attack is initiated by one or more simulators in communication with a simulator controller.

65. The method of claim 64, wherein the simulator controller is in communication with a monitor controller.

66. The method of claim 65, wherein the one or more simulators are in communication with the monitor controller.

67. The method of claim 65, wherein if the simulator controller loses communication with the monitor controller or the simulator controller, the simulator controller or the monitor controller initiates a notification to the one or more simulators to alter or terminate the attack.

68. The method of claim 54, wherein the at least one coordination device includes a plurality of coordination devices, and different ones of the plurality of coordination devices communicate with at least one point of the at least one network.

69. A system for testing comprising:
 a coordination device configured for communicating with a network, the coordination device including:
 a receiver for receiving pre-attack notification information via the network, the pre-attack notification information including: one or more types of attacks to be launched; and
 a collector for collecting operation data corresponding to traffic of an attack on the network which has at least partially traversed a Perimeter Security System (PSS), which was sent to a downstream target on the network, the traffic sent to the network based on the pre-attack notification information, and the collecting is during the attack on the network based on the pre-attack notification information.

70. The system of claim 69, additionally comprising a Perimeter Security System (PSS) at least partially along the network to protect the downstream target.

71. The system of claim 70, wherein the perimeter security system (PSS) includes two or more components selected from the group consisting of:
 External Security Services (ESS) Module;
 DDoS mitigation module;
 Firewall;
 Antivirus;
 Anti-malware;

Sandbox protections;
Antispam;
Web Application Firewall (WAF); or
Intrusion Protection System (IPS).

72. The system of claim 71, wherein the coordination device communicates with one or more mirror ports which receive traffic having traversed one or more of the components of the perimeter security system (PSS) along the network.

73. The system of claim 69, wherein the coordination device or a monitor controller is configured to determine, by monitoring the response of the downstream target, whether the operation data is out of a predetermined range, and, if the operation data is out of the predetermined range, initiating a notification to one or more simulators to alter or terminate the attack.

74. The system of claim 69, wherein the downstream target comprises a production service along the network downstream from the perimeter security system (PSS).

75. The system of claim 74, wherein the production service is hosted by one or more production servers.

76. The system of claim 69, wherein at least one emulated service is deployed on the coordination device, the emulated service configured for receiving a simulated attack associated with the pre-attack notification information for receiving pre-attack notification information, and/or, for receiving and sending signaling associated with the pre-attack notification information.

\* \* \* \* \*